(12) United States Patent
Claeys

(10) Patent No.: US 8,038,282 B2
(45) Date of Patent: Oct. 18, 2011

(54) UV MODULE

(75) Inventor: Michael L. Claeys, Broomfield, CO (US)

(73) Assignee: Air Motion Systems, Inc., River Falls, WI (US)

( * ) Notice: Subject to any disclaimer, the term of this patent is extended or adjusted under 35 U.S.C. 154(b) by 970 days.

(21) Appl. No.: 12/001,080

(22) Filed: Dec. 7, 2007

(65) Prior Publication Data

US 2008/0143806 A1    Jun. 19, 2008

Related U.S. Application Data

(60) Provisional application No. 60/874,212, filed on Dec. 11, 2006.

(51) Int. Cl.
*B41J 2/01* (2006.01)
(52) U.S. Cl. ........................... 347/102; 362/283
(58) Field of Classification Search .................. 347/102; 29/428; 430/328; 362/283; 396/155
See application file for complete search history.

(56) References Cited

U.S. PATENT DOCUMENTS

| | | | | |
|---|---|---|---|---|
| 1,641,920 A * | 9/1927 | Clark | ............................. | 226/176 |
| 1,682,254 A * | 8/1928 | Rorabacher | ....................... | 49/27 |
| 2,088,713 A | 8/1937 | Mitchell | | |
| 2,611,283 A * | 9/1952 | Askren et al. | ............. | 74/665 GB |
| 3,098,605 A * | 7/1963 | Bentele et al. | ............... | 418/61.2 |
| 3,404,470 A * | 10/1968 | Raiti | ............................. | 37/228 |
| 3,689,137 A * | 9/1972 | Yozo | ........................... | 352/91 S |
| 3,819,929 A | 6/1974 | Newman | | |
| 3,928,859 A * | 12/1975 | Peterson | ...................... | 396/132 |
| 3,950,650 A | 4/1976 | Pray et al. | | |
| 4,306,791 A * | 12/1981 | Hashimoto et al. | ........... | 396/155 |
| 5,502,310 A | 3/1996 | Niestrath et al. | | |
| 6,607,289 B2 | 8/2003 | Lassovsky | | |
| 6,619,819 B2 | 9/2003 | Stowell et al. | | |
| 2004/0037081 A1* | 2/2004 | Blandford | ...................... | 362/283 |
| 2004/0070975 A1 | 4/2004 | Register et al. | | |
| 2007/0264095 A1* | 11/2007 | Suzuki et al. | .............. | 408/239 R |

FOREIGN PATENT DOCUMENTS

GB         776925         6/1957

OTHER PUBLICATIONS

International Search Report for International Application No. PCT/US2007/025156 dated Sep. 19, 2008 With Reasoned Statement under Rule 43*bis* with regard to novelty, inventive step or industrial applicability.

(Continued)

*Primary Examiner* — Charlie Peng
*Assistant Examiner* — Peter Radkowski

(57) ABSTRACT

A UV module of this invention has connection block (optional), connection end cap, shutter, and exhaust end cap assemblies. The connection block has doweled or tapered bayonets for facilitated installation and removal of the UV module. The connection end cap has a drive train with sleeve bearings and/or torque limiting clutches. Each of the sleeve bearing cooperates with a poppet valve in the connection block assembly to assure fluid-tight integrity during assembly and disassembly. Each of the clutches allows for facilitated shutter synchronization and helps prevent drive train breakdown. The shutter assembly may include a novel coolant flow path cross over and/or improved positive and negative positive and negative retainers to eliminate or greatly reduce shutter binding. The shutter end caps may include coolant flow paths and mate with the shutters to achieve a fluid-tight integrity. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 C.F.R. §1.72(b).

20 Claims, 46 Drawing Sheets

OTHER PUBLICATIONS

Dec. 3, 2009 Supplemental European search report for corresponding European Patent Office Application 07853300.7.

International Search Report for International Application No. PCT/US2007/025156 dated Sep. 19, 2008.

* cited by examiner

UV MODULE

CROSS-REFERENCES TO RELATED APPLICATIONS

This application claims priority under 35 U.S.C. §119 (e) to, and hereby incorporates by reference, U.S. Provisional Application No. 60/874,212, filed Dec. 11, 2006.

BACKGROUND OF THE INVENTION

1. Field of the Invention

This invention relates to the printing industry and, in particular, this invention relates to devices for curing ultraviolet sensitive inks printed on substrate.

2. Background

Ultraviolet-sensitive ink is used widely in the printing industry. One reason for its use is that ultraviolet-sensitive ink can be quickly cured by being irradiated with ultraviolet light. Such irradiation is accomplished by directing a light beam, containing high proportions of ultraviolet light, at the printed substrate.

Lamps used to generate light for this purpose also generate considerable amounts of other energy in the form of heat. This heat is usually of little consequence when a printing press is operating, because the light and heat are directed toward the substrate which is in motion during the printing process. However, if the heat and light generated by the lamp is directed at a nonmoving substrate for a sufficient amount of time, the substrate is damaged, often to the point of the ignition. Additionally, other nonmoving components of the printing press may be damaged by the high amount of heat generated from the lamps. When the printing press operation must be halted, for example to clear obstructions or replenish ink supplies, the light generated by the lamp must be prevented from impinging the substrate. One way to prevent irradiating nonmoving substrate is to power down the lamp. However, considerable time is necessary for the lamp to generate sufficient irradiation to cure the ultraviolet-sensitive ink when power is restored. Consequently, preventing irradiation from impinging nonmoving substrate when a printing press is halted has been accomplished by housing the lamp in a structure having shutters, which can be opened to allow irradiation or closed to prevent irradiation from leaving the structure.

As stated above, intense heat is generated by the UV lamp during operation. These high-energy lamps require high-voltage and fairly high current, some requiring 3000 volts and 17 amps and may generate temperatures of 1000 degrees Fahrenheit during operation. Consequently, the structures housing these high-energy lamps are subjected to periods of the extremely high temperatures. These high temperatures inescapably cause the metal components of these structures to expand and warp. One consequence of this expansion and warpage is failure of these structures to properly operate.

There is then a need for an ultraviolet module, which can dependably operate when subjected to the intense heat generated by high-energy ultraviolet lamps.

SUMMARY OF THE INVENTION

This invention substantially meets the aforementioned needs of the industry by providing an ultraviolet module capable of functioning when components of the module are expanded and warped by heat generated during operation and which can be readily adjusted without extensive or undue effort or time expenditure.

A cassette style shutter drive assembly has been developed, which operates efficiently when subjected to extremely high heat generated by high-energy ultraviolet lamps. One embodiment has two shutter drive assemblies, each incorporating a clutch, drive train, and other associated components to eliminate problems associated with shutter warpage, drive train component misalignment, as well as other tolerance issues.

Each of a plurality of, e.g., two, shutter drive assemblies incorporates a clutch as well as a set of features designed to eliminate problems associated with shutter warpage, drive train component misalignment, and other malfunctions due to incorrect tolerances. The shutter drive train operates both shutter drive assemblies simultaneously.

A shutter shaft sleeve bearing used as a component of one embodiment of this invention includes integral internal dynamic seal glands and integral external static seal glands. The two external seals are arranged with a coolant drainway therebetween, working in conjunction with a drain port integral to the connection end cap to provide a visual leak path and indicator.

A ball-drive pin engages a slot in the shutter end cap to drive the shutter. Several degrees of freedom are provided by this pin and the shutter end cap slot arrangement, thereby allowing the shutter to warp and change length without inducing undesirable forces on the drive train components. The shutter arm assembly contributes thusly to reliable shutter functionality.

A pair of "indexing" clutches (e.g., one clutch per shutter) has been designed to prevent drive train binding and subsequent drive motor overload. Each clutch is bi-directional, having an adjustable break-point torque to enable automatic re-engagement. The instant clutch also allows for shutter retiming (synchronization). Each worm gear may be positively secured to a shutter shaft using a special two-piece clamp collar and a drive pin, which engages the worm gear. An angled shoulder on the collar abuttingly mates to an angled rib on the shutter shaft. These two features cooperate to function as a circumferential wedge. When the clamp fasteners are tightened, the worm gear is firmly secured in place. Loosening the fasteners on both shutter drive assemblies accordingly allows the gears to be oriented as required to time or synchronize the shutters to work together properly.

The worm gear is secured to the shutter shaft in a positive manner by using a two-piece clamp collar and a drive pin. The two-piece collar clamps securely to the shutter shaft. The drive pin protrudes from the collar to engage a slot in the worm gear. The collar also features an angled shoulder which mates to an angled rib integral to the shutter shaft. These two features serve as a circumferential wedge. As the fasteners securing the two-piece collar to the shutter shaft are tightened, the worm gear is wedged toward a bearing-retaining nut. The gear is then tightly clamped between the clamp collar and the nut. The combination of the two-piece clamp collar, drive pin, and wedge-induced clamping action serves to firmly secure the worm gear in place and correctly positions the worm gear relative to the worm. This arrangement allows all worm gear teeth remain fully intact and functional so that the worm gear may rotate fully in accordance to the requirements for proper clutch operation.

The shutter shafts and the exhaust shutter pivot shafts function as bearing surfaces for the shutter end cap bearings as well as for O-rings and sealing surfaces for the shutter end cap bearing seals.

An integral stop is built into the center of the lower end cap to prevent either of the shutters from over-traveling or contacting the UV lamp. The stop works equally well for all contemplated manual and automatic operations.

A pair of sensors monitors the "open" and "closed" positions of each shutter. These sensors are activated by a magnet embedded in the shutter shaft arm and are mounted so as to minimize contact with hot module components. The sensor/magnet arrangement provides for a range of sensor sensitivity. Once the sensitivity of the sensor/magnet arrangement is adjusted as desired, sensitivity is unaffected by changes in shutter length, shutter axial position, shutter radial position, or shutter warpage.

A drain hole in the connection end cap assembly may be ported outside the instant module, thereby visually indicating the existence of an internal leak. The drain hole may also direct leaking coolant away from electrical components to reduce the likelihood of detrimental high-energy short circuits.

The water poppet valve may have a double-seal arrangement. Accordingly, the instant water poppet valve may be essentially drip-free during module installation, removal, and post-removal. This high-flow valve fits into a restricted amount of space and functions in conjunction with a rotating shutter shaft and its integral coolant passageway.

Shutter end cap material is matched to the shutter extrusion material to minimize galvanic and corrosive effects. The shutter end cap includes a special coolant passageway, which doubles as a reservoir and cooperates with other features to cool the stem of the UV lamp, as well as other components.

The bearing/seal arrangement in the shutter end caps allows for nominal flexing, thermal expansion/contraction, warpage, and dimensional variations of the shutter assembly without sacrificing fluid-tight integrity or inducing adverse forces on seals and shutter drive train components. The instant bearing features a narrow, centrally located load-bearing surface that is sealed on either side by a pair of integral seal glands fitted with O-rings. The O-rings help to distribute the bearing loads and the outer seal also serves as a wiper. The bearing arrangement also provides for important freedom of motion for the shutter assembly relative to these shutter shafts. The bearing further acts as a heat sink and a heat transfer element further cooling the stem of the UV lamp and other components.

In one embodiment, the lamp connector of this invention is a two-piece assembly, thereby allowing easier and more reliable assembly of the high-voltage socket and lead wire. Additional insulation may be present around the high-voltage wire entryway and around the socket opening. The increased insulation results in a longer and a less direct electrical leak path to thereby reduce the chance of a high-energy short circuit.

Both lamp connector assemblies may be spring-loaded against the lamp. This spring-loading encourages higher and more consistent electrical conductivity, maintains full pin-socket engagement during aggressive module installations, allows for more relaxed dimensional tolerances for manufacturing the UV bulb, and minimizes high-energy short circuits.

Special non-conductive, screw-ferrules may be used as a mechanical backup to thereby secure the high voltage pin and socket connectors into the electrical connection block. The ferrules also allow for easier pin and socket servicing.

Coolant plugs with integral sacrificial zinc anodes may be installed directly in the coolant flow path inside the module to prevent corrosion in the coolant passage ways. The anodes may be shaped to reduce flow restrictions.

The shutter end caps may have a relieved reflector mounting surface. This feature provides better UV protection for the ring located in the shutter body/shutter end cap interface and eliminates the need for custom-fit reflector strips.

The reflectors may be removed and installed without removing the shutter end caps and without breaking the fluid-tight integrity of the shutter assembly. Only the retaining strip needs to be removed to exchange a reflector.

The design of the instant module produces a full length, uninterrupted, properly shaped reflector supporting surface. This design further provides for quicker reflector replacement and allows the use of convenient pre-cut reflectors.

In one embodiment, the original female V-shaped reflector retainer profile has been modified to include a shallow U-shaped channel. This helps to prevent shutter-to-shutter binding when the shutters are closed. The U-shaped channel does not reduce the effectiveness of how well the closed shutters block light.

The coolant cross over feature may be incorporated into the upper module of this invention to facilitate easier and less expensive manufacturing and assembly. The cross over cavity doubles as a substantial reservoir to provide better component cooling.

A slide-out mount for the electrical connection assembly is located in the connection block and may be easily removed to provide better and quicker service. Special three-dimensional locating features provide the precise alignment required for optimum module performance.

The dove-tailed edge design of the shutter drive train access doors allows the doors to be easily removed with a minimum of module disassembly.

The stub bayonet shafts act as precision two-dimensional locating dowel to provide optimum functionality to the poppet valves and electrical connections.

The latch rod has locating features at the latch-end and provides accurate axial positioning of the poppet valve components and the electrical connections.

The spring-loaded latch provides precise axial alignment of the instant module to the connection block of this invention. When combined with the stub bayonets and the latch rod left, a precise three-dimensional module-to-module connection block docking is easily achieved to provide for optimum module performance.

It is understood that the above-described figures are only illustrative of the present invention and are not contemplated to limit the scope thereof.

DETAILED DESCRIPTION

Unless otherwise defined, all technical terms used herein have the same meaning as commonly understood by one of ordinary skill in the art to which this invention belongs. Although methods and materials similar or equivalent to those described herein can be used to practice the invention, suitable methods and materials are described below.

Any references to such relative terms as front and back, right and left, top and bottom, upper and lower, horizontal and vertical, or the like, are intended for convenience of description and are not intended to limit the present invention or its components to any one positional or spatial orientation.

Each of the additional features and methods disclosed herein may be utilized separately or in conjunction with other features and methods to provide improved devices of this invention and methods for making and using the same. Representative examples of the teachings of the present invention, which examples utilize many of these additional features and methods in conjunction, will now be described in detail with reference to the drawings. This detailed description is merely intended to teach a person of skill in the art further details for practicing preferred aspects of the present teachings and is not intended to limit the scope of the invention. Therefore, combinations of features and methods disclosed in the following detailed description may not be necessary to practice the invention in the broadest sense, and are instead taught merely to particularly describe representative and preferred embodiments of the invention.

Figure 1:
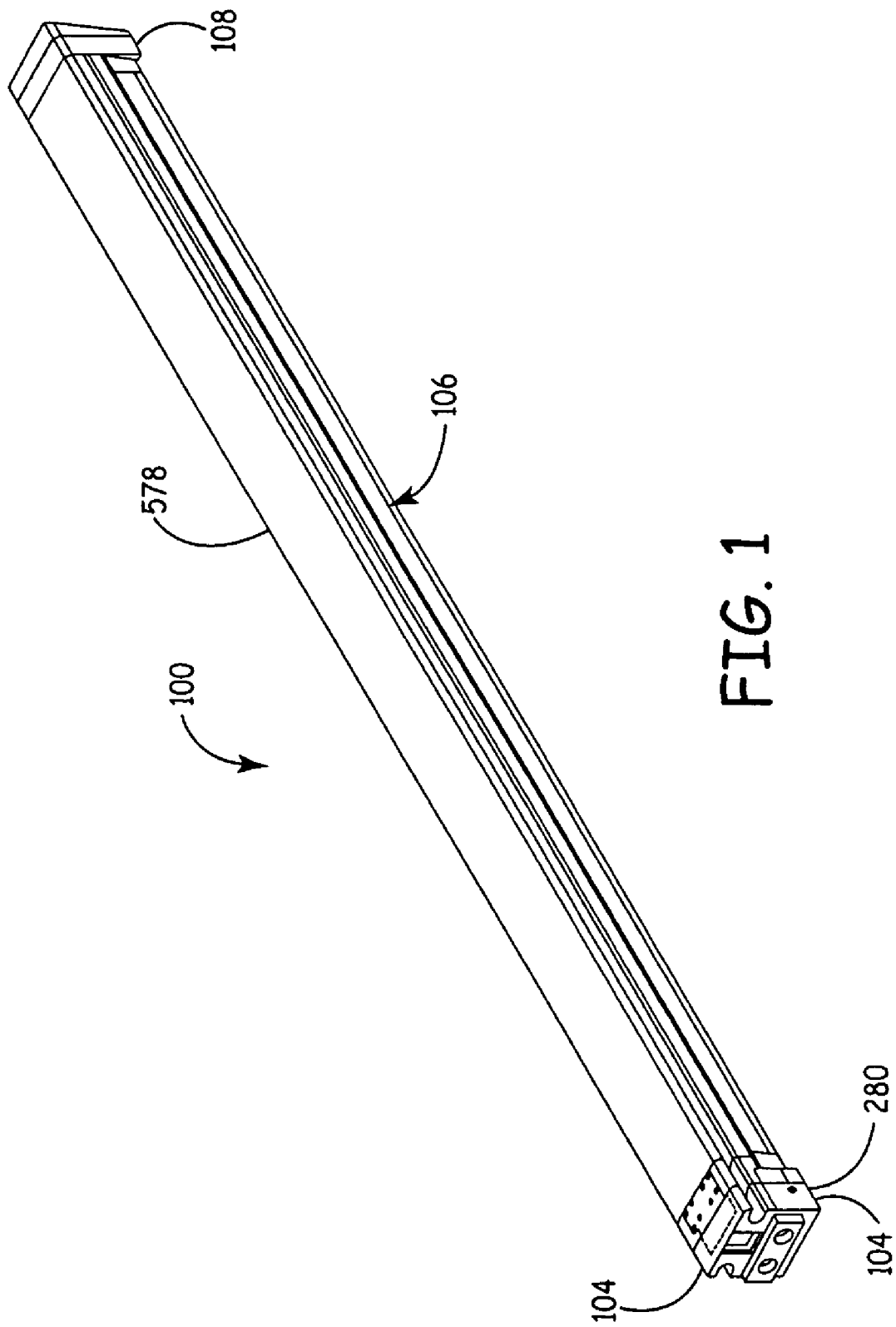
FIG. 1 is a top isometric view of one embodiment of the UV module of this invention.
Figure 2:
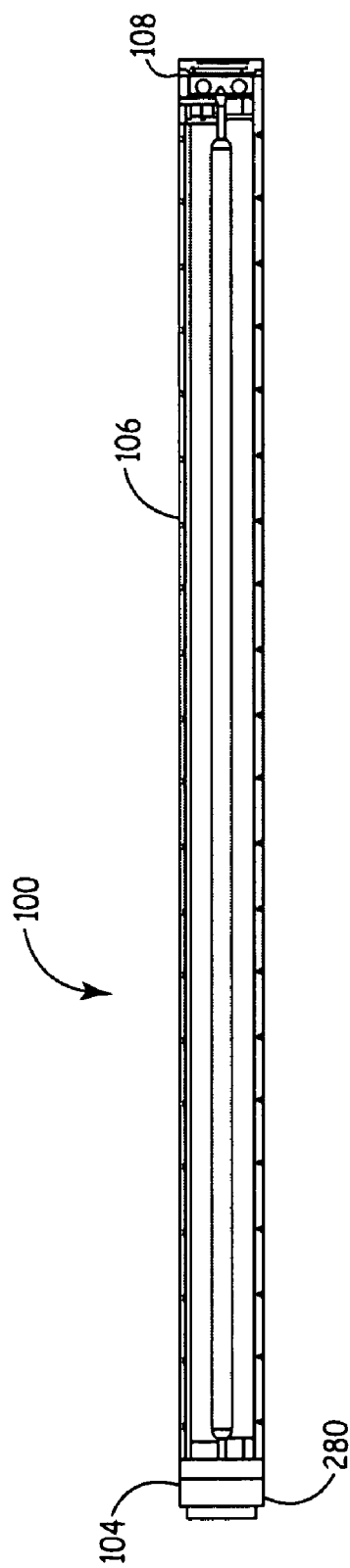
FIG. 2 is a bottom view of the UV module of FIG. 1.
Figure 4:
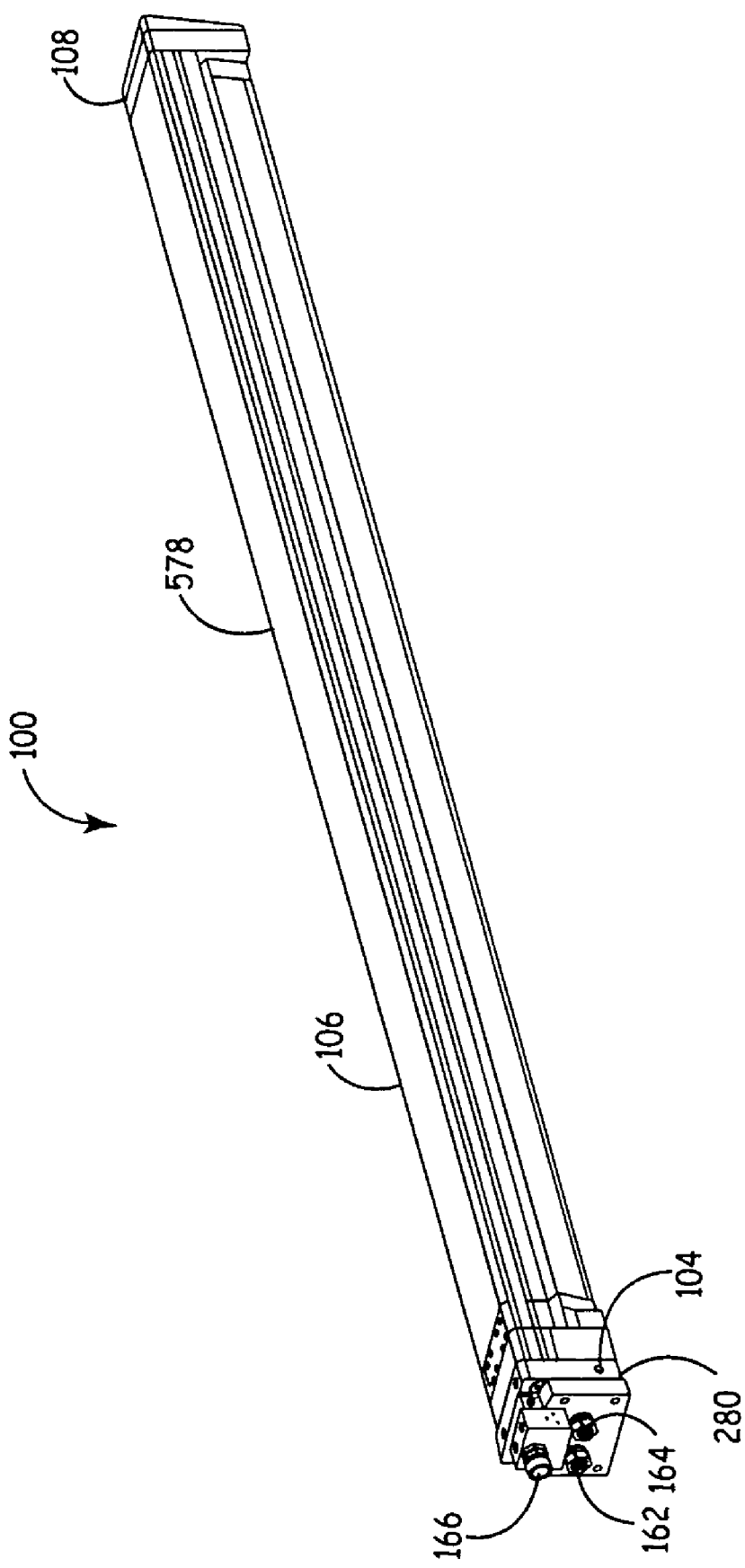
FIG. 4 is a perspective view of the module of FIG. 1 docked to the connection block of FIG. 3.

One embodiment of the ultraviolet (UV) module of this invention is shown in FIGS. 1 and 2, and particularly in FIG. 4, at 100 and includes an optional connection block assembly 102, a connection end cap assembly 104, a shutter assembly 106, and an exhaust end cap assembly 108.

Referring now to FIGS. 3, 31, 32, and 33, the connection block assembly 102 has a connection block 120, a slide-out mount 122, an electrical (or socket) connection subassembly 124, a poppet valve connection block 126, and stub bayonets 130, 132.

Figure 32:
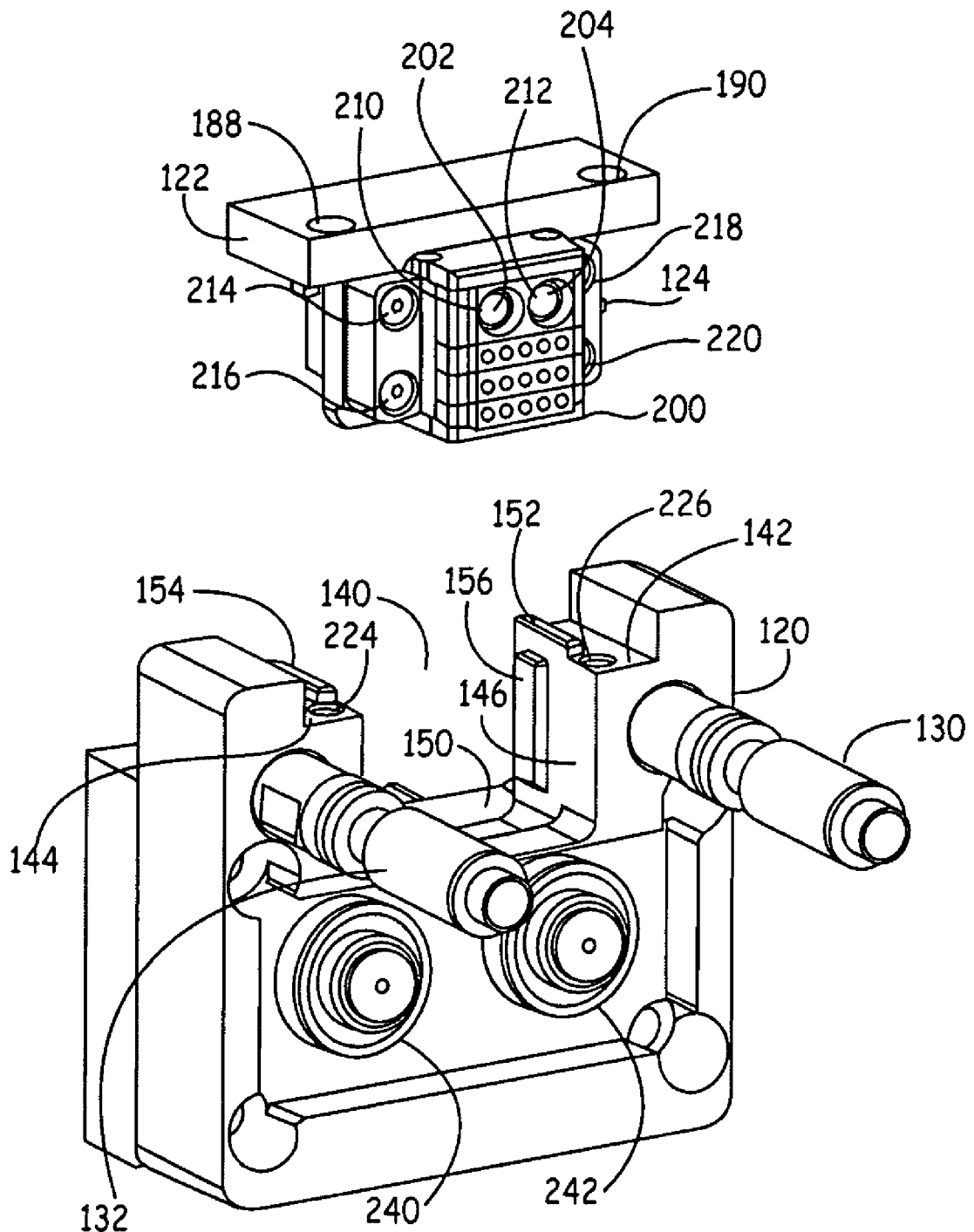
FIG. 32 is a perspective view of one embodiment of the slide-out mount of this invention shown removed from one embodiment of the connection block of this invention.

As best seen in FIG. 32, the connection block 120 defines a stepped opening 140, with horizontal surfaces 142, 144 facing vertical surfaces 146, 148 (not shown) and a lower horizontal surface 150. Locating structures such as extensions 152, 154 from the horizontal surfaces 142, 144 and extensions 156, 158 (not shown) from the vertical surfaces 146, 148 may be present.

Figure 3:
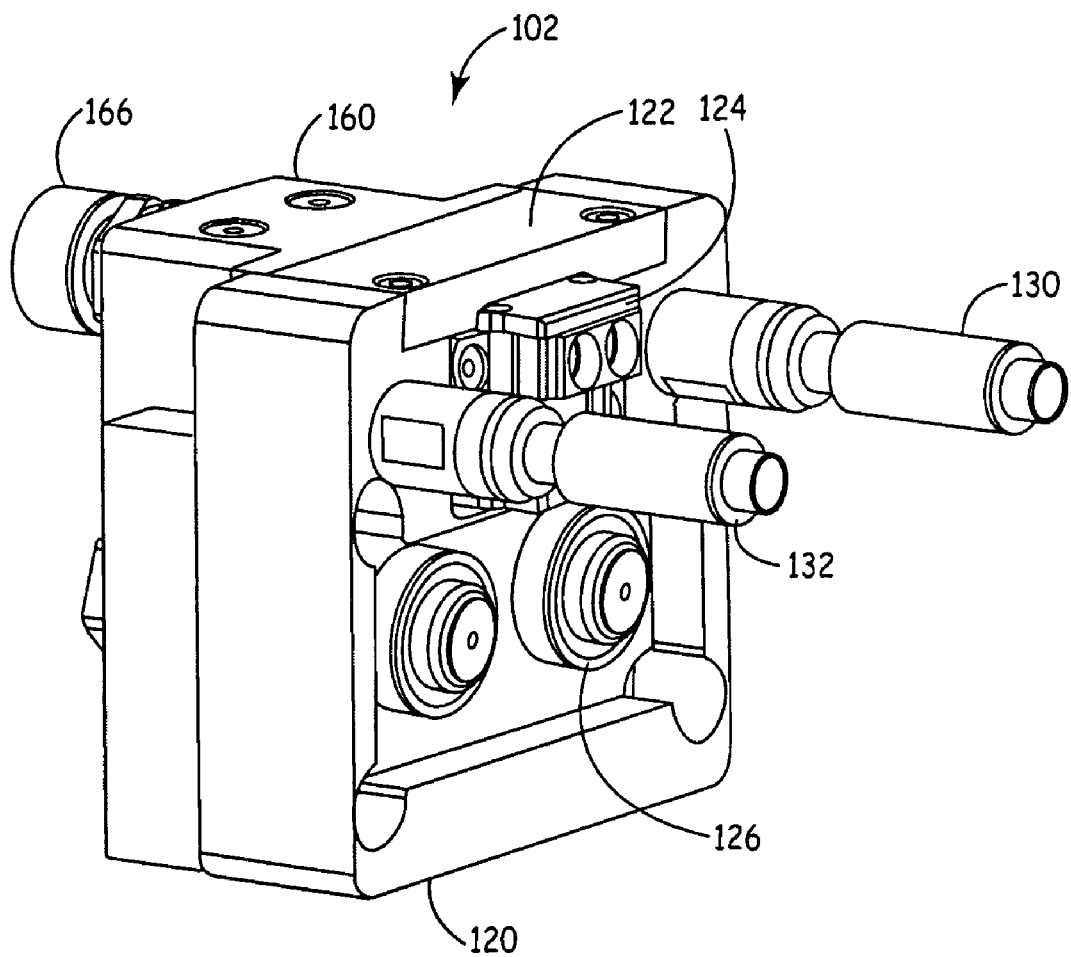
FIG. 3 is a top, isometric view of the connection block of this invention.
Figure 31:
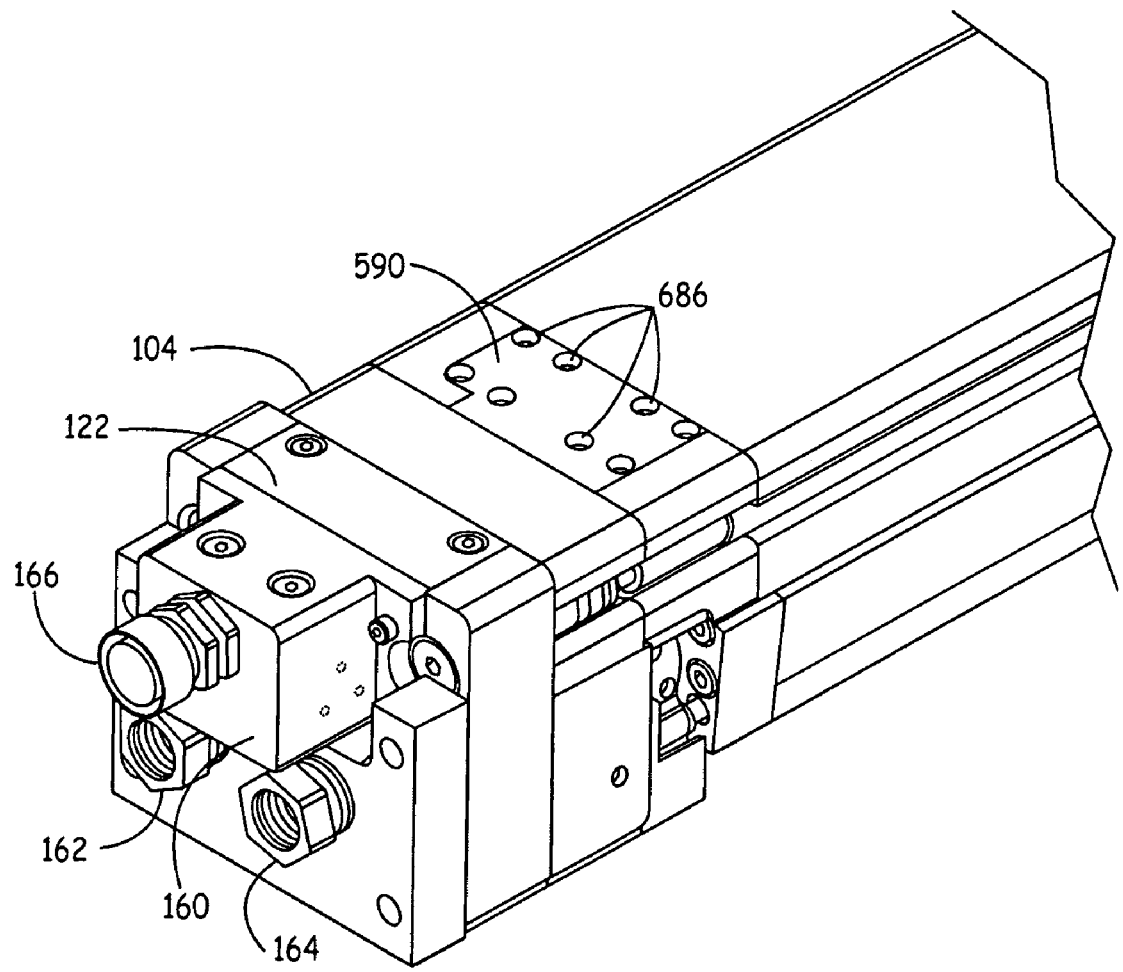
FIG. 31 is a perspective view of one embodiment of the UV module of this invention showing slide-out mount detail.

Referring to FIGS. 3 and 31, an optional attachment block 160 is depicted. The attachment block 160, in the embodiment shown, has fluid attachment features (e.g., fittings) 162, 164 and an electrical attachment fixture 166. One of the fluid attachment fixtures 162, 164 connects to a source of ingressing fluids to cool the instant UV module during use and the other of the fluid attachment fixtures 162, 164 serves as a conduit for egressing coolant fluids therefrom. When attached to the connection block assembly 102, the attachment block 160 provides for electrical and fluid supply to the UV module of this invention. While shown oriented generally horizontally to the instant UV module, a person of ordinary skill in the art will readily recognize that the coolant and electrical attachment fittings 162, 164, 166 may be vertically oriented as well, due to space constraints and the like. Moreover, a person of ordinary skill in the art will readily recognize that fluids and electricity may be supplied to the UV module of this invention by other means as well. A person of ordinary skill in the art would further recognize that UV modules without a system or assembly for circulating coolant are also within the scope of this invention, for example, if sources of UV radiation are used which do not generate appreciable amounts of heat. One example of such a UV source is an LED emitter.

Figure 33:
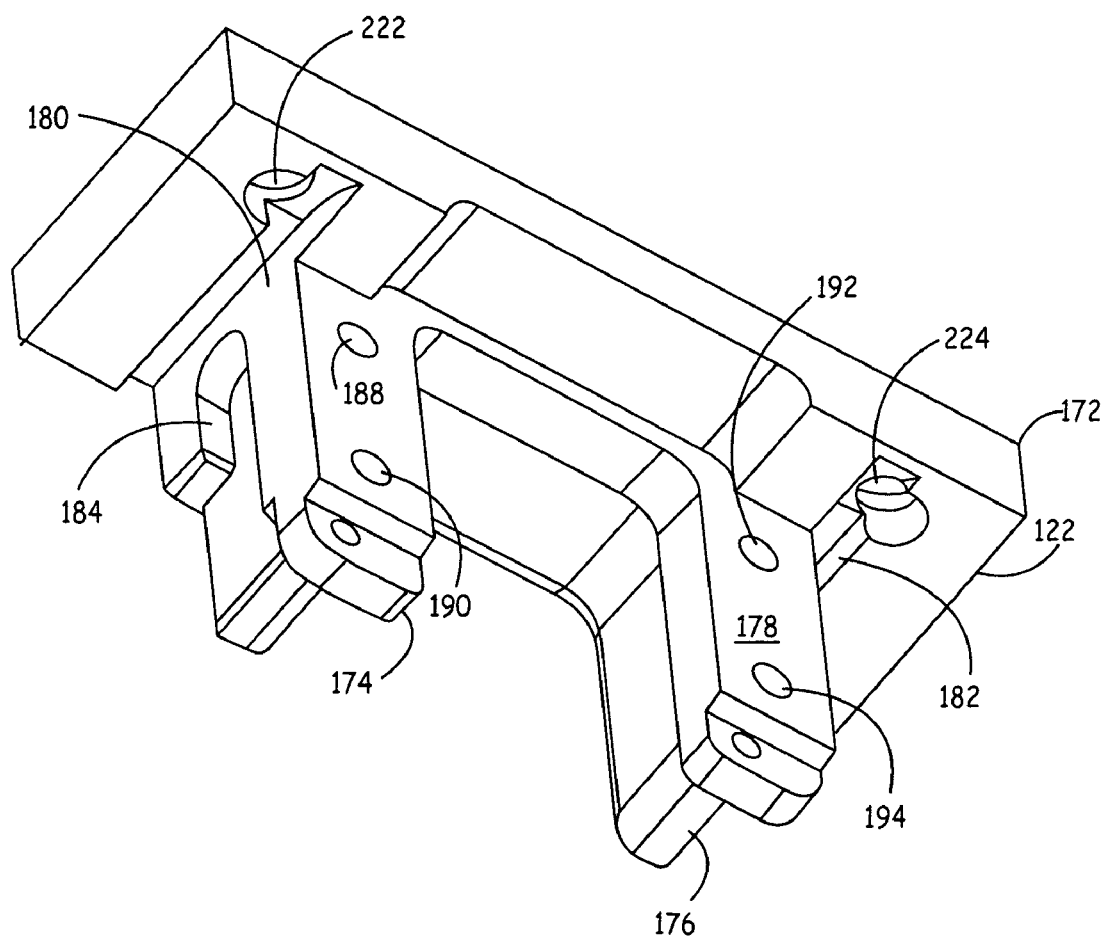
FIG. 33 is a perspective view of the slide-out mount of FIG. 31.

As seen in FIG. 33, the slide-out mount 122 includes an upper member 172 and unitary (or otherwise integral) extensions 174, 176 extending from the upper member 172. An electrical connection assembly mounting face 178 is defined by the extensions 174, 176 and a lower portion of the upper member 172. Locating features are functionally defined as slots 180, 182, each defined in a lower portion of the upper member 172 adjacent each extension 174, 176. Further locating features include slots 184, 186 (slot 186 not shown) defined in outboard surfaces of the extensions 174, 176. Threaded apertures 188, 190, 192, 194 are present in the extensions 174, 176.

The instant slide-out mount for electrical connection assembly, located in the connection block docking with the module, may be conveniently attached to and removed from the attachment block 160 to facilitate assembly and disassembly. Due to the facilitated attachment and removal, the slide-out mount also significantly reduces servicing time. Locating features in this slide-out mount provide the precise three-dimensional alignment required for optimum module-to-connection block interface performance (FIGS. 31, 32, 33).

Figure 42:
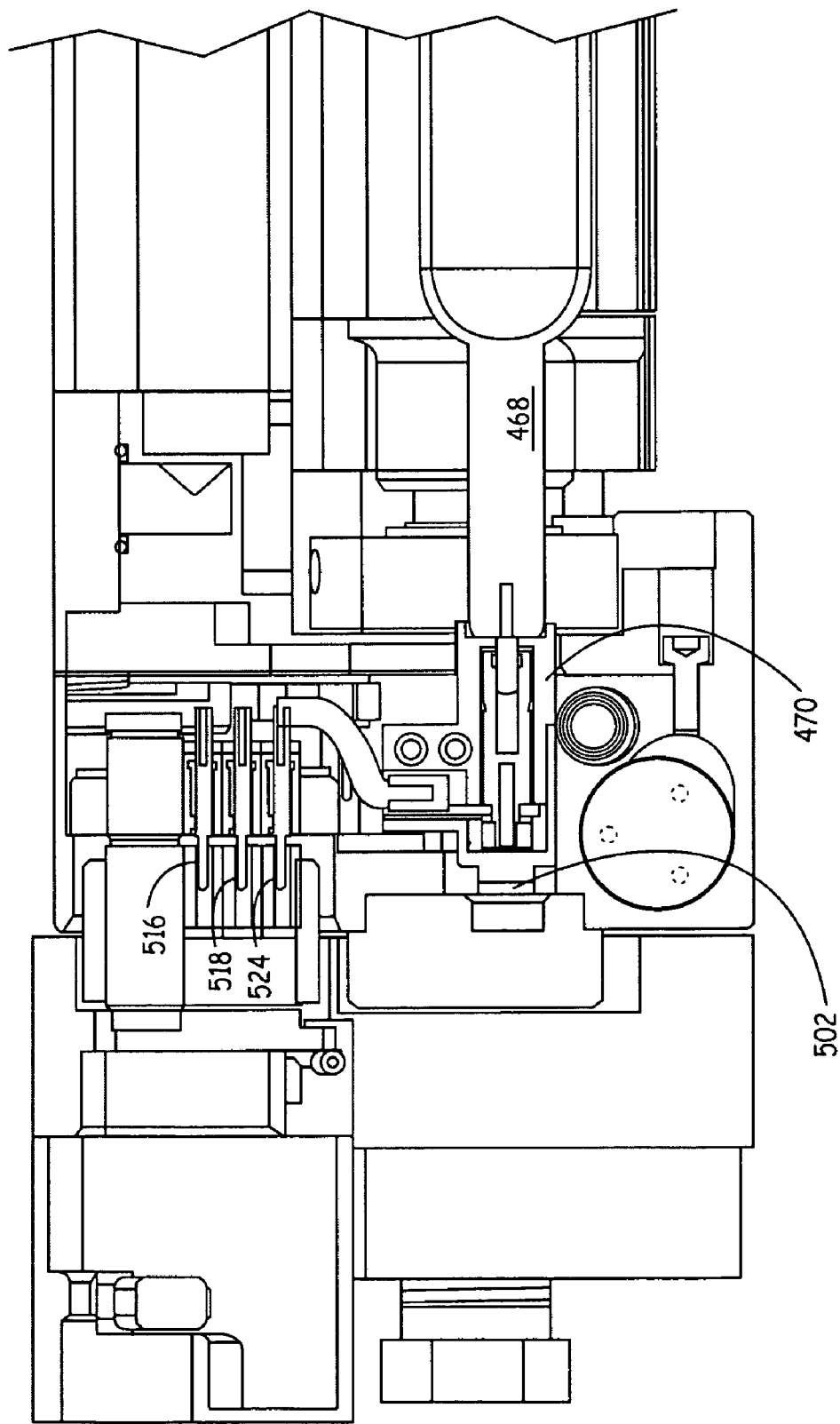
FIG. 42 is a sectional view of one embodiment of a spring-loaded lamp connector of this invention, biased against a lamp.
Figure 43:
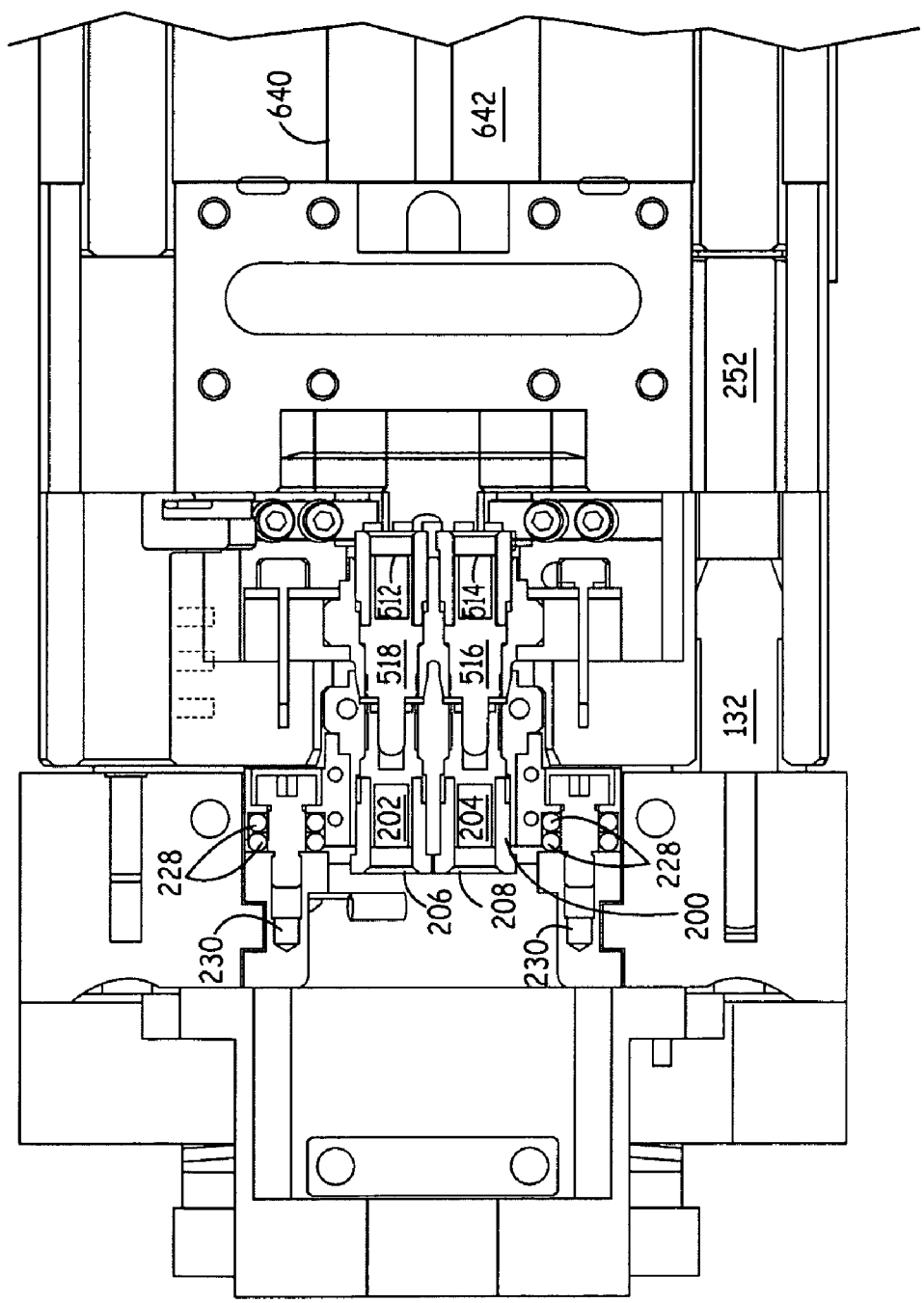
FIG. 43 is a sectional view of one embodiment of a high voltage pin/socket arrangement of this invention.
Figure 44:
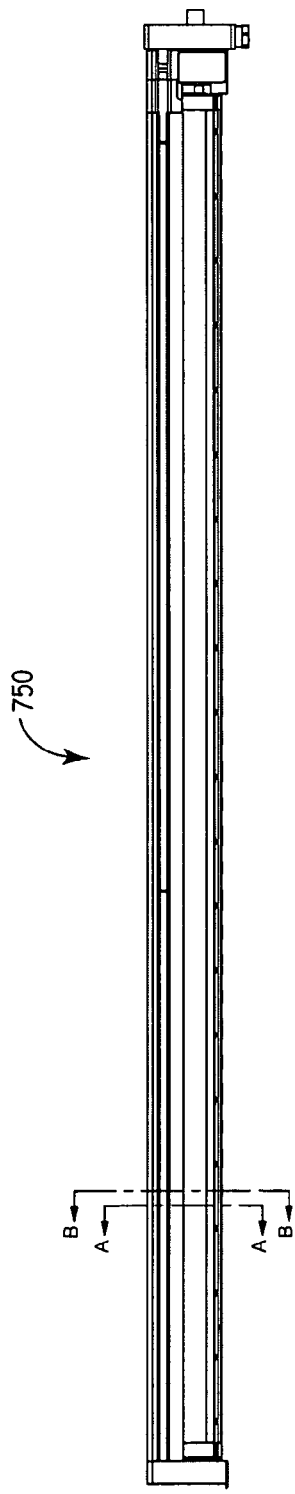
FIG. 44 is a side view of the UV module of this invention depicting another embodiment of the positive and negative retaining strips of this invention.
Figure 46:
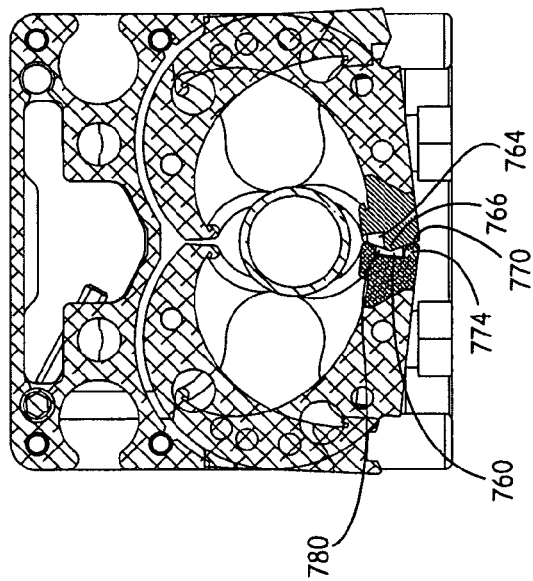
FIG. 46 is a sectional view along line B-B of FIG. 44.
Figure 45:
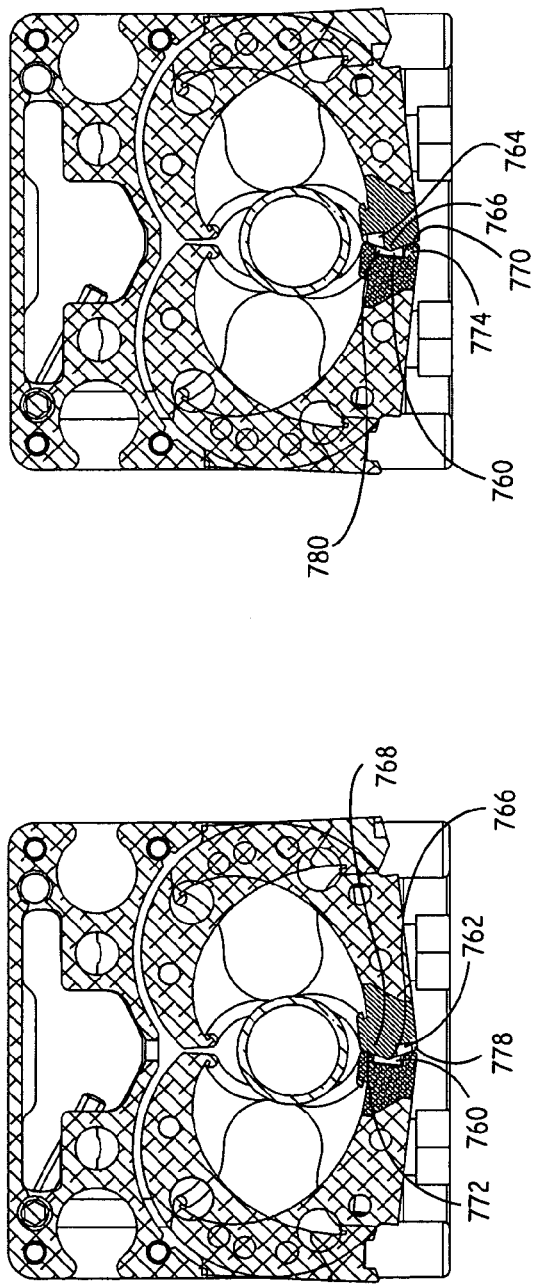
FIG. 45 is a sectional view along line A-A of FIG. 44.

As viewed in FIGS. 3, 15, 33 39, 42, and 43, and especially in FIGS. 32 and 43, the socket connection block subassembly 124 has a housing 200, which encloses sockets 202, 204 and ferrules 206, 208. In one embodiment, the ferrules 206, 208 are made from a non-conductive material and are threaded into openings in the connection block housing 200, thereby securing the sockets 202, 204 within the housing 200. The sockets 202, 204 are accessed by means of openings 210, 212 in the housing 200. The socket connection block 124 is secured to the slide-out mount 122 by threading fasteners through apertures 214, 216, 218, 220 present in the housing 200 and into the apertures 188, 190, 192, 194 (present in the slide-out mount extensions 174, 176). While two sockets 202, 204 are depicted and described, a person of ordinary skill in the art would readily recognize that more sockets may be present, e.g., to accommodate other voltages. As seen in FIG. 43, at least one, e.g., a pair of elastomeric elements, such as O-rings 228, are optionally disposed between the electrical connection block subassembly 124 and the slide out mount 122 when the electrical connection block subassembly 124 is attached to the slide out block 122 using fasteners, such as shoulder screws 230. While O-rings 228 are depicted as being secured by each of the shoulder screws 230, this may not be the case in other embodiments of this invention. For example, one or more of the O 228-rings may be secured in a pair of diagonal or opposing corners. The elasticity of the O-rings enables the connection block subassembly 124 to move slightly during docking. Consequently, the elastomeric characteristics of the O-rings, when present, maintain the electrical connection subassembly 124, hence the connection block assembly 102, in a position such that the sockets are centered or positioned to receive the pins when connecting the connection block assembly 102 to the remainder of the instant UV module, as more fully described below. Upon engagement of the connection block assembly to the remainder of the module, the elasticity of the O-rings 228 ensures that the electrical connection pins can slide into their respective sockets without misalignment due to the ability of the electrical connection subassembly 124 to displace within the limits of the elasticity of the O-rings 228. Accordingly, initial misalignments of the sockets and pins are corrected during connection or docking or whenever the connection block assembly 102 is not completely engaged to the remainder of the UV module. In UV modules of the prior art, the absence of the elastically enabled or self-correcting alignment sometimes resulted in misalignment of pins and sockets when connecting the connection block assembly to the remainder of the UV module. Consequently, the pins were not completely seated in the sockets and the electrical connections were incomplete and arcing sometimes occurred between the misaligned sockets and pins. Additionally, the sockets and/or pins were bent or damaged due to the misalignment. In other embodiments of the prior art, the connection assembly was spring mounted, thereby resulting in an attenuated ability to maintain the desired centered position. Consequently, the pins were sometimes ejected from their mounts when engaging the sockets. Ejection of pins often caused mechanical damage to the pins or sockets, arcing, and occasionally fires from the arcing. The foregoing self-centering feature of the instant electrical connection subassembly functions in conjunction with the precision dowel feature of the stub bayonets (described below) of the UV module of this invention to ensure that connecting elements of the connection block assembly 104 are properly aligned with corresponding elements of the remainder of the instant UV module.

Referring to FIGS. 32, 33 the rear surface of the electrical connection subassembly 124 contacts the electrical connection assembly mounting face 178 of the slide-out mount 122. The modular slide-out mount 122 is attached to the connection block 120 by disposing the slide-out mount 122 into the opening 140, such that extensions 152, 154 are disposed in slots 180, 182 and such that extensions 156, 158 are located in slots 184, 186. When the slide-out mount 122 is disposed in the opening 140 as described, apertures 188, 190 in the slide-out mount 122 are aligned with threaded apertures 224, 226 (defined from surfaces 142, 144 of the connection block 120). Accordingly, the slide out mount 122 can be secured in place by threading fasteners through the foregoing aligned apertures. While the connection block of this invention is depicted as having electrical connection sockets, it should be appreciated that electrical pins could be present in place of the sockets, so that electrical connection pins shown below as present in the pin connector assembly could be replaced by sockets.

Figure 16:
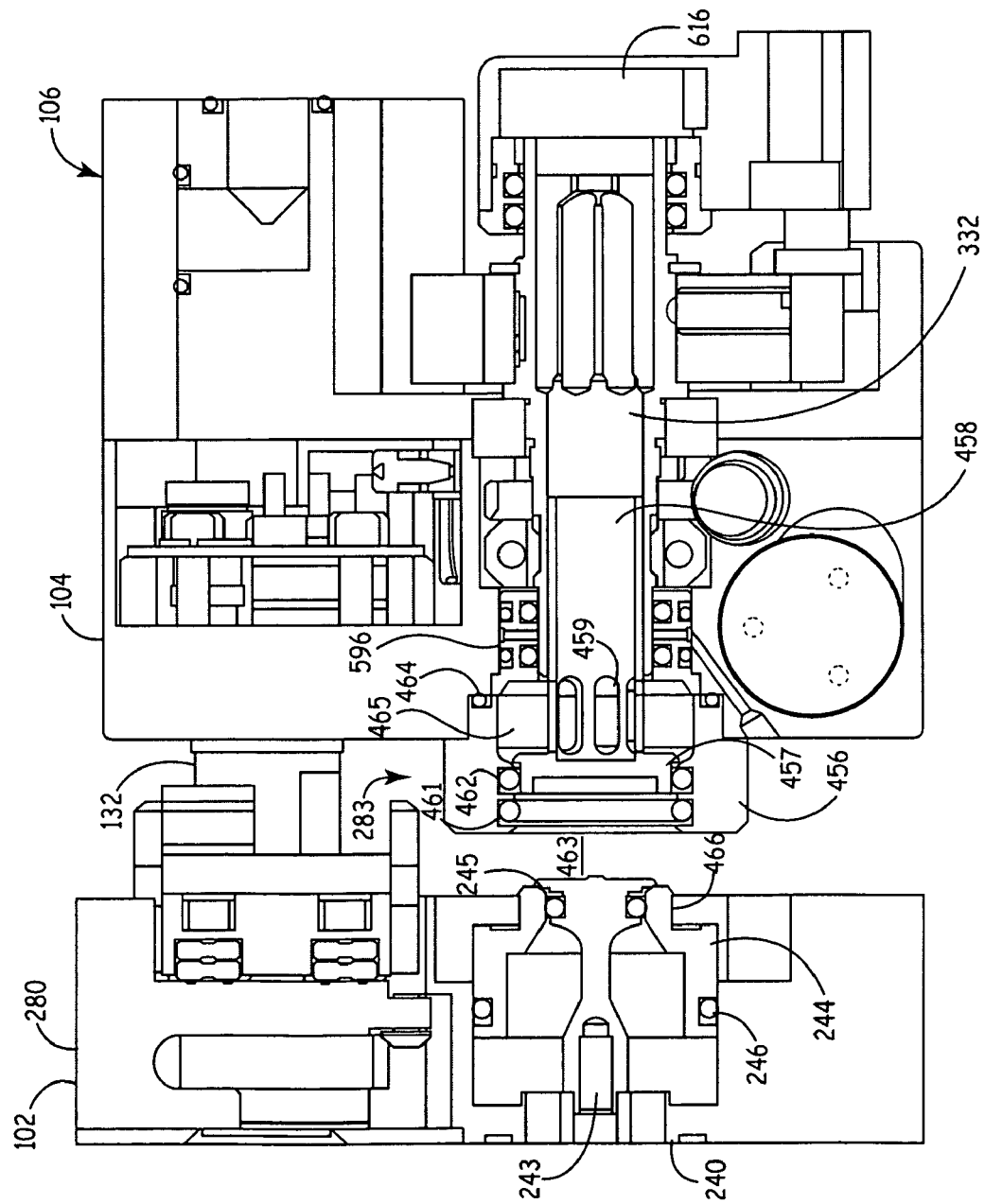
FIG. 16 is a sectional view of one embodiment of the poppet valve of this invention, prior to docking.
Figure 17:
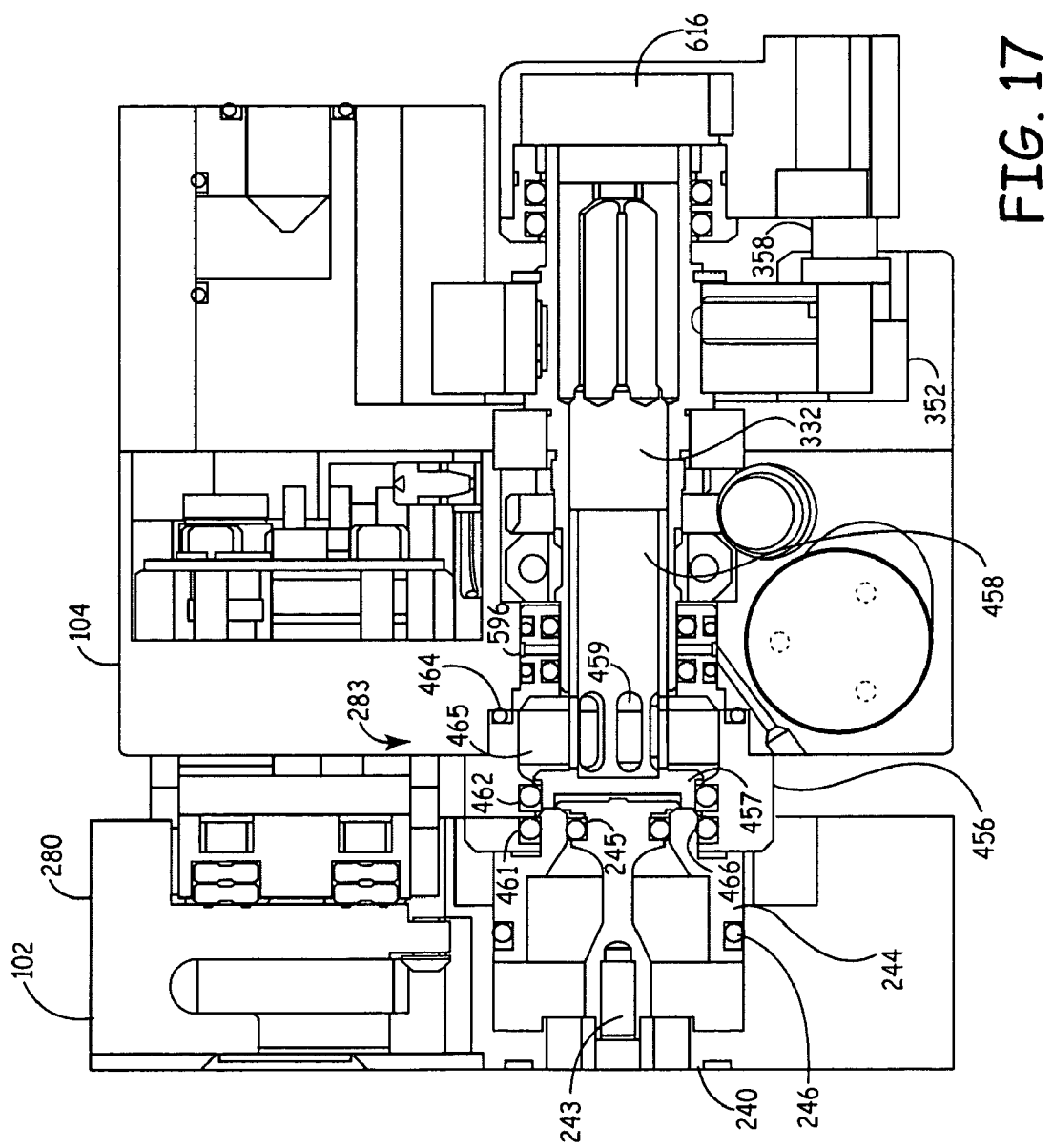
FIG. 17 is a sectional view of the poppet valve of FIG. 16 during mid-docking.
Figure 18:
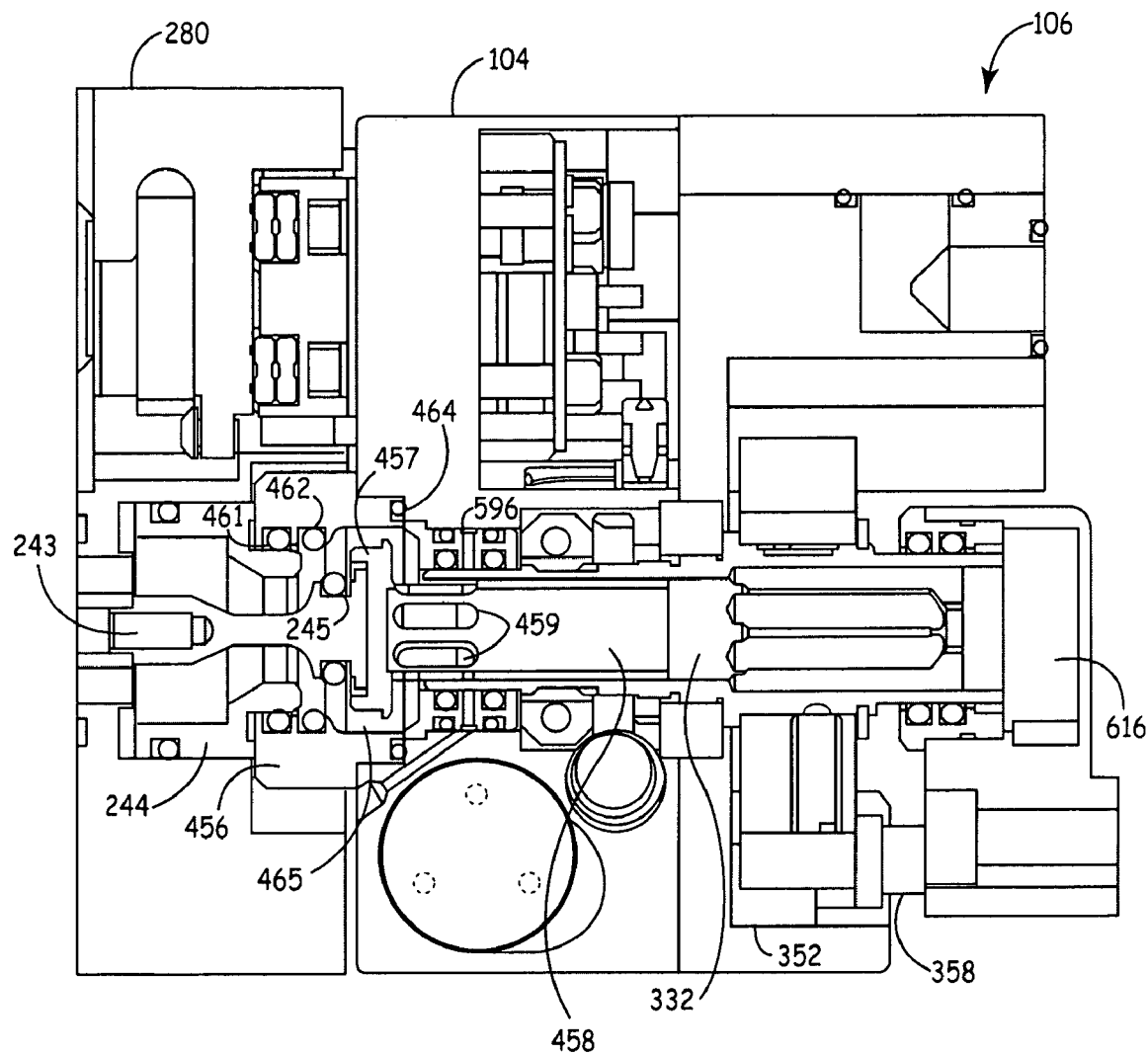
FIG. 18 is a sectional view of a poppet valve of FIG. 16 fully docked.

As seen in FIG. 32, the poppet valve connection block 126 includes high flow water poppet valves 240, 242, which are housed in the connection block 120. Referring now to FIGS. 16, 17, and 18, each of the poppet valves 240, 242 (poppet valve 240 shown) has a water stem 243 axially retained within a water sleeve 244. A water stem seal 245 is disposed about an inner surface of the water sleeve 244. An exterior seal 246 is disposed about a central portion of the water sleeve 206. A spring (not shown), also present within the water sleeve 206, urges the water sleeve 244 to the right (from the perspective of FIG. 12).

The water poppet valve of this invention has a double seal arrangement provided by seals 245, 246 (FIGS. 3, 5, 16-18). The double seal provides a virtually drip-free connection during module installation, as well as a drip-free connection when the instant module is undocked. Stated otherwise, all components are closed during initial module engagement to the connection block and again closed prior to final disengagement from the connection block. Accordingly, very little, or no, fluid escapes the valve when the instant module is being installed or removed. The instant poppet valve, in contrast to other known poppet valves, functions in conjunction with a rotating shutter shaft, the rotating shutter shaft doubling as a coolant passage way.

Figure 38:
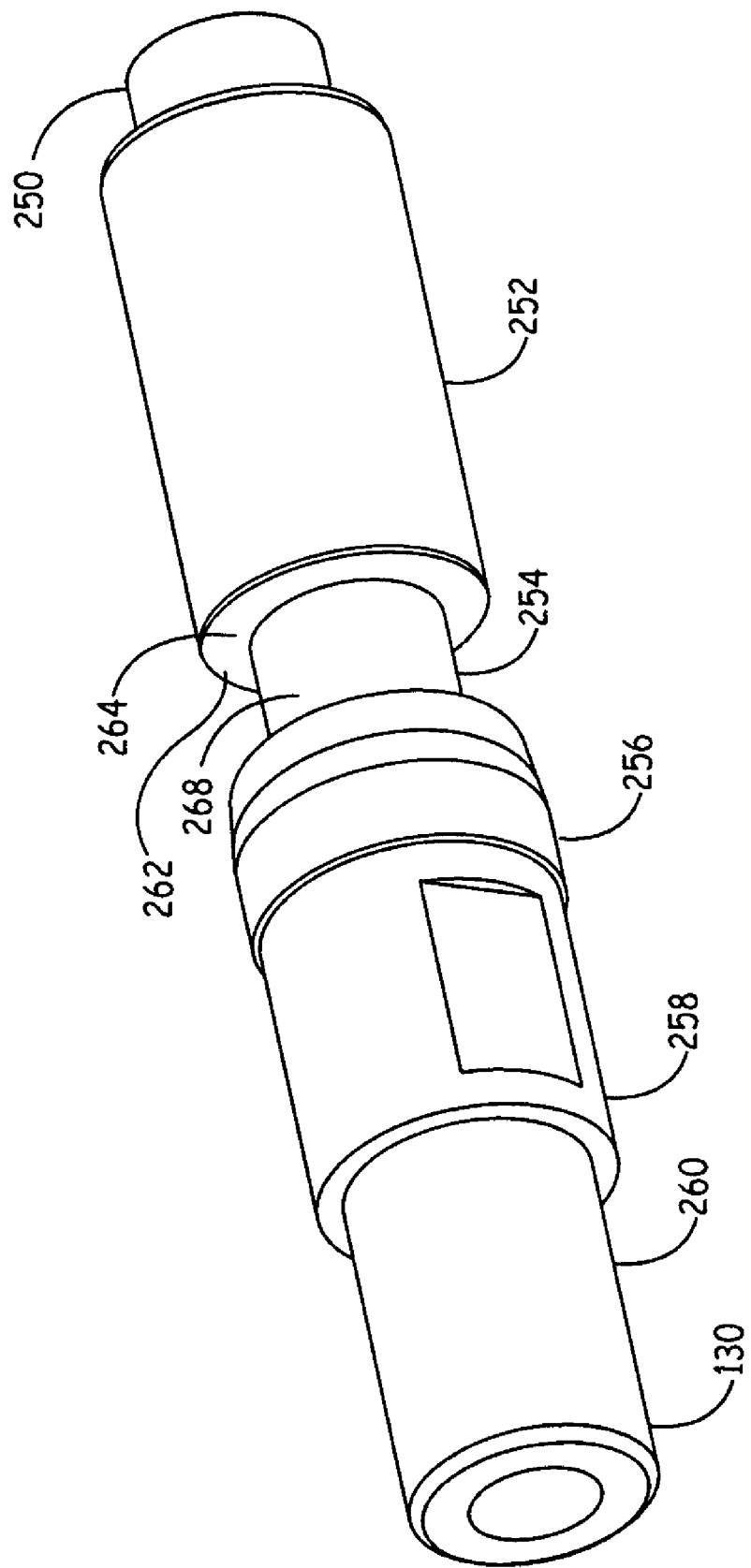
FIG. 38 is a perspective view of one embodiment of the stub bayonet of this invention.

FIGS. 3, 32, and 38 depict the present stub bayonets 130, 132, which may unitarily (or otherwise integrally) have six cylindrical portions. A first cylindrical portion 250 adjoins a second cylindrical portion 252, the second cylindrical portion 252 with a greater diameter. A third cylindrical portion 254 has a smaller diameter than either of flanking portions 252, 256. The increased diameter of the cylindrical portion 256 produces a tapered (or stepped) "precision dowel surface," as more fully explained below. A diameter of the stub bayonets 130, 132 continues to decrease (taper) at cylindrical portions 258, 260. A latch mating surface 262 is defined by facing surfaces 264, 266 (surface 266 not shown) and 268. The function of the latch mating surface 262 is more fully described below. The cylindrical portion 260 is secured within the connection block 120, as depicted in FIG. 3.

The two stub bayonet shafts guide, support and dock the connection block assembly as it is attached to, and functions with, the remainder of the instant UV module. Due to the close concentric tolerances required for optimum functionality of the water poppet valves and the electrical connections, a short section of the stub bayonets is slightly increased in diameter to act as a pair of precision locating dowel pins. This feature accurately docks the module to the connection block. The two-dimensional (up/down and side-to-side) mating precision resulting from this dowel effect enables increased flow through the water poppet valves and eliminates the pin and socket ejection problems associated with misalignment. When the precision dowel locating effect is combined with the axial (in/out) positional control gained from the instant latch rod and the instant spring-loaded docking latch (as more fully explained below), optimum functionality of the poppet valves and the electrical connections are achieved (FIGS. 3, 38-41).

Referring to FIGS. 1, 2, 4, 5, 10 and 16, the connection end cap assembly 104 is enclosed in a housing 280 and includes a shutter drive train assembly 282, a connection end cap valve assembly 283, an end cap electrical assembly 284, and an end cap latch assembly 286.

Figure 10:
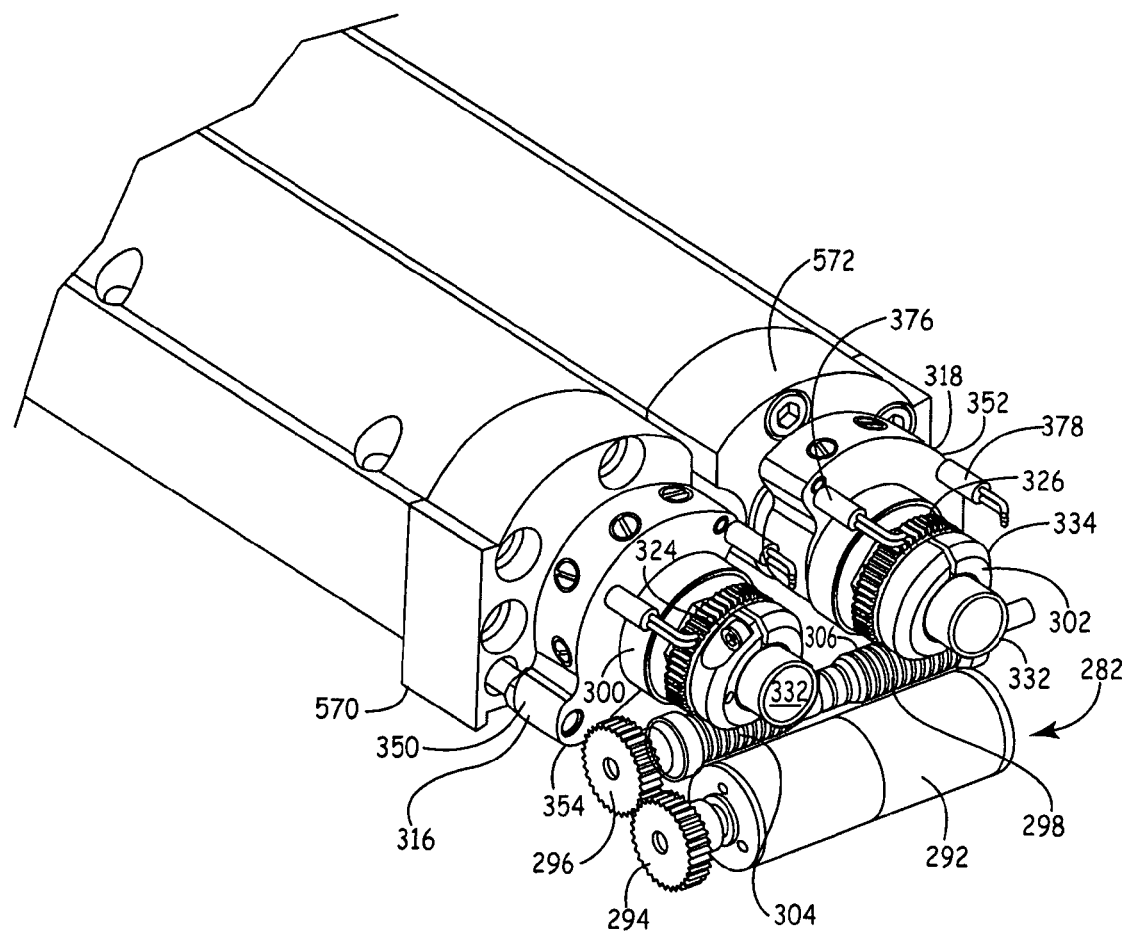
FIG. 10 is a perspective view of one embodiment of the shutter drive train of this invention.
Figure 14:
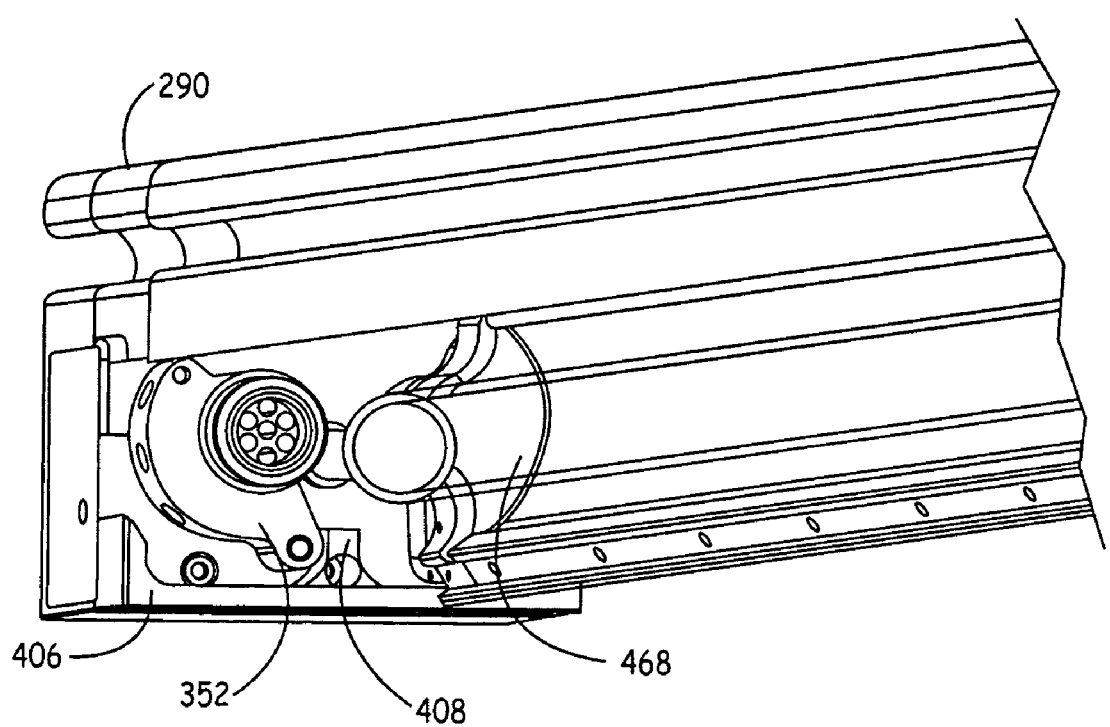
FIG. 14 is a perspective view of the lower end cap showing an integral stop of one embodiment of the module of this invention.
Figure 15:
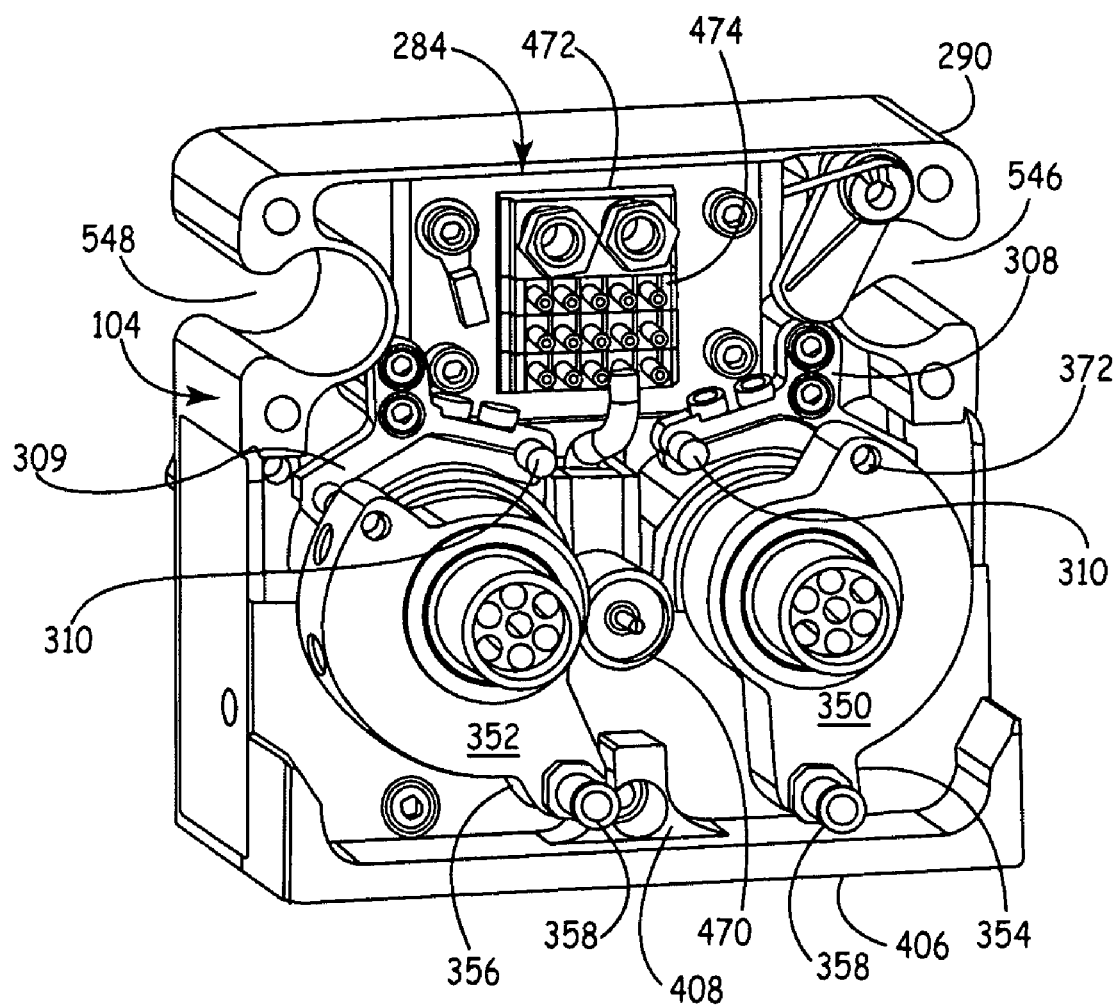
FIG. 15 is a perspective view depicting shutter position sensors of this invention as mounted in the instant connection end cap assembly.

As best viewed in FIG. 10, the shutter drive train (assembly) 282 includes a connection end cap 290 (as seen in FIG. 14), a drive gear motor 292, first and second spur gears 294, 296, a worm shaft 298, and left and right shutter drive subassemblies 300, 302. However, in some embodiments, the instant drive train may be considered to include connection shutter end caps 570, 172 (discussed below). The drive gear motor 292 rotates the spur gear 294 which, in turn, rotates the spur gear 296. The spur gear 296 is attached to, and rotates, the worm shaft 298. The worm shaft 298 has respective left and right hand segments 304, 306, which, in turn, rotate the shutter drive subassemblies 300, 302, as more fully explained below. However, a person of ordinary skill in the art will recognize that the shutter shafts 332 may be directly rotated by the motor 292 or that other combinations of gears to comprise the instant drive train are within the scope of this invention. As seen in FIG. 15, also included in each of the left and right shutter drive subassemblies 300, 302 are sensor mounts 308, 309 and a pair of sensors 310.

Within the instant connection end cap assembly is a geared drive motor. Via a set of spur gears, this geared drive motor turns a worm shaft having left-hand and right-hand thread segments. Each of these worm shaft segments turns a worm gear secured to a shutter shaft. The gear motor spins the worm to open or close both shutters simultaneously.

As seen in FIGS. 8, 9, 10, 11, 12, 40, and 41, respective left and right shutter drive subassemblies 300, 302 are rotatably attached to the shutter shafts 332 and have clutch pin drive assemblies 316, 318, and worm gears 324, 326, as well as substantially identical (or similar) shutter shafts 332, collars 334, (hex) nuts 336, ball bearings 338, and worm gear drive pins 340. The left and right clutch pin drive assemblies 316 are rotatably attached to each end of the shutter shafts 332 and 318 respectively include shutter arms 350, 352 and shutter arm extensions 354, 356, the other components described below being substantially identical or similar. Referring now to FIGS. 8, 9, 11, 12, 40, and 41, a ball headed drive pin 358 axially extends from each of the shutter arm extensions 354, 356. Each of the ball headed drive pins 358 has a shank 360 with a longitudinal axis 361 and terminating in a head 362. A cross sectional dimension, such as a diameter 364 of the head 362 is greater than a cross sectional dimension such as a diameter 366 of the shank 360.

Figure 8:
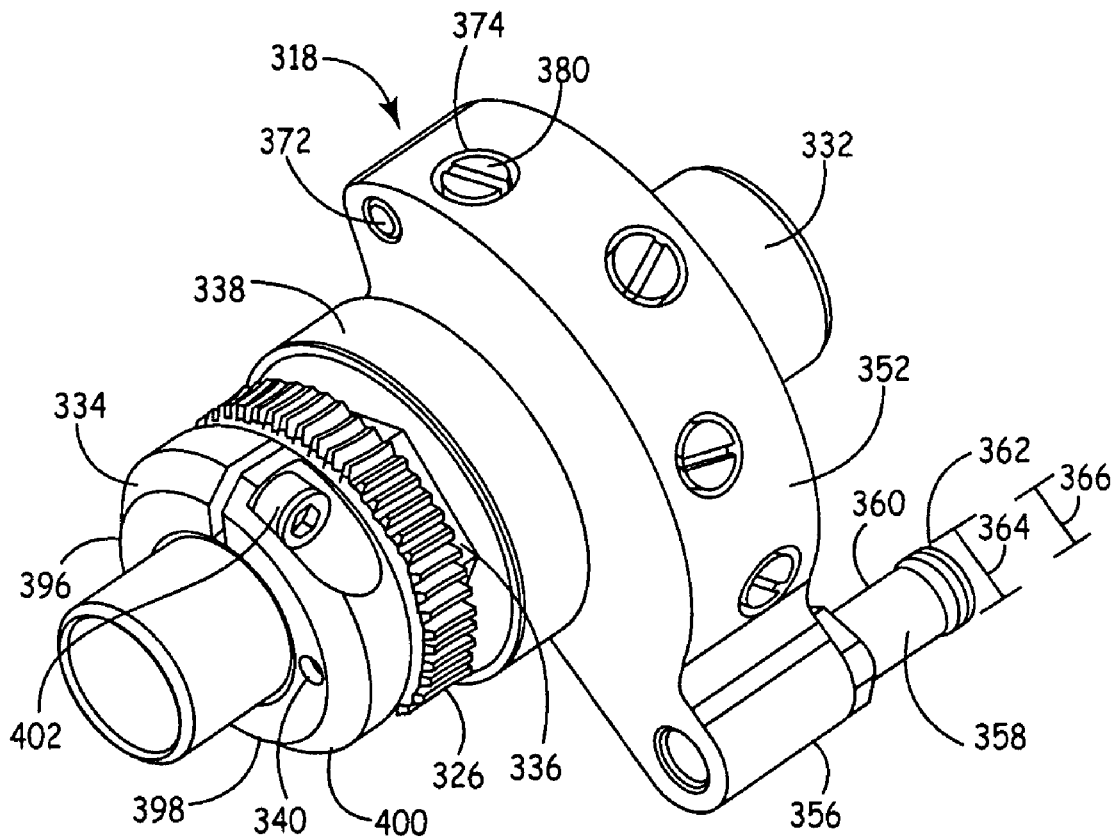
FIG. 8 is a perspective view of one embodiment of the instant shutter shaft assembly.

A sensor magnet 372 is housed in each of the shutter arms 352, 354 generally opposite the shutter arm extensions 354, 356. At least one or a plurality of, e.g., four, adjustable ball spring plungers 374 are disposed in each of the shutter arms 350, 352. A plurality, e.g., pair, of shutter position sensors 376, 378 are also attached to each of the shutter arms 350, 352, the shutter position sensor 376 attached so as to be aligned with a sensor magnet 372, thereby detecting when the shutters are in an open or closed position. The shutter position sensor 378 is attached approximately radially midway between the shutter position sensor 376 and one of the shutter arm extensions 354, 356, to thereby detect when the shutters are in a closed position. The two pairs of sensors (one pair for each shutter) monitor the open and closed position of each shutter. The sensors may be reed switches activated by a magnetic field and are mounted so as to minimize contact with module components directly exposed to high temperatures found in the instant UV module. The magnets are stronger than those previously used to ensure sensor activation. A variety of magnet lengths (thus, a variety of magnetic field strengths) may be used to finely adjust shutter sensor sensitivity. The magnets are present in the shutter shaft arms which are, in turn, mounted on the shutter shafts. Accordingly, the sensitivity of the shutter position sensors is unaffected by shutter warpage, changes in shutter length, or changes in the axial positioning of the shutter assemblies relative to the module body of this invention. The sensors themselves may be also micro-positioned within their mounting brackets to more finely adjust sensor sensitivity (FIGS. 8, 10, 11).

Figure 47:
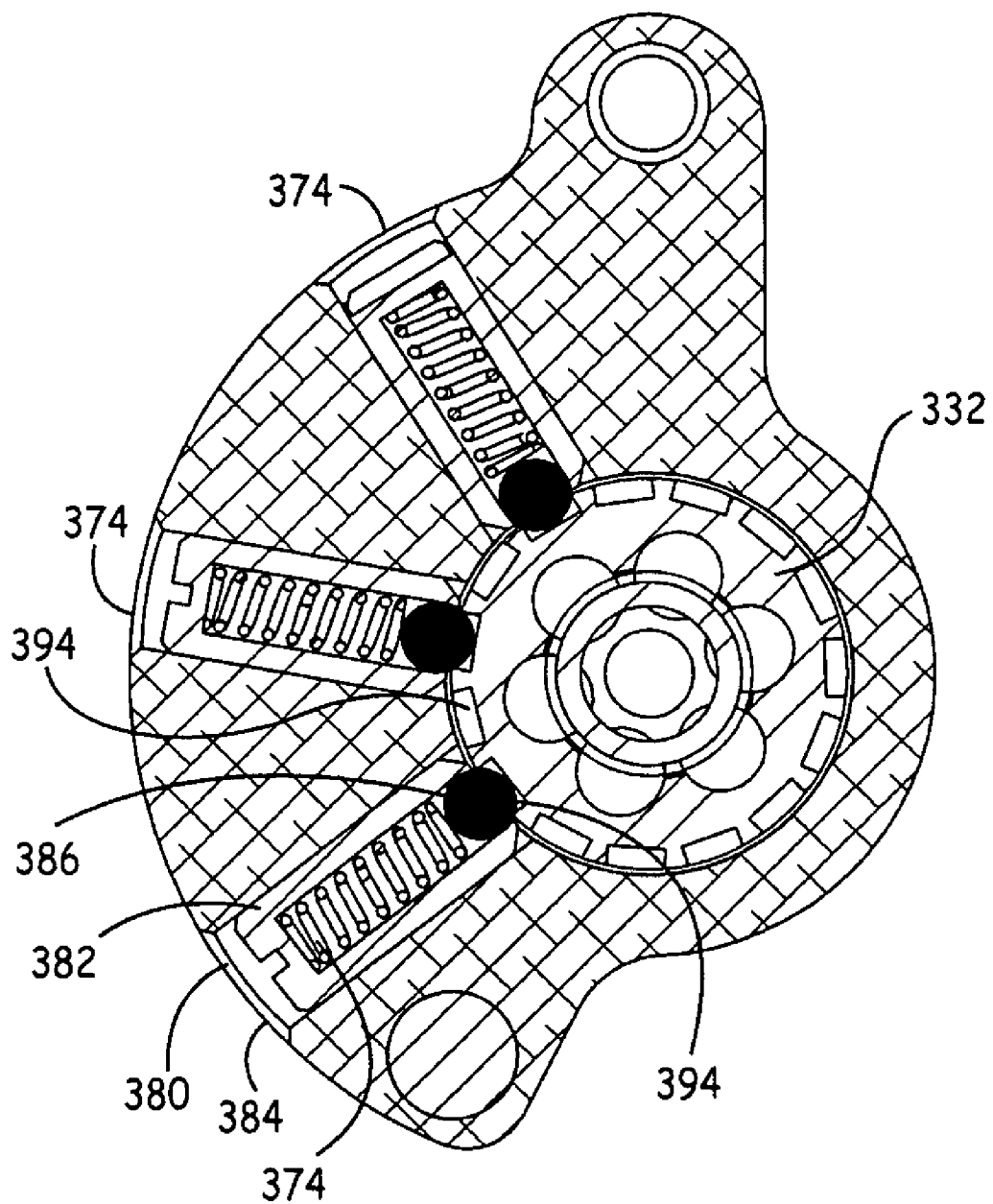
FIG. 47 is a cross-section of the clutch arm of this invention depicting the ball spring plungers engaged to shutter shaft grooves.
Figure 48:
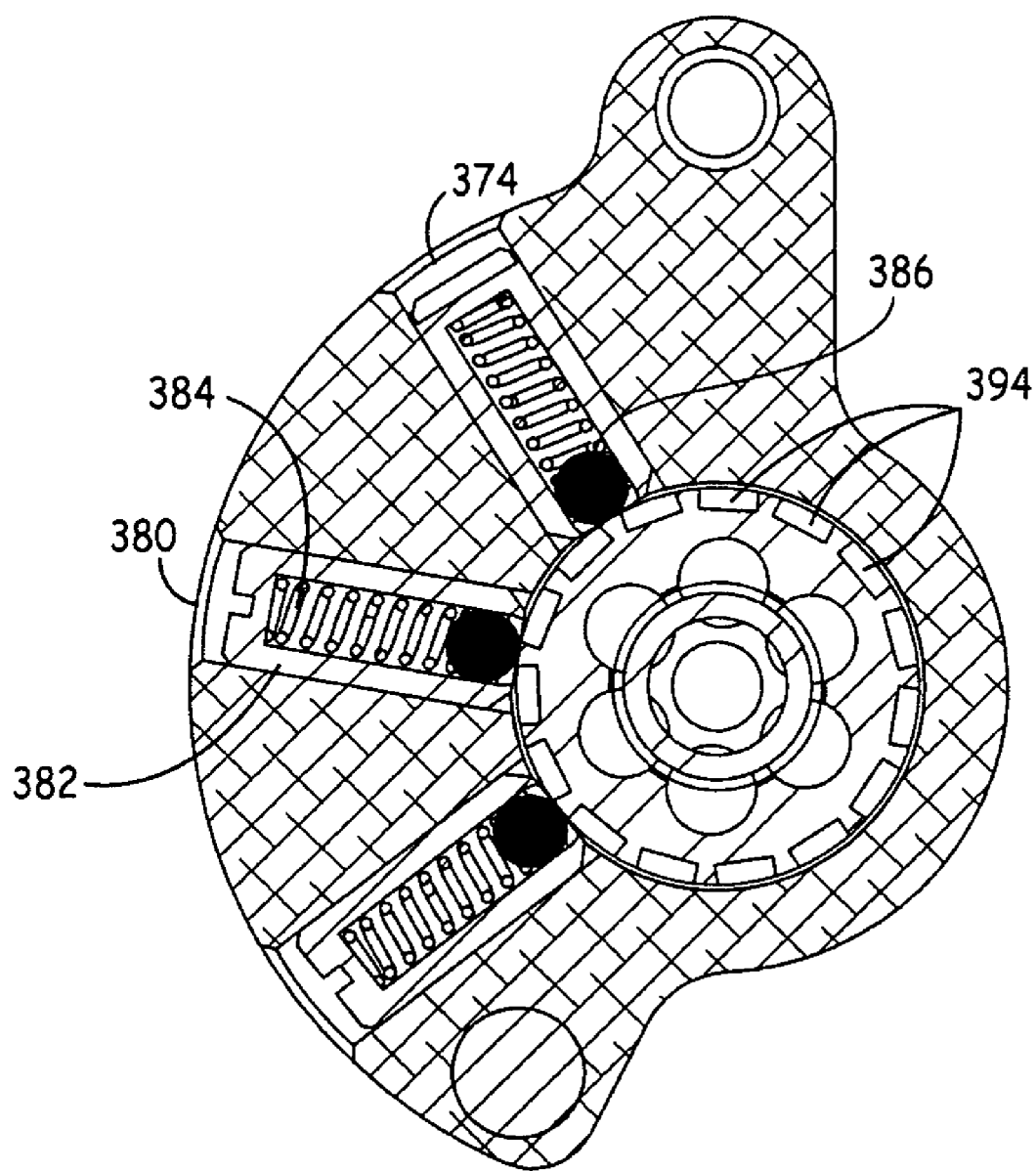
FIG. 48 is a cross-section of the clutch arm of this invention depicting the ball spring plungers disengaged to the shutter shaft grooves.

Referring more particularly to FIGS. 47 and 48, each of the ball spring plungers 374 includes a slotted cap 380, which closes a threaded housing 382. A spring 384 is disposed within the housing 382 and a ball 386 partially protrudes from the housing 382, the spring 384 biasing the ball 386 away from the slotted cap 380.

Figure 11:
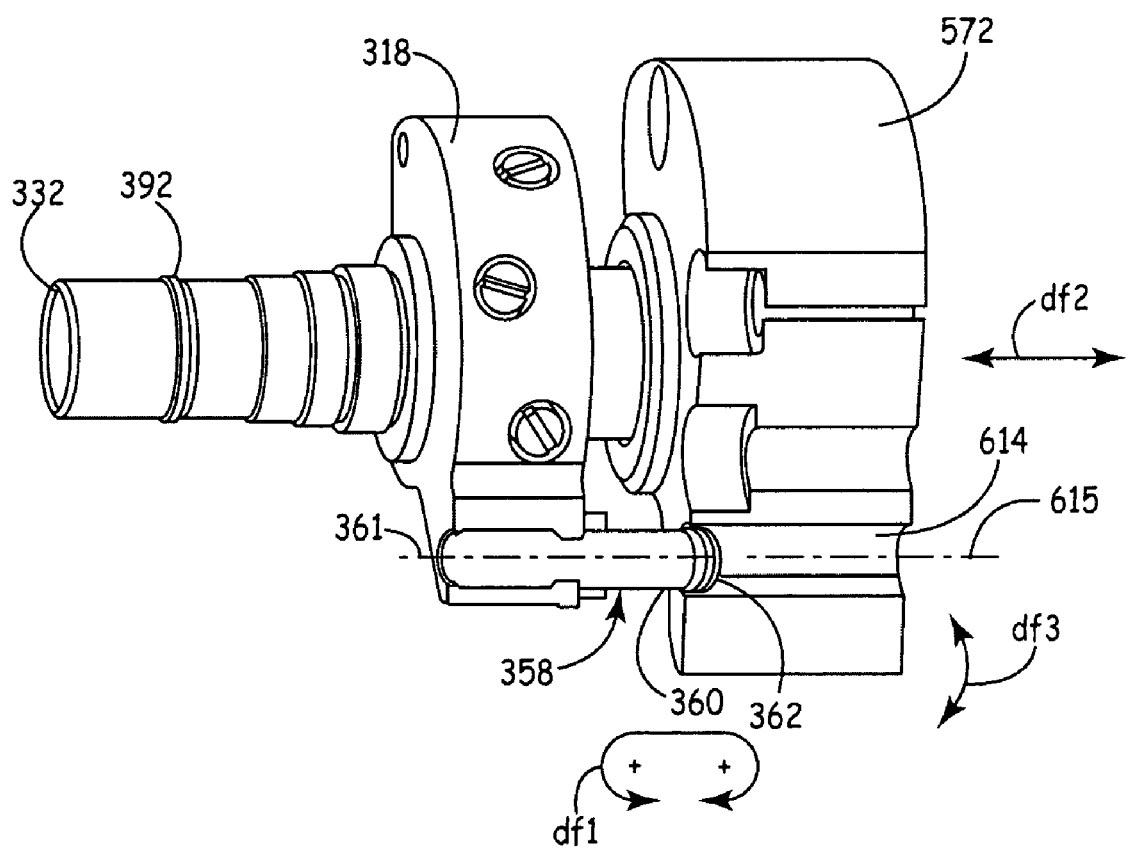
FIG. 11 is a partial sectional view of the shutter drive pin/slot, depicting freedoms of motion thereof.
Figure 12:
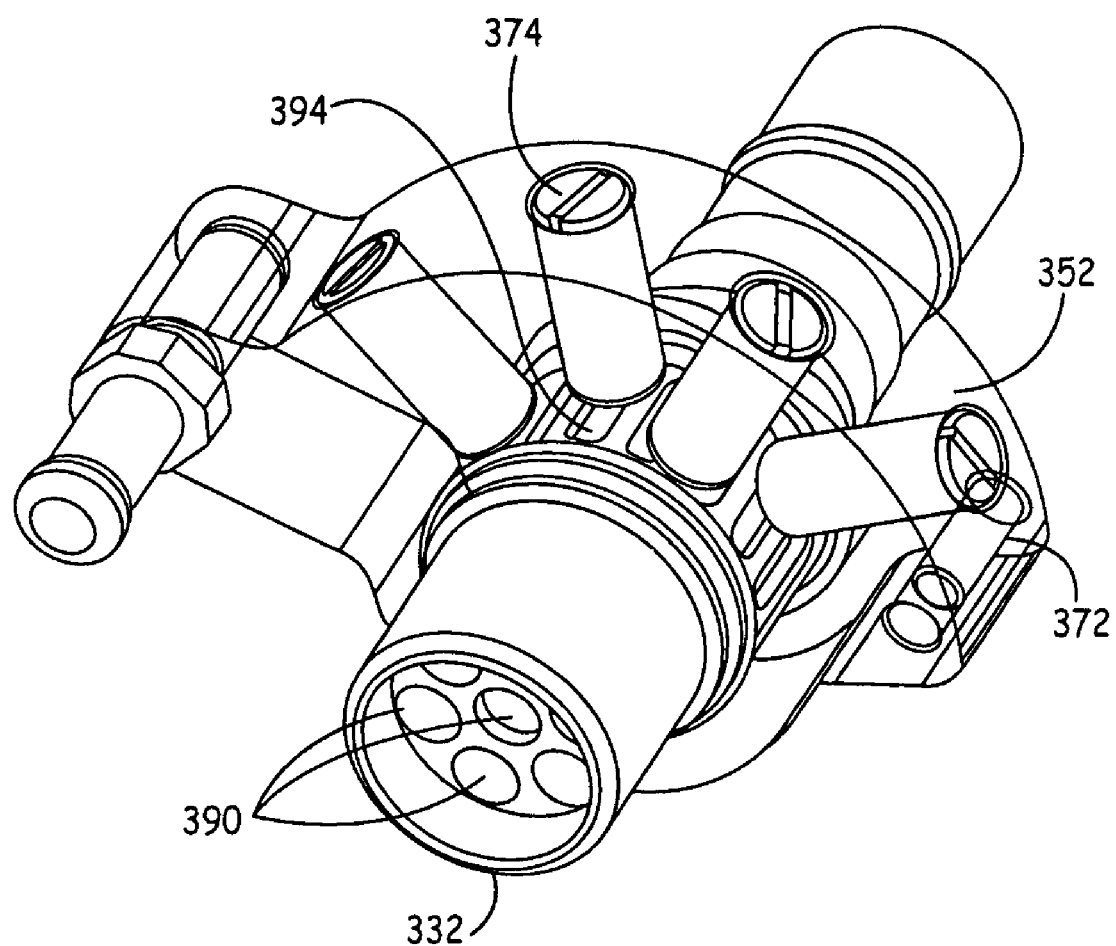
FIG. 12 is a perspective view of one embodiment of the instant clutch, having the shutter arm thereof in phantom view.

As seen in FIGS. 11 and 12, each of the shutter shafts 332 has at least one or a plurality of, e.g., six, axial bores 390 and an angled rib 392 is circumferentially and integrally formed from an exterior surface thereof. A plurality of axially aligned grooves (slots) 394 are formed on the exterior of the shutter shafts 332 so as to coincide with the position of the shutter arms 350, 352. The shutter shaft of this invention has been extended to extend through the connection block and the associated seal arrangement has been designed to greatly reduce the chance of a coolant leak. If a leak were to occur, a tale-tale weep hole ported to the atmosphere, not only indicates the existence of a leak, but directs any leaking coolant away from the internal spaces of the connection block and module and, in particular, any coolant leakage is directed away from electrical connections and components, thereby minimizing chances of any coolant-induced electrical shortages and any damages to the instant module therefrom.

A pair of "indexing" clutches (one per shutter) prevents drive train binding and subsequent drive overload (FIGS. 8-12, 47-48). Within the clutch of this invention, a plurality of ball spring plungers are mounted within the shutter shaft arm and may be adjusted as required to produce the desired "breakpoint" torque, the amount of torque required to disengage the clutch as seen in FIG. 47 and during normal operation with each shutter clutch engaged, the spring plunger balls 386 are forced into the grooves 394 formed in the shutter shaft 332, thereby effectively "locking" the shutters to the drive train. The optimum "breakpoint" allows the clutch to disengage before the drive motor draws sufficient heat-producing current to be damaged, yet still operates the shutters during normal operation. As shown in FIG. 48, when disengaged, the balls 386 are no longer seated in the grooves 394 of the shutter shaft 332. When properly adjusted, the present clutch in the "disengaged" mode allows the shutter drive train to continue operating in a powered-up condition for an unlimited amount of time without damaging drive train components. While under power and disengaged, the clutch can "free wheel" in a manner somewhat similar to a spring-loaded pawl and ratchet arrangement. The clutch will always automatically reengage by virtue of the "indexing" configuration integral to the shutter shaft, shutter shaft arms, and spring plungers. Stated otherwise, regardless of the position of the shutters, a disengaged clutch of this invention will always attempt to reengage. The clutch arrangement of this invention also allows the shutters to be individually repositioned by hand. Suitable ball spring plungers are available in several ranges of spring force values. These devices may have threaded bodies allowing them to be threaded into or out of the shutter shaft arm to respectively increase or decrease the torque required to reach the "breakpoint" of the clutch. The combination of the spring forces and the extent to which the threaded bodies are threaded into the clutch allows the clutch "breakpoint" to be thus readily adjustable. Due to the action of the springs, a disengaged clutch will continually attempt to reengage and will reengage automatically as soon as the applied torque in the shutter drive train system falls below the "breakpoint" torque, or as soon as the drive motor is deenergized. When a shutter is repositioned by hand, the clutch will reengage as soon as the shutter is released. The design of the clutch components is such that the clutch is bidirectional and will disengage at approximately the same "breakpoint" torque value regardless of whether the shutters are being opened or closed. The clutch operates silently when fully engaged. When operating under power in the "disengaged" mode, the clutch admits a series of subdued clicking sounds to thereby alert personnel that the clutch is disengaged and is attempting to reengage.

Figure 6:
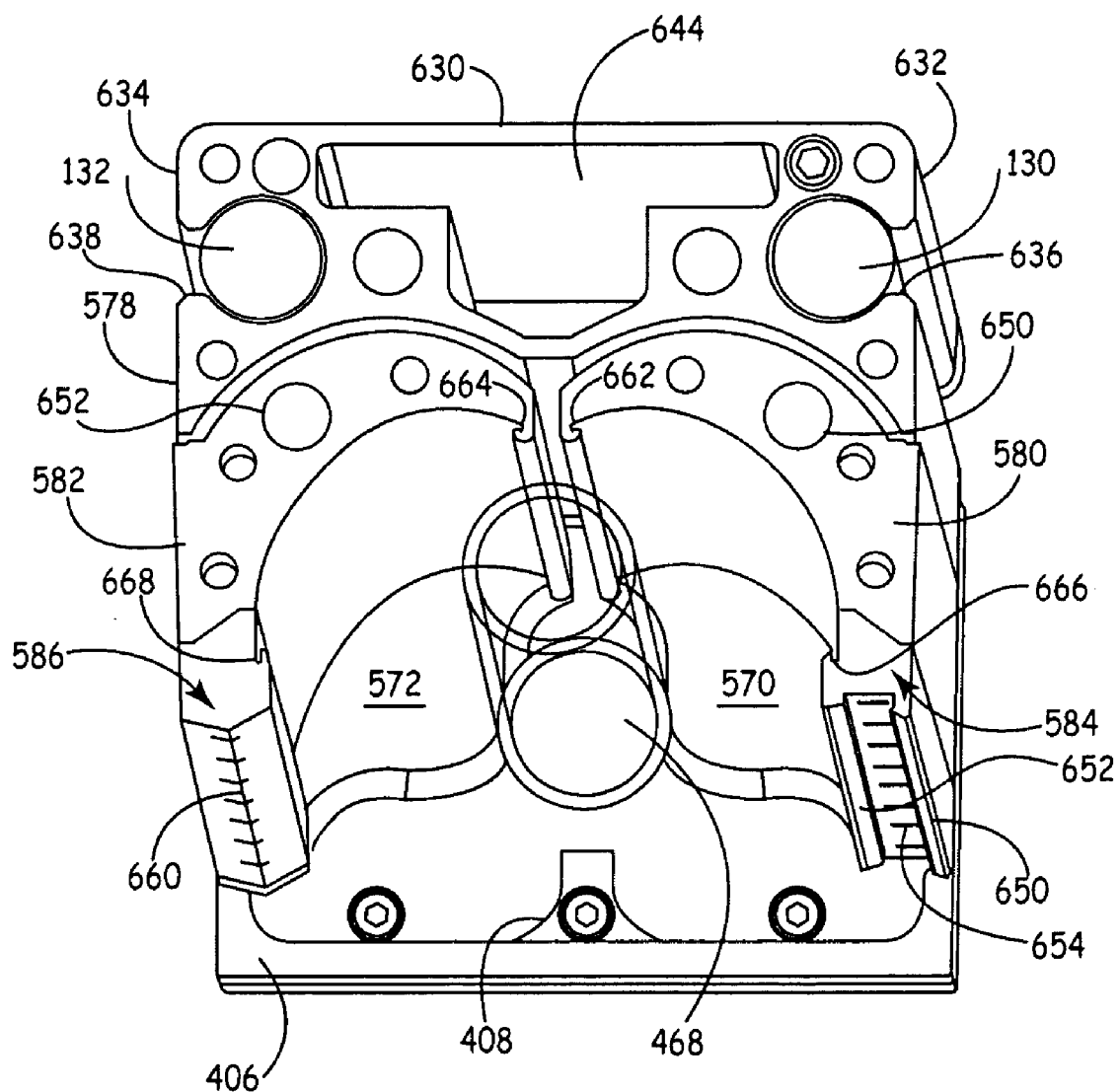
FIG. 6 is an oblique sectional view of the UV module of FIG. 1 with the shutters in an open position.
Figure 7:
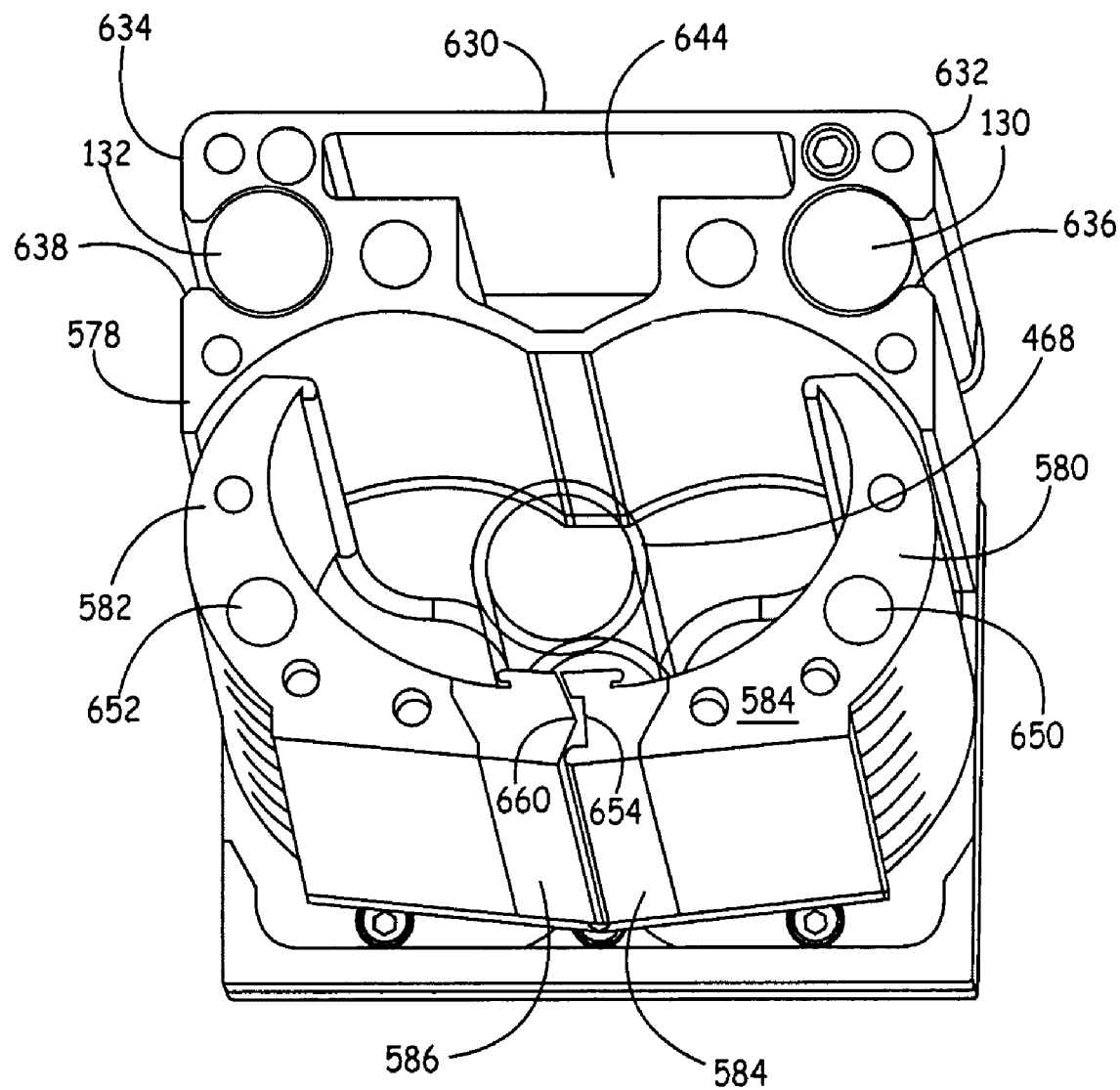
FIG. 7 is an oblique sectional view of the UV module of FIG. 1 with the shutters in a closed position.
Figure 13:
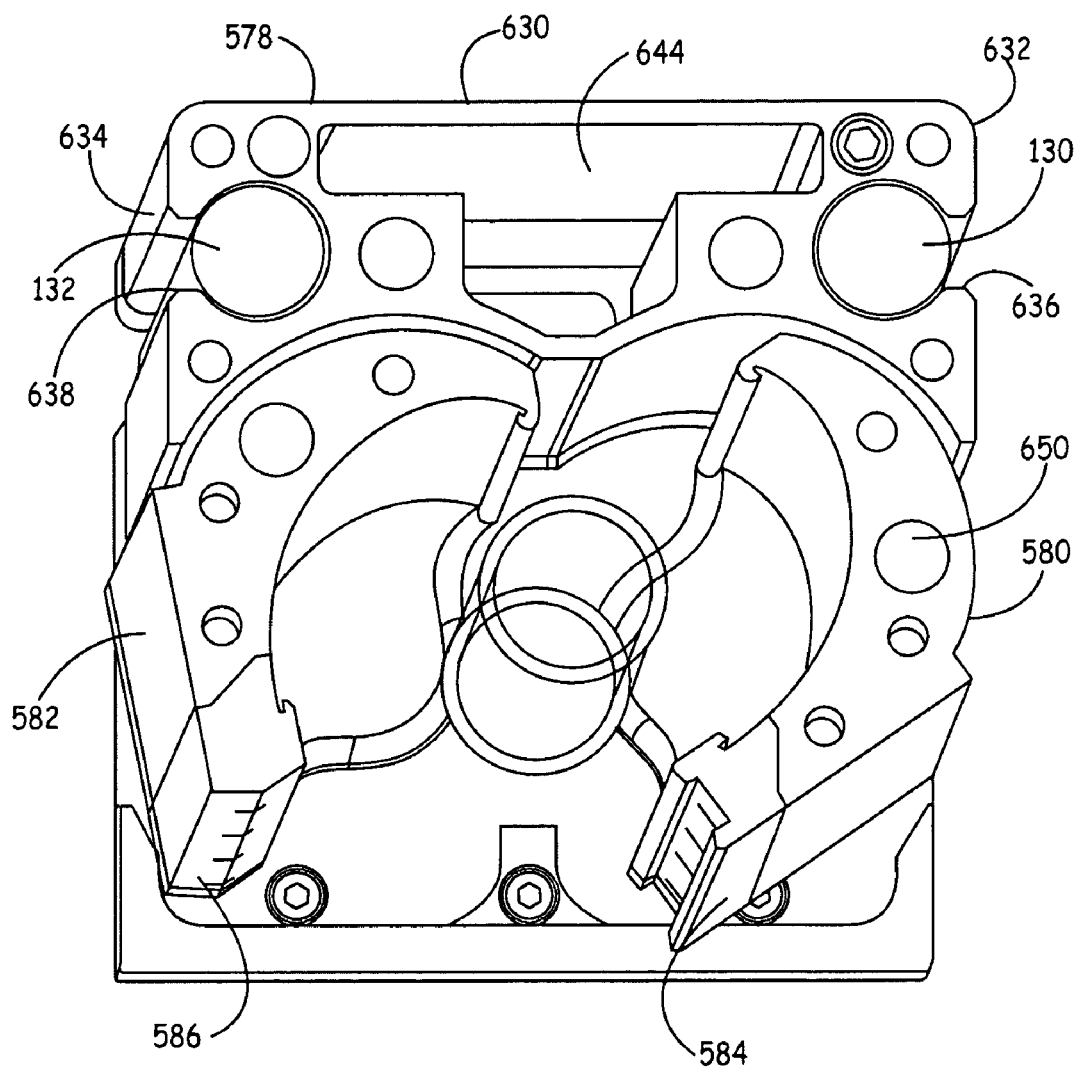
FIG. 13 is an oblique sectional view showing the instant shutters "out of time" (unsynchronized).

The instant clutch also facilitates shutter synchronization. During module assembly the two shutters may be moved to their fully open positions and synchronized to mate the positive and negative reflector retaining strips. In any condition in which either or both of the shutter clutches undergo disengagement, loss of shutter timing may occur. To re-synchronize the shutters, the condition causing the clutches to disengage must often be first corrected. The shutters may then automatically reacquire the correct shutter synchronization when they are moved, either manually or via the drive motor to their fully open positions. In this situation, the module body extrusion acts as a hard stop for both shutters. When both shutters have been moved to their fully opened positions (and the drive motor, if in use, has been deenergized), both shutter clutches will automatically reengage and the shutters will again be properly timed and engaged to their respective shutter shafts (FIGS. 6, 7, 13).

Figure 9:
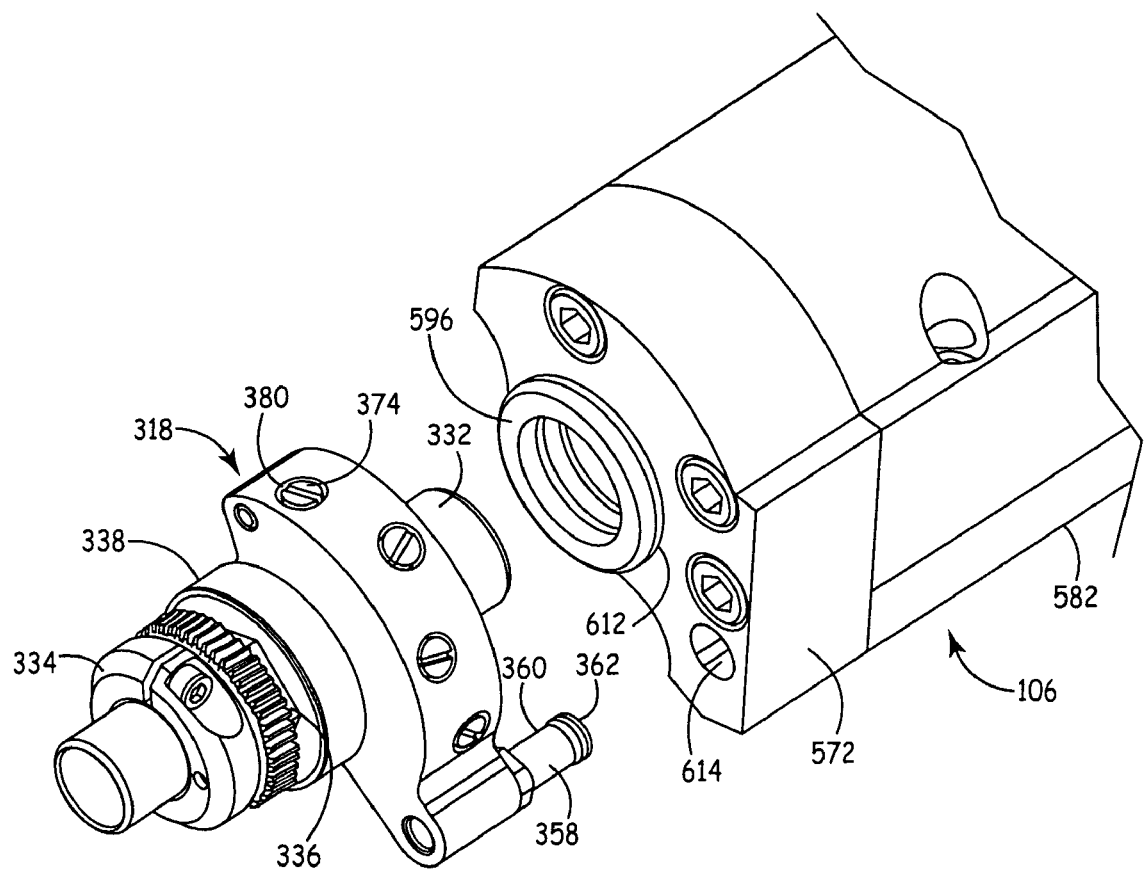
FIG. 9 is a perspective view of the shutter shaft assembly of FIG. 8 and a shutter end cap of this invention, shown disengaged.

As shown in FIGS. 8, 9, and 11, the worm gears 324, 326 are secured to the shutter shafts 332 using the two piece clamp collar 334 and the drive pin 340. Individual pieces (396, 400) of the clamp collar 334 clamp securely to the shutter shaft 332 and the drive pin 340 protrudes from the collar 334 to engage a slot (not shown) in each of the worm gears 324, 326. When thusly secured, an angled shoulder 400 of the collar 334 abuts the angled rib 392 of the shutter shaft 332. As fasteners 402 secure the two-piece collar 334 to the shutter shaft 332, one of the worm gears 324, 326 is wedged toward the bearing-retaining nut 336. Each of the worm gears 324, 326 is then tightly clamped in place between the clamp collar 334 and the hex nut 336 and is positioned to fully mesh with the left and right hand segments 304, 306 of the worm shaft 298.

As best seen in FIG. 15, the sensor mounts 308 are mounted to the connection end cap 290 secure shutter position sensors 310 in place.

Referring to FIGS. 14 and 15, a lower end cap 406 includes an optionally integral (or unitary) hard integral stop 408 in one embodiment of this invention. The integral stop is positioned at the center of the lower end cap cover to prevent either of the shutters from over traveling and contacting the UV lamp. In the event of clutch disengagement, the shutter may be forced past the normal "shutter closed" position. In this event, the shutter shaft arm will contact the integral stop before any portion of the shutter assembly can move sufficiently to contact the lamp. Thus, this integral stop prevents UV lamp contact whether the shutters are overdriven via the drive motor or by manual manipulation and will prevent lamp-to-shutter contact, regardless of the axial position of the shutter relative to the module body (FIGS. 13-15).

As can be seen in FIGS. 5, 16, 17, and 18, a second bearing 420 may be used in conjunction with a ball bearing 422 to support the shutter shafts 332. In one embodiment, the second bearing 420 is a bronze, flanged, sleeve bushing. However, other suitable materials may be used for other embodiments. The bearing 420 may include integral internal dynamic seal glands 430, 432 and integral external static seal glands 434, 436. These glands may be outfitted to accommodate seals, such as O-rings 440, 442, 446, 448 to provide fluid-tight integrity. The two external seals 446, 448 have a coolant drainway 452 therebetween. The coolant drainway 452 drains to a drain port 454, which is integral to the connection end cap 290, to provide a path for coolant leakage. For each of the two shutter drive assemblies, the second bearing (e.g., bronze, flanged, sleeve bushing type) is used in conjunction with a single ball bearing to provide full and solid support to the shutter shaft. The sleeve bearing may include integral internal dynamic seal glands and integral external static seal glands.

These glands accommodate seals, e.g., O-rings, to provide a high degree of fluid-tight integrity. The two external seals are arranged with a coolant drainway therebetween and function in conjunction with a drain port integral to the connection end cap to provide a telltale leak path in the event of a failed primary static bearing seal.

Referring to FIGS. 16, 17, and 18, one embodiment of the connection end cap valve assembly of this invention 283 has a striker plate 456, a valve disc 457, a sleeve 458 with a plurality of outboard slots 459, and a compression (coil) spring 460 (spring 460 not shown). The striker plate 456 accommodates internal O-rings 461, 462 about a fluid passageway 463 and an inboard O-ring 464 to seal the junction between the connection end cap valve assembly 283 and the bearing 596 (more fully described below). An open volume 465 is defined in an inboard portion of the striker plate 456 and is also bounded by the sleeve 458 and the bearing 596. The spring 460 is disposed in the sleeve 458 and biases the valve disc 457 toward the left (as viewed from the perspective of FIG. 16) such that the valve disc 457 is in a fluid tight engagement with the O-ring 462, thereby preventing fluid egress from the valve assembly 283. FIG. 16 depicts what may be considered as a first stage of docking the connection block assembly 102 to the connection end cap assembly 104, wherein the connection block poppet valve 240 and the connection end cap valve assembly 283 are both closed to fluid egress. As seen in FIG. 17, the opening 463 of the striker plate snugly accommodates a positive end 466 of the water sleeve 244, such that the O-rings 461, 462 sealingly contact said positive end 466. As the cooperation between the connection block poppet valve 240 and the connection end cap valve assembly 283 progresses toward the disposition depicted in FIG. 18, the positive end 466 of the water sleeve 244 abuts and displaces the valve disc 457 (to the right as viewed from the perspective of FIGS. 17 and 18), thereby compressing the spring 460. As viewed in FIG. 18, the valve disc 457 is fully displaced, no longer in a sealing position, thereby allowing fluid to flow through the poppet about 240 and into the valve assembly 283. Coolant thusly flows around the valve this 457, though the slots 459 and sleeve 458 in two the shutter shaft 332. A person of ordinary skill in the art will readily recognize that when undocking the connection block assembly 102 from the connection end cap assembly 104, the connection block poppet valve 240 and the connection end cap valve assembly 283 are sealed to prevent fluid egress by events essentially the reverse of the foregoing description.

Figure 21:
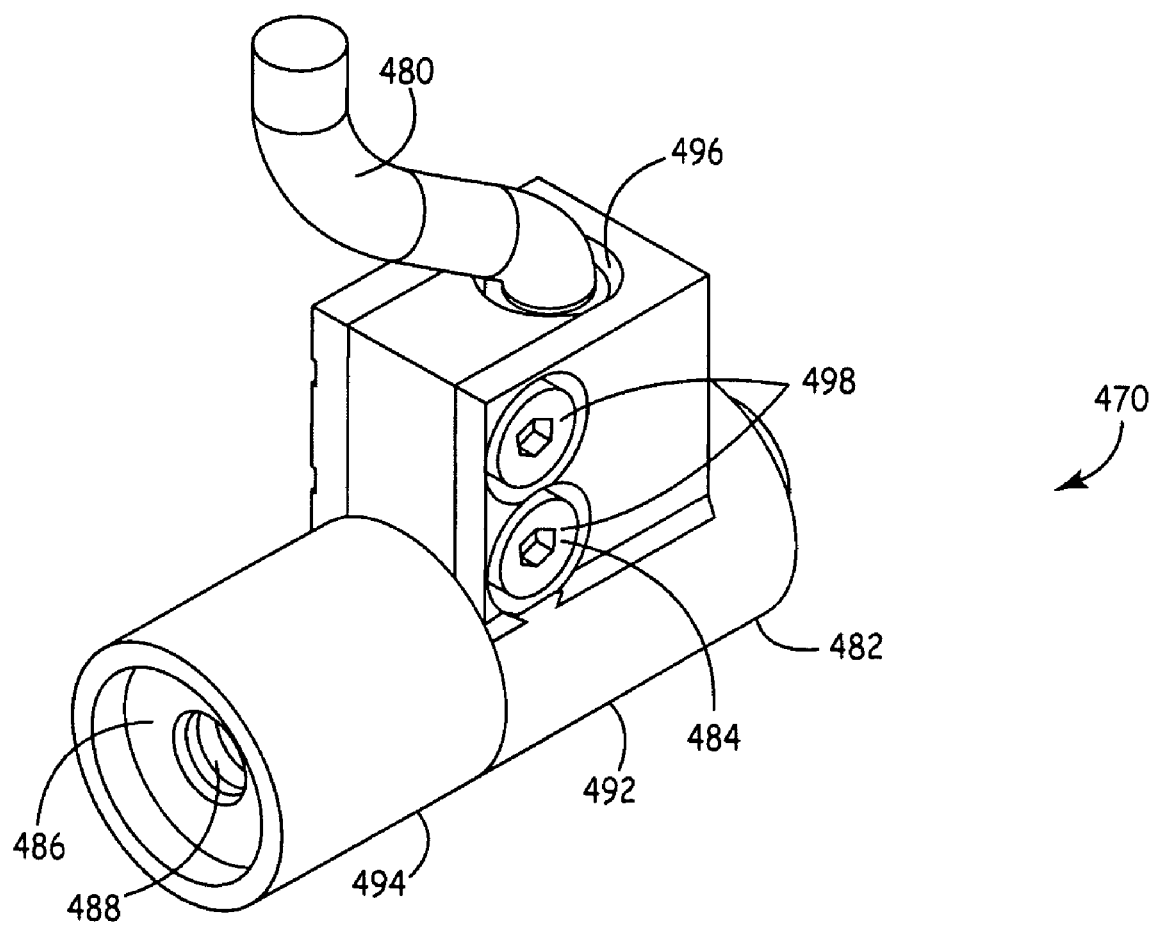
FIG. 21 is an isometric view of one embodiment of the lamp connector assembly of this invention.
Figure 22:
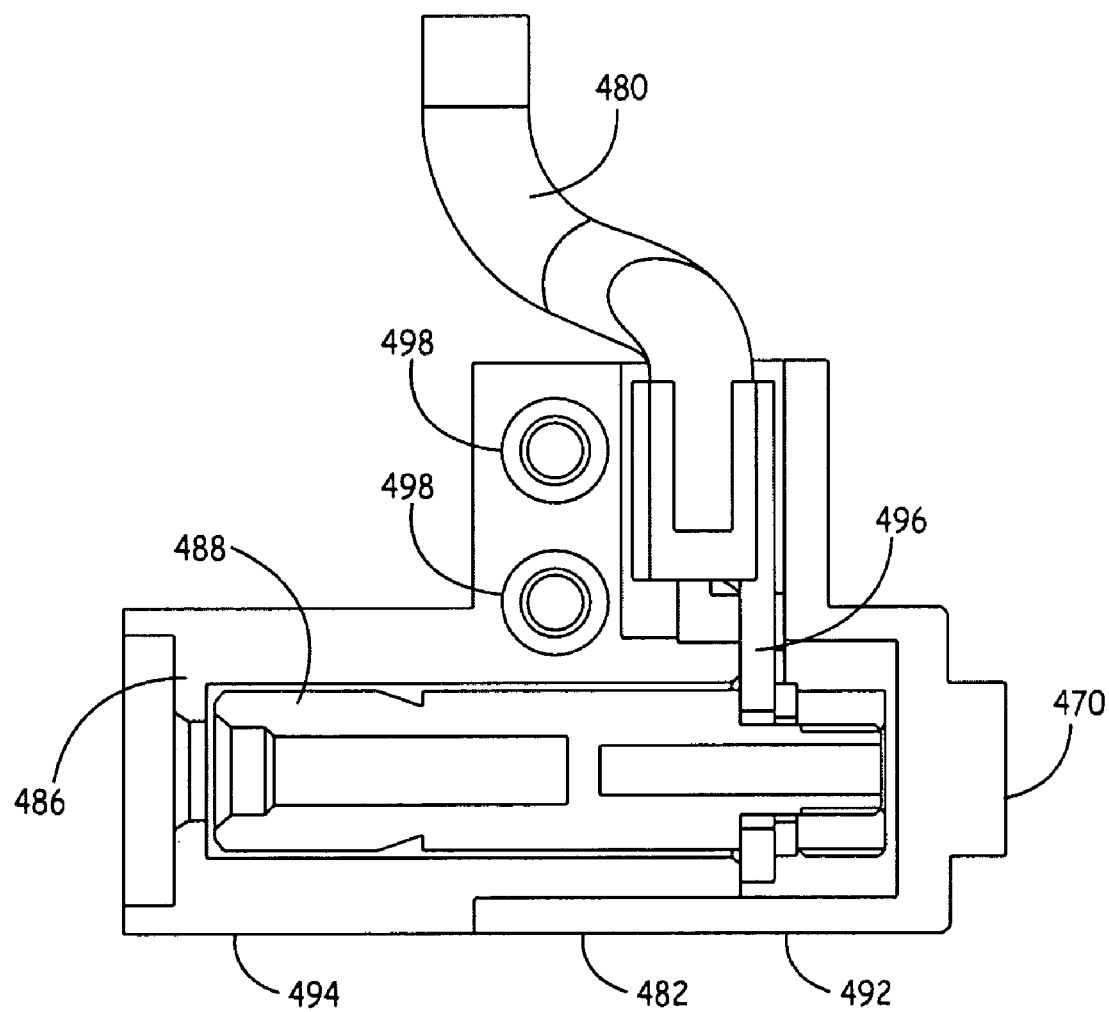
FIG. 22 is a sectional view of the lamp connector assembly of FIG. 21.

As may be viewed in FIGS. 15, 21, 22, 23, 24 and 42, the end cap electrical assembly 284 includes a UV lamp 468, a lamp connector 470, a pin connector assembly 472, and a board 474. The UV lamp 468 fits into, and is secured in place by, the lamp connector 470. Referring to FIGS. 21 and 22, the lamp connector 470, in turn, has a high-voltage cable 480, a two-piece housing 482, a fastener mechanism 484, an insulating membrane 486, and socket 488. The two-piece housing 482 depicted in this embodiment may include two housing components 492, 494, which house the high voltage socket 488, the insulating membrane 486 and a ring terminal 496. As best shown in FIG. 22, a plurality of connectors, e.g., two, sex bolts 498 attach and secure the high voltage cable 480 to the ring terminal 496. As seen in FIG. 15, the conductors within the high voltage cable 480 (not shown) may be connected directly to the pin connector 472, or connected to the pin connector 472 via the connector board 474. When the lamp connector 470 is secured in place, a spring 502 (as best shown in FIG. 42) biases the lamp connector 470 toward the lamp 468.

As best viewed in FIGS. 15, 23, 24, and 42, the pin connector assembly 472, in the embodiment shown, includes an electrical connection block 510, ferrules 512, 514, and high voltage connection pins 516, 518. The nonconductive ferrules 512, 514 threadably secure and connect conductors to the high voltage pins 516, 518 when disposed in openings 520, 522 of the connection block 510. As best shown in FIG. 42, additional high voltage pins (and sockets), such as high-voltage connection pin 524 may be present, e.g., to accommodate three phase electrical current. However, a person of ordinary skill in the art will readily recognize that any number of the present high voltage connection pins (as well as sockets 202, 204) may be present. The instant two-piece socket housing allows easier, more consistent, and more reliable assembly of the high-voltage socket and lead wire; and the lamp socket housing is designed to provide better electrical insulating properties. These better insulating properties are accomplished by providing more insulating material around the high-voltage wire entry way and by adding an additional partial membrane around the socket opening. With a UV lamp installed in the instant module, this membrane creates a longer, more tortuous path to reduce the likelihood of a high-energy short circuit between the lamp connection and the surrounding housing.

Both lamp connectors (a lamp connector in each of the connection and exhaust ends) are substantially identical in one embodiment of this invention. Additionally, both are spring-loaded against the UV lamp (FIG. 42). The spring action thus encourages higher electrical conductivity through the lamp, socket-pin connections by maintaining full pin-two-socket engagement; prevents the lamp pin from becoming unseated from the socket during aggressive module installation; allows more relaxed dimensional tolerances for manufacturing the UV bulb; and reduces the likelihood of arcing between the pin-to-socket connections and the surrounding end caps.

Figure 23:
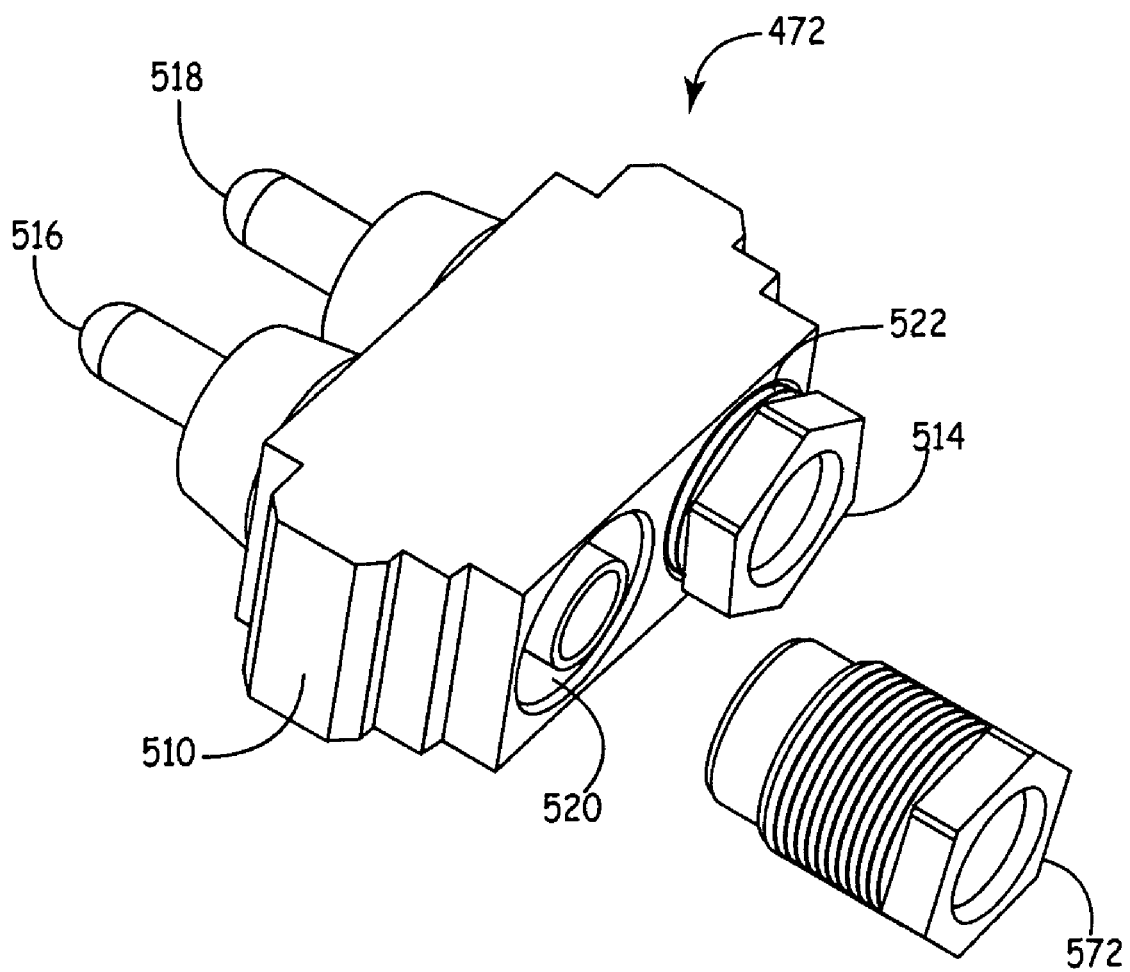
FIG. 23 is an isometric view of one embodiment of the ferrules and high-voltage pin connector of this connection.
Figure 24:
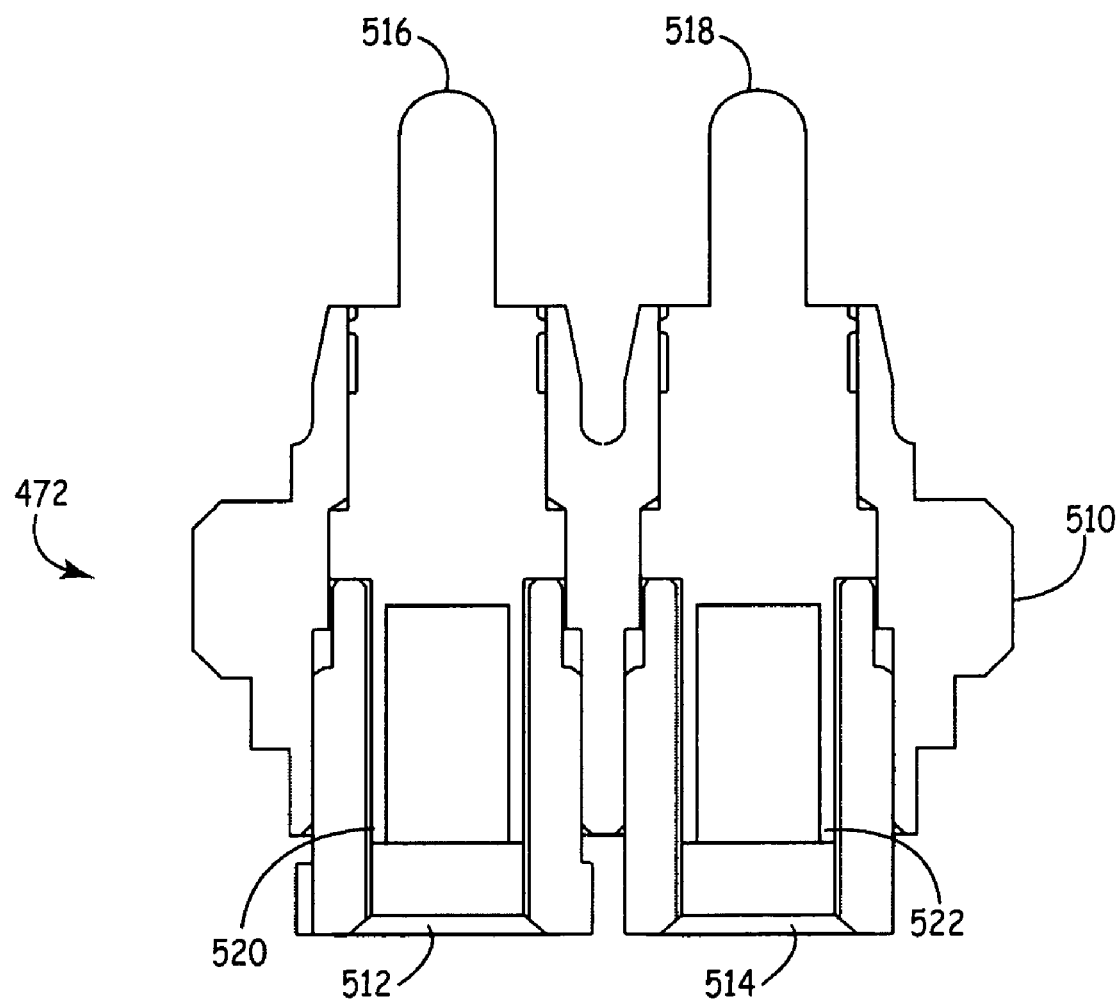
FIG. 24 is a sectional view of the ferrules and high-voltage pin assembly of FIG. 23.

Special non-conductive screw-in type ferrules are used as a mechanical back-up to maintain the high-voltage pin and socket connectors better secured in their respective electrical blocks. The pin and socket connectors, normally depending solely on a press-fit into the connection blocks, have, in the past, become unseated or ejected during aggressive module installations. The instant ferrules also permit easier pin and socket replacement in the instance that a conductor is damaged (FIGS. 23, 24, 43).

Figure 41:
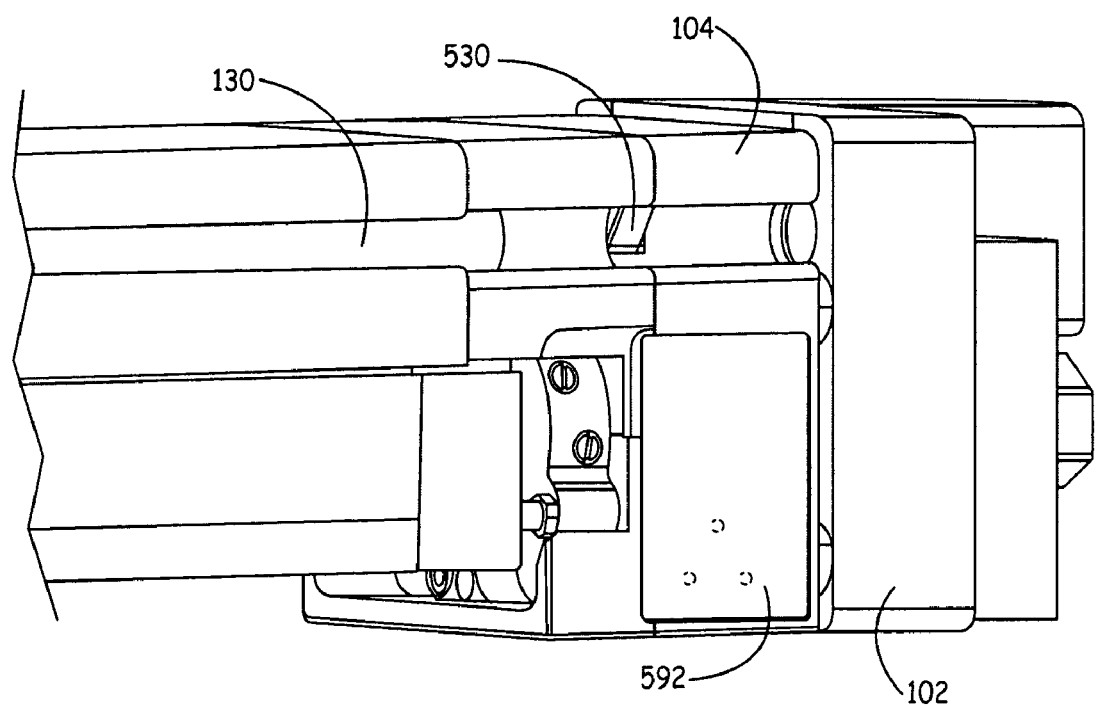
FIG. 41 is a perspective view of a latch side of one embodiment of the connection end cap assembly of this invention.

Referring now to FIGS. 38, 39, 40, and 41, one embodiment of the latch assembly of this invention 286 includes a latch 530 and torsion spring 532 axially secured to a latch rod 534 by retaining rings 536. The latch 530 defines a retaining groove 538, within which one arm 540 of the torsion spring 532 is disposed. When secured to the stub bayonets 130, 132, the latch 530 is disposed in the latch mating surface 262, as described above. When the latch 536 is thusly secured, the bayonets 130, 132, hence connection block assembly 102, are secured in place. Pressing the latch 530 inwardly (as seen in FIG. 41) displaces the latch from the latch mating surface 262 of each of the stub bayonets 130, 132 and allows removal of the connection block assembly 102.

The latch rod 534 of this invention has retaining clip grooves 542 at the latch end thereof, rather than at the handle end. With the instant module docked to the connection block of this invention, the retaining clips provide more accurate axial positioning of the water poppet valve components and the electrical connections. As stated above, optimum axial positioning of the water poppet valves provides for maximum coolant flow through the module. Optimum axial positioning of the electrical connections further ensures reliable current flow and minimizes chances for electrical arcing (FIGS. 38-41).

The spring-loaded docking latch has been widened to transmit more easily over the small gaps between bayonet junctions. The latch features an integral, linear groove designed to retain one leg of the latch torsion spring, thereby providing more consistent assembly and latch operation. Accordingly, the instant latch provides precise axial alignment of the module of this invention to the instant connection block. When utilized with the instant stub bayonets and the instant latch rod, the overall result of the cooperation of these mechanical features results in a precision three-dimensional module-to-connection docking arrangement necessary for optimum module performance (FIGS. 3, 38-41).

Figure 39:
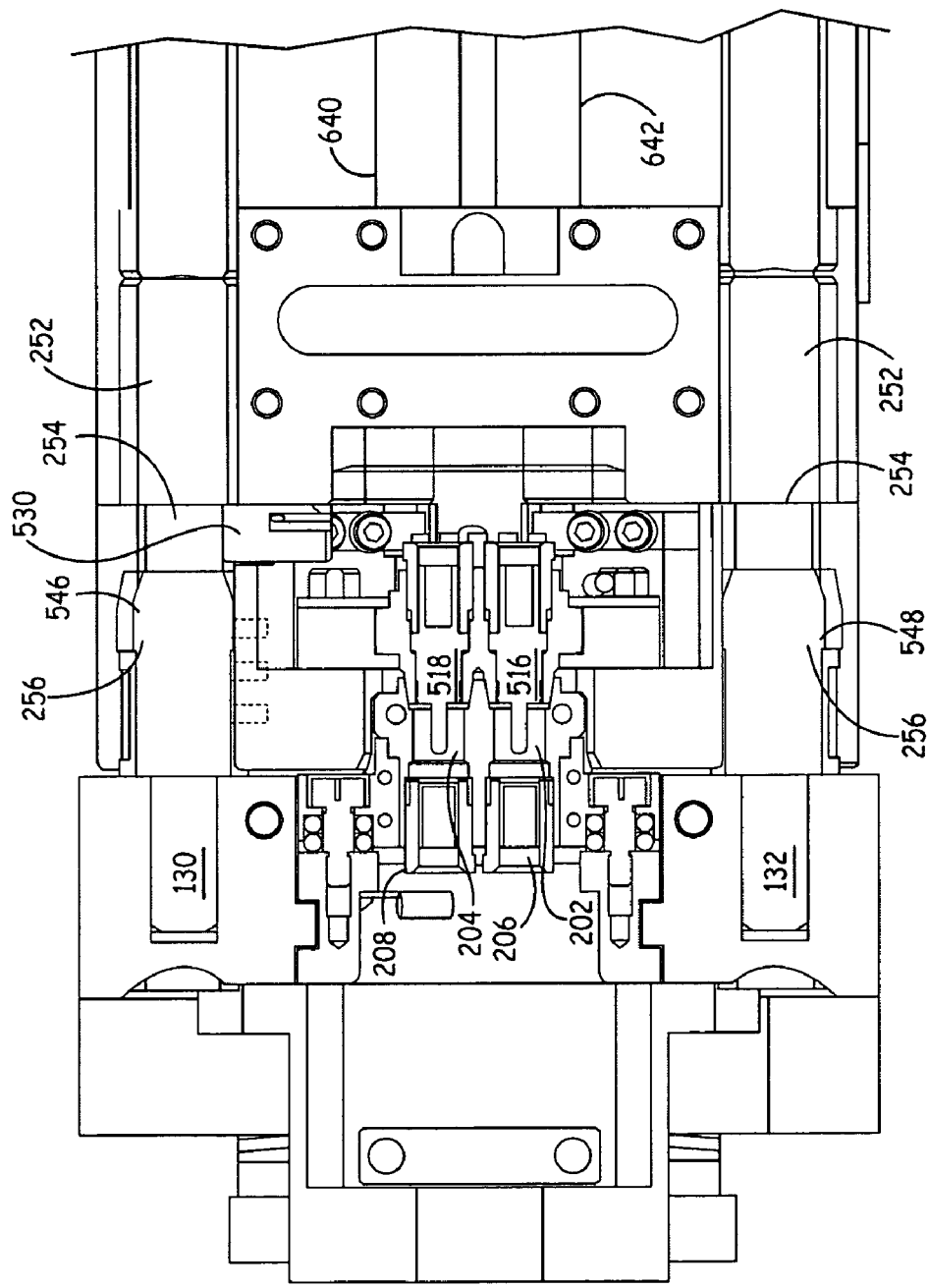
FIG. 39 is a sectional view of one embodiment of a three-axis module docking/locating feature of this invention.
Figure 40:
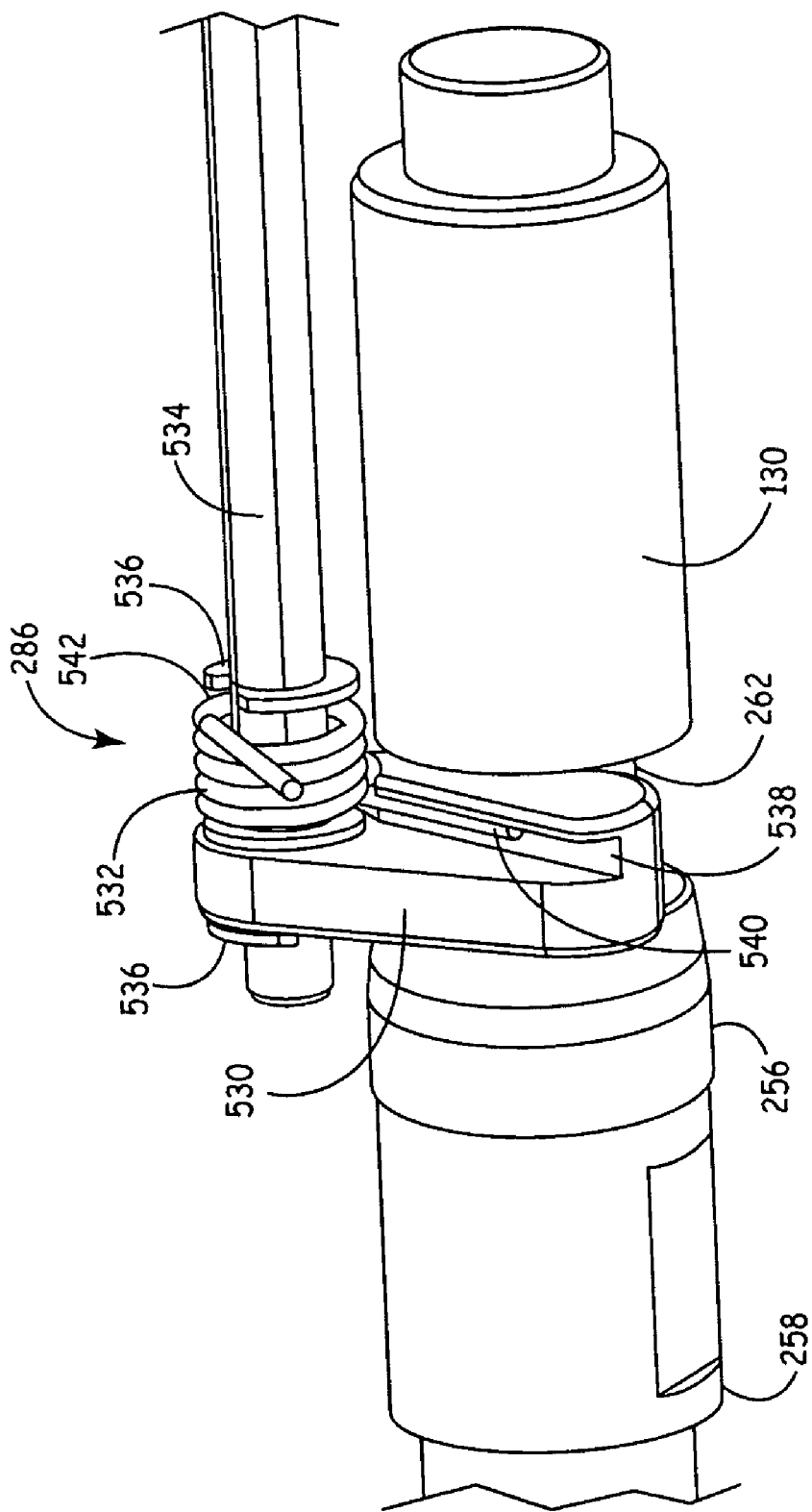
FIG. 40 is a perspective view of one embodiment of a latch/latch-rod assembly of this invention.

As can be seen in FIGS. 15 and 39, lateral connection end cap passageways 546, 548 are laterally defined in the connection end cap 290 and accommodate the stub bayonets 130, 132. The increased diameter of the tapering portion 256 of each of the stub bayonets 130, 132 is snugly accommodated within the passageways 546, 548. However, the more distal portions, e.g., 254, 252, of the stub bayonets 130, 132 have a smaller diameter and, thus, slide easily into the connection passageways 546, 548. Consequently, the stub bayonets 130, 132 are easily placed within the passageways 546, 548 but are laterally secured therewithin due to the quite close tolerance between the diameter of the bayonet sections 256 and the diameter of, and distance between the passageways 546,548.

Figure 20:
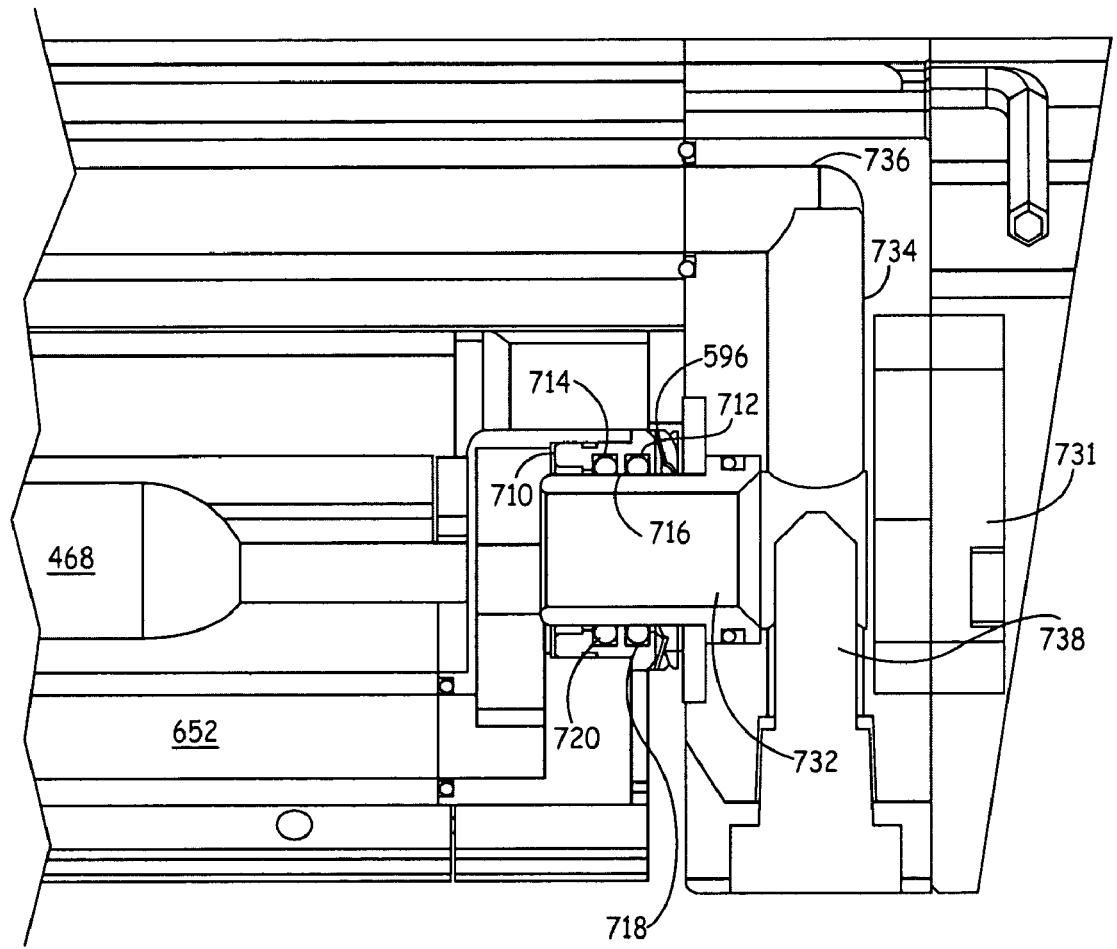
FIG. 20 is a sectional view of the exhaust end of one embodiment of the shutter end cap bearing/seal arrangement of this invention.

One embodiment of the shutter assembly 106 of this invention includes left and right connection shutter end caps 570, 572, (FIG. 10), left and right exhaust shutter end caps 574, 576 (FIG. 25), a module body 578 (FIG. 6), left and right shutters (extrusions) 580, 582 (FIG. 6), negative and positive retainers 584, 586 (FIG. 6), a crossover module 588 and cover 590 (FIGS. 29, 30, and 31), an access door 592 (FIGS. 34 and 35), and connection end and exhaust end bearings 596, 598 (FIG. 16 and 20).

Perspectives of the shutter end caps of this invention may be viewed in FIGS. 10, 25, 27, and 28 and are either identical or are mirror images. Consequently, the right connection shutter end cap 572 will be further explained, corresponding features in the other shutter end caps being either identical or in mirror image. Referring now to FIG. 9, the exterior of the shutter end cap 572 is shaped to receive and secure in place the shutter 582. An exterior opening 612 is defined, and extends from, an exterior surface of the shutter end cap 572. The opening 612 is dimensioned and disposed to receive a bearing 596, which will be more fully described below. The bearing, in turn, snugly receives the shutter shaft 332 therewithin. A drive pin slot 614, with a longitudinal axis 615, is also defined in a lower outboard portion of the shutter end cap 572. As can be seen in FIG. 11, the drive pin slot 614 is dimensioned to snugly accommodate the drive pin head 362, as will be more fully explained below. Accordingly, on each of the two cassette-style shutter drive assemblies, a ball headed drive pin is mounted to a shutter shaft arm at the connection end of the module. During operation, the head of this pin engages a drive pin slot in the shutter end cap to rotate each shutter. The ball diameter is larger than the shank diameter of the pin to prevent the shank from contacting any portion of the slot. As shown in FIG. 11, several degrees of freedom are therefore provided by the interface of this pin and the shutter end cap slot to allow the shutter to warp and change length without inducing undesired, adverse forces on drive train components. The slot and pin are configured to provide minimal backlash throughout the normal radial swing of the shutter arm and drive pin. Additionally, the slot/pin arrangement of this invention provides for these freedoms of motion: the pin may rotate df1 along its axis inside the slot 614; the pin may slide df2 into the slot at various depths; the pin may tilt df3 relative to the centerline of the pin; and the drive pin may contact virtually any portion of the walls of the slot without loss of functionality while nonetheless rotating the shutters. Stated otherwise, the pin-and-slot configuration of this invention allows the shutter end cap to "wobble" and slide along the pin as the shutter assembly warps, expands, and contracts in length. Consequently, binding problems in the drive train components due to imperfect shutter configurations are eliminated or greatly reduced. The variable orientation of the slot relative to the drive pin also relaxes a variety of dimensional and tolerance requirements for pertinent components. This design further prevents damage from occurring to the drive train during rough handling of the instant module, for example, when being lifted or carried by the shutters. The instant drive-pin configuration functions in conjunction with the shutter shaft, exhaust shutter pivot shafts, and shutter end cap bearings to accomplish this functionality.

Figure 19:
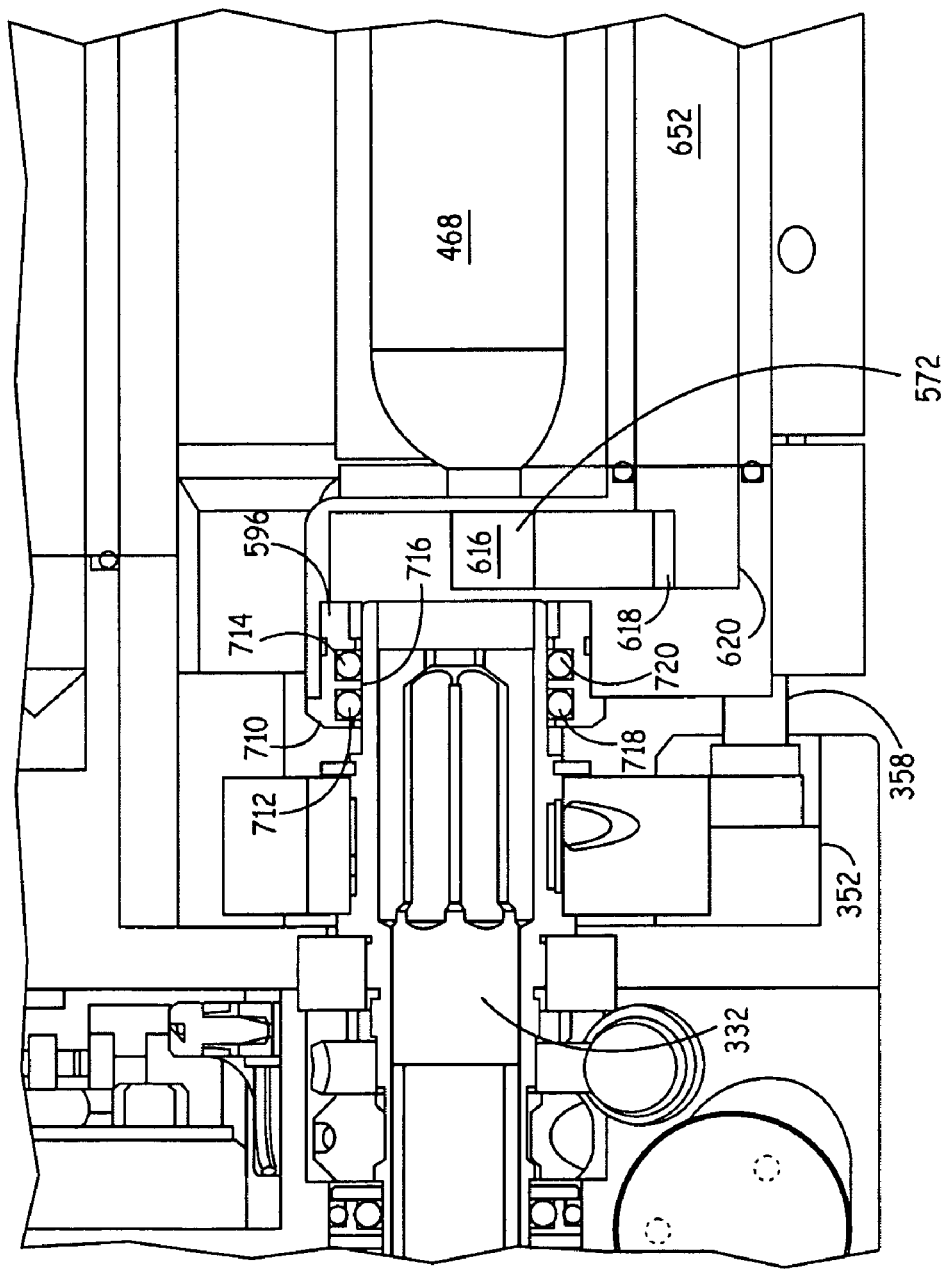
FIG. 19 is a sectional view of the connection end of the shutter end cap bearing/seal arrangement of this invention.
Figure 27:
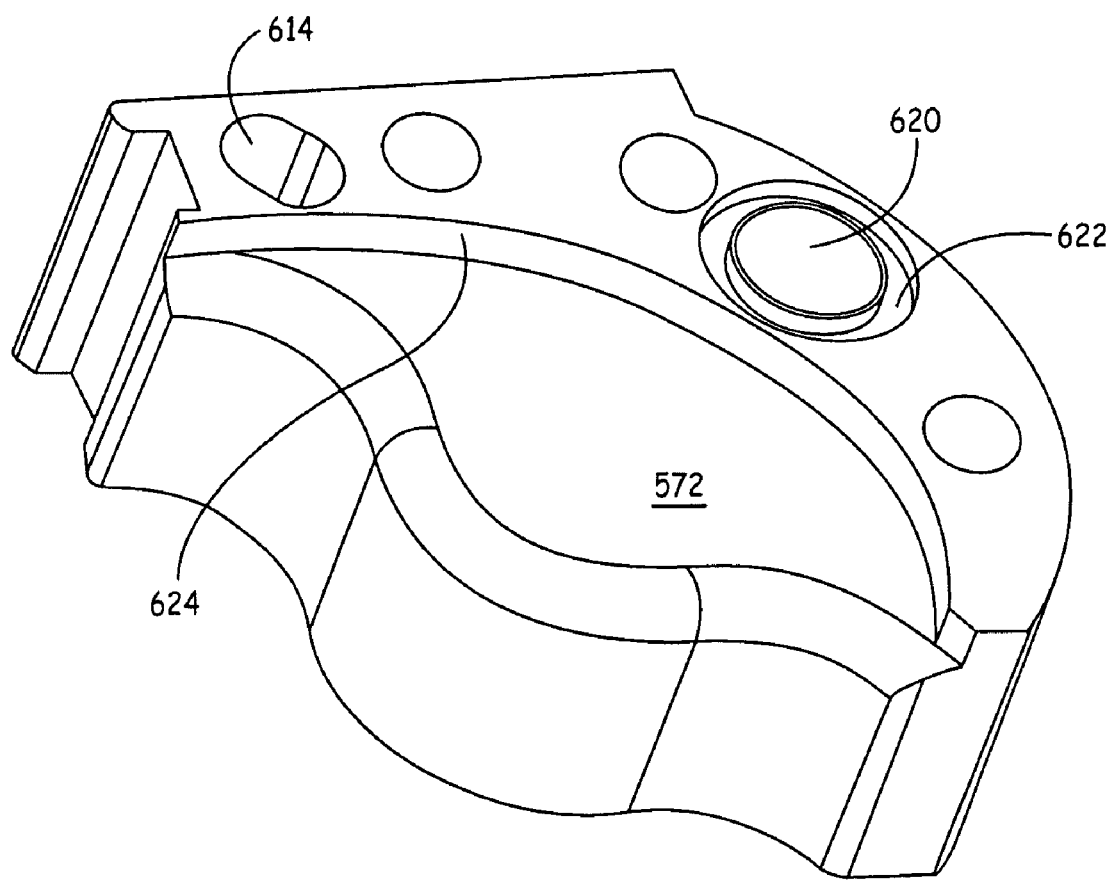
FIG. 27 is a perspective view of one embodiment of the shutter end cap of this invention showing a relieved reflector mounting surface.

Referring now to FIGS. 16, 17, and 18, the opening 612 extends into a reservoir 616. As seen in FIG. 19, the reservoir 616 opens into a vertical passageway 618 which, in turn, opens into a horizontal passageway 620. Accordingly, coolant flowing from the shutter shaft 332 flows horizontally into the reservoir 616, then flows vertically through the vertical passageway 618, then flows horizontally through the horizontal passageway 620. From the horizontal passageway 620, the coolant flows through a passageway in each of the shutters, as will be described more fully below. Referring now to FIG. 27, the interior surface of the shutter end cap 572 defines an O-ring gland 622 surrounding the opening of the horizontal passageway 620 and a relieved surface 624. The relieved surface (slot) 624 accommodates and secures reflectors in place.

Figure 28:
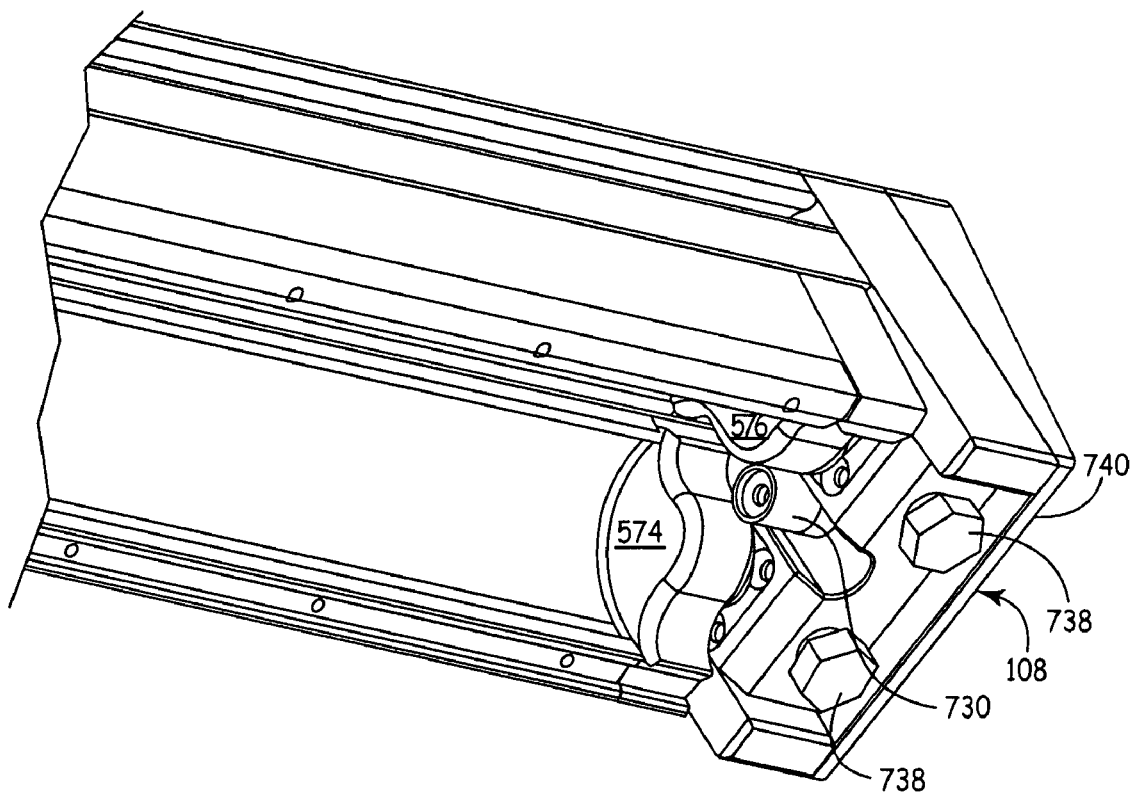
FIG. 28 is a perspective view of the shutter end cap of FIG. 27 installed in the module of FIG. 1.

The shutter end caps include a relieved reflector mounting surface. This feature provides better UV protection for the O-ring located in the shutter body-shutter end cap interface. This feature further allows the length tolerances of the replaceable reflector strips to be less critical. By using the instant shutter end caps, reflectors may now be removed and installed without removing the shutter end cap and without breaking the fluid-tight integrity of the shutter assembly. Only the retaining strip needs to be removed to exchange a reflector. In-situ, carefully made reflector fitment is no longer necessary because convenient pre-cut reflectors may be used. With the end caps of this invention assembled to the shutter extrusion, the relieved surfaces of the end caps fit flush to the inner surface of the shutter extrusion to produce an uninterrupted, full length, properly shaped reflector supporting surface (FIGS. 27, 28). Accordingly, printing press down time may be greatly reduced, due to the advantages of the quick change feature present in the reflectors of this invention. Using the instant reflectors may also be an important factor of the efficiency of the UV curing process. It has been reported that, with the use of clean and properly shaped reflectors, somewhere between 60% and 80% of the UV light striking the substrate is reflected light.

The present shutter end caps are made from aluminum, rather than stainless steel previously used. Accordingly, the instant shutter caps minimize galvanic and corrosive action occurring when the instant shutter end caps are mounted to the extruded aluminum shutter body. Shutter end caps are further fabricated from a single piece of material, rather than the multiple pieces previously used. Fashioning the instant shutter end caps eliminates several intricate welding operations previously necessary. The shutter end caps of this invention are fabricated using custom made tools to produce a special coolant passageway. This passageway includes an integral reservoir, which helps cool the stem of the UV lamp. The stem of the UV lamp must be maintained several hundred degrees cooler than the main body of the lamp (FIGS. 18, 27).

As seen in FIGS. 1, 2, 4, 6, 7, and 13, the module body 578 unitarily, or otherwise integrally, defines an upper member 630 and lateral members 632, 634, which depend from the upper member 630. The lateral members 632, 634 respectively define module body lateral passageways 636, 638, which are continuous with the respective passageways 546, 548 of the connection end cap assembly 102 and which accommodate the stub bayonets 130, 132 therein (FIG. 15). As seen in FIG. 39, defined in a central portion of the module body 578 are coolant passageways 640, 642. Referring again to FIGS. 6 and 7, the upper portion of the module body 578 defines a crossover module opening 644, which accommodates the crossover module 588 as more fully explained below.

As best viewed in FIGS. 6, 7, and 13, the shutters 580 and 582 attach to the end caps and have therewithin coolant passageways 650, 652. The coolant passageways 650, 652 align with, and receive coolant from, the horizontal passageways 620 of the instant shutter end caps. Attached to lower edges of the shutters 580, 582 are respective negative (female) and positive (male) reflector retainers 584, 586. The negative reflector retainer 584 terminates in extensions 650, 652, thereby defining a gap 654. The positive reflector retainer 586 terminates in a beveled tip 660. Reflector mounts 662, 664, are formed at the inboard ends of the shutters 580, 582 and reflector mounts 666, 668 are formed at the outboard ends of the retainers 584,586. These mounts secure the reflectors utilized during operation by securing the edges of the reflectors therewithin. To replace these reflectors, the retainers 584, 586 are removed by removing the fasteners used to secure them in place, the reflectors are then removed from the mounts 662, 664, replacement reflectors are installed, and the retainers are then secured in place as shown by the fasteners.

Previously, each shutter assembly was outfitted with either a "male" or "female" reflector retainer strip mounted to the outer edge of the shutter extrusion. When the shutters were closed, the male and female profiles of the retainer strips mated together to effectively block the direct path of light out of the module. In the design of this invention, the original female V-shaped (negative) reflector retainer profile is modified to define a shallow U-shaped channel. This new shape prevents shutter-to-shutter binding when closed shutters are warped from heat or from other causes of shutter-to-shutter misalignment (FIGS. 6, 7). The male, V-shaped "positive" reflector retainer profile retains its original profile. Consequently, when the shutters are closed and the shutter retainer profiles are mated together, the U-shaped channel does not affect the ability of the closed shutters to block light.

Figure 29:
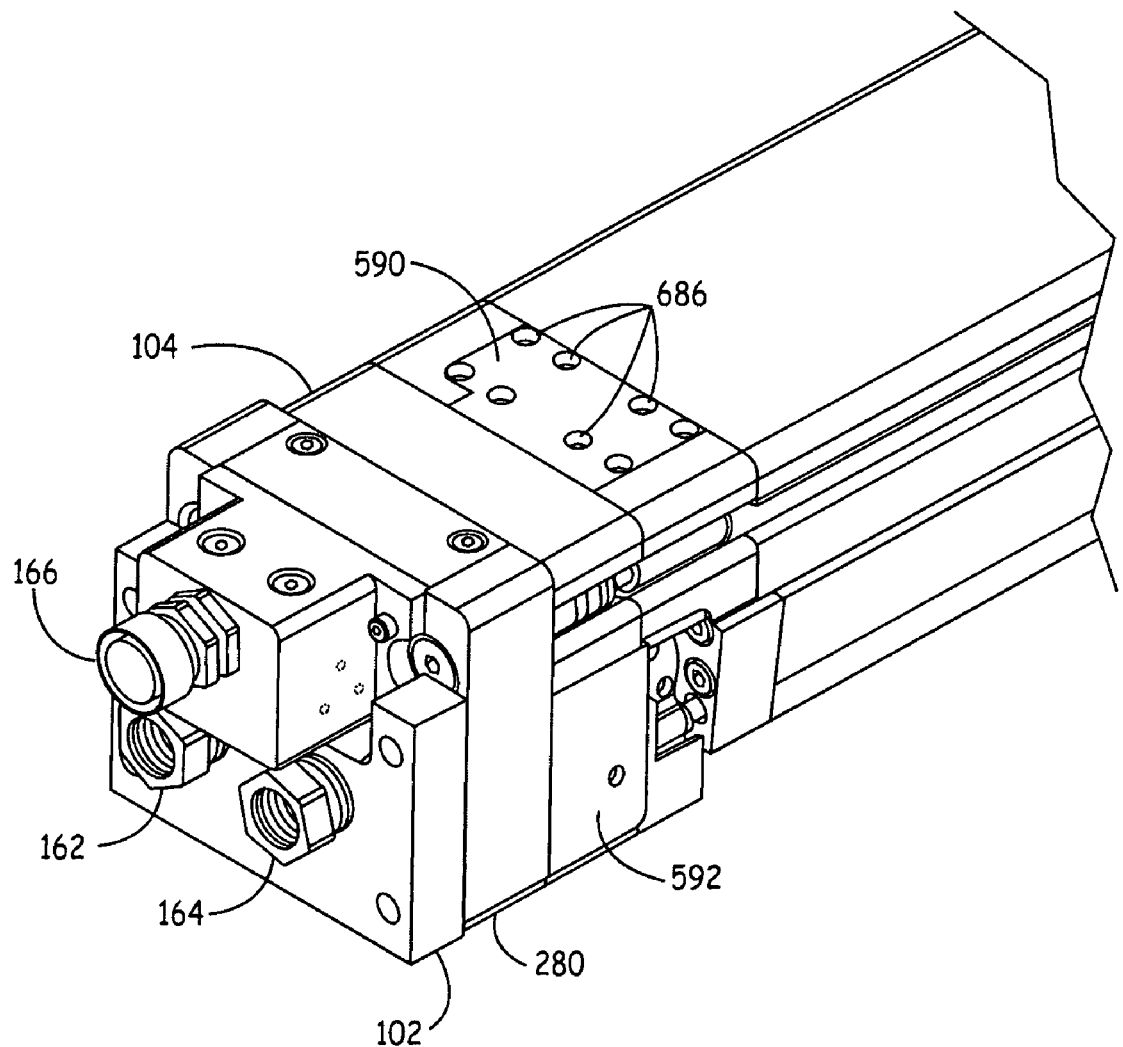
FIG. 29 is a perspective view of one embodiment of the cross-over location callout of this invention.
Figure 30:
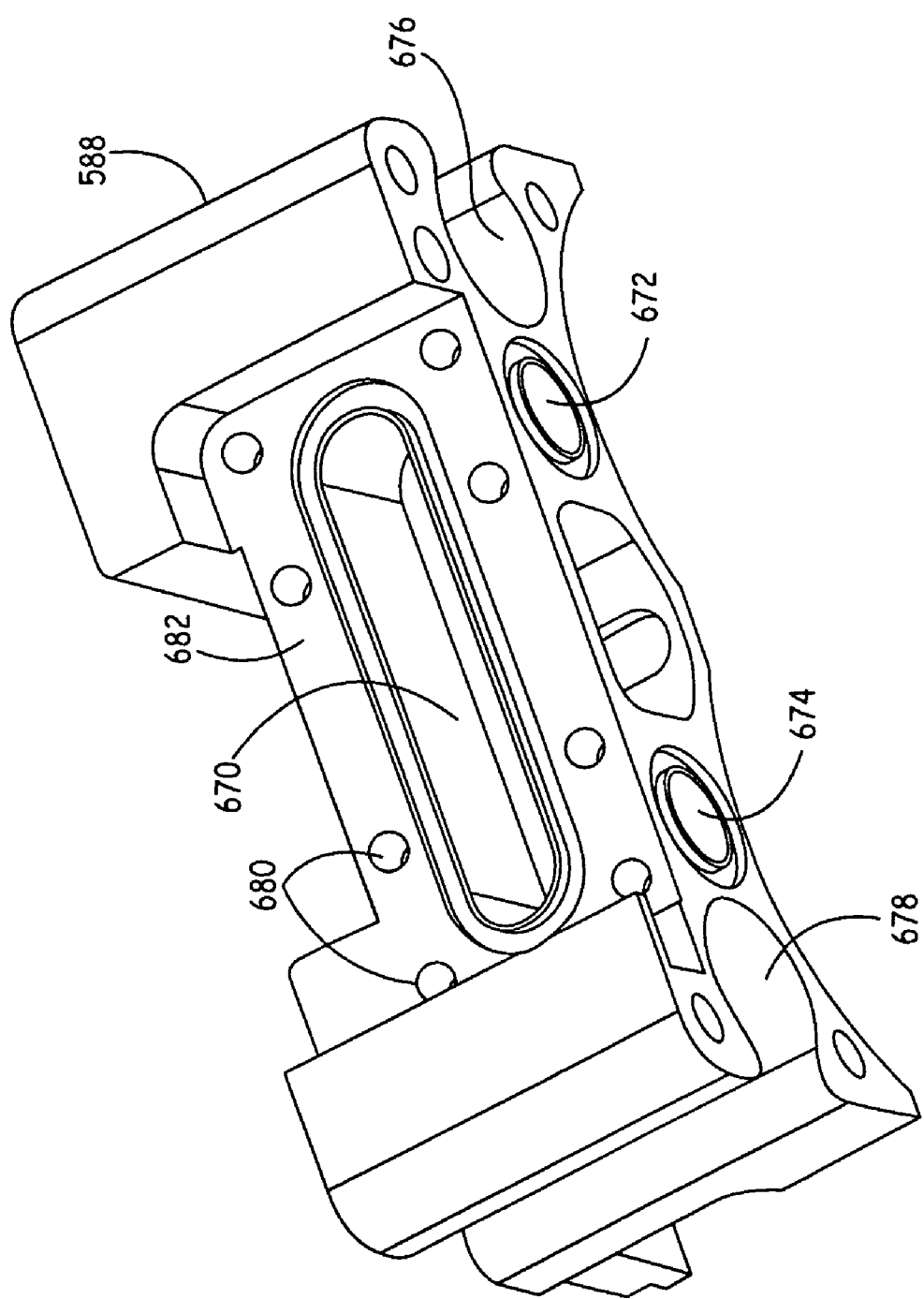
FIG. 30 is a perspective view of one embodiment of the upper module cover of this invention with cross-over details.

Referring now to FIGS. 29 and 30, the crossover module 588 defines a coolant reservoir 670 opening into coolant ports 672, 674. Lateral portions of the crossover module 588 define passageways 676, 678, which are continuous with the module body passageways 636, 638 in assembly end cap passageways 546, 548 to thereby accommodate the stub bayonets 130, 132. The horizontal, planar portion 682 of the crossover module 588 defines a plurality of, e.g., eight threaded apertures 680. Operationally, the crossover module 588 is disposed within the crossover module opening 644 of the module body 578. The module body cover 590 conforms to the shape of the horizontal planar portion 682 of the crossover module 588 and defines a plurality of, e.g., eight apertures 686. The apertures 686 align with the apertures 680 present in the crossover module 588. Accordingly, the module body cover 590 is secured in place by extending fasteners through the apertures 686 and threading the fasteners into the apertures 680.

The coolant crossover feature is incorporated into the upper module cover to ease manufacturing and assembly issues. The crossover cavity features a substantial reservoir to better cool the lamp seal, shutter sensors, lamp socket assembly and shutter assemblies (FIGS. 29, 30).

Figure 34:
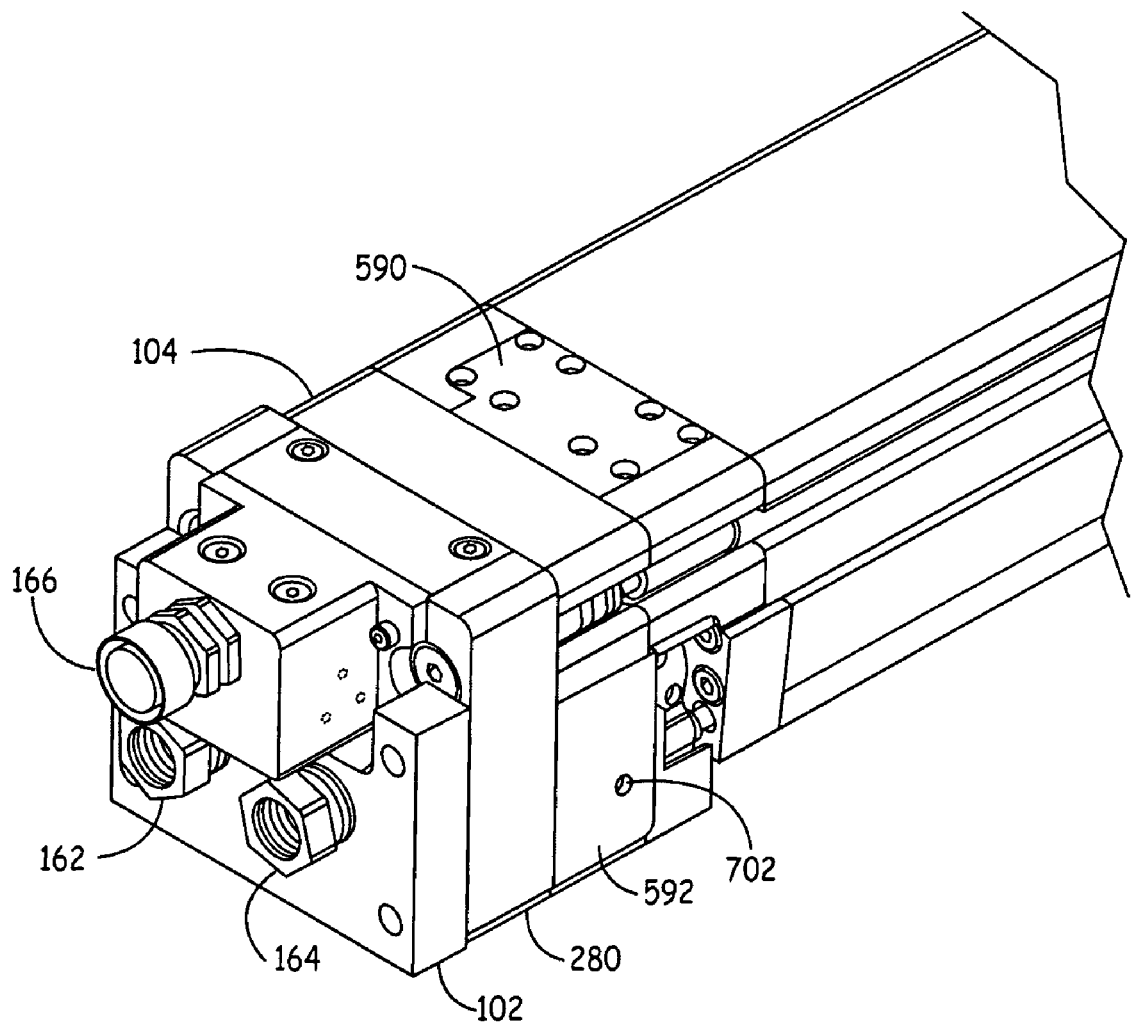
FIG. 34 is a perspective view of one embodiment of the UV module of this invention, with an access door location.
Figure 35:
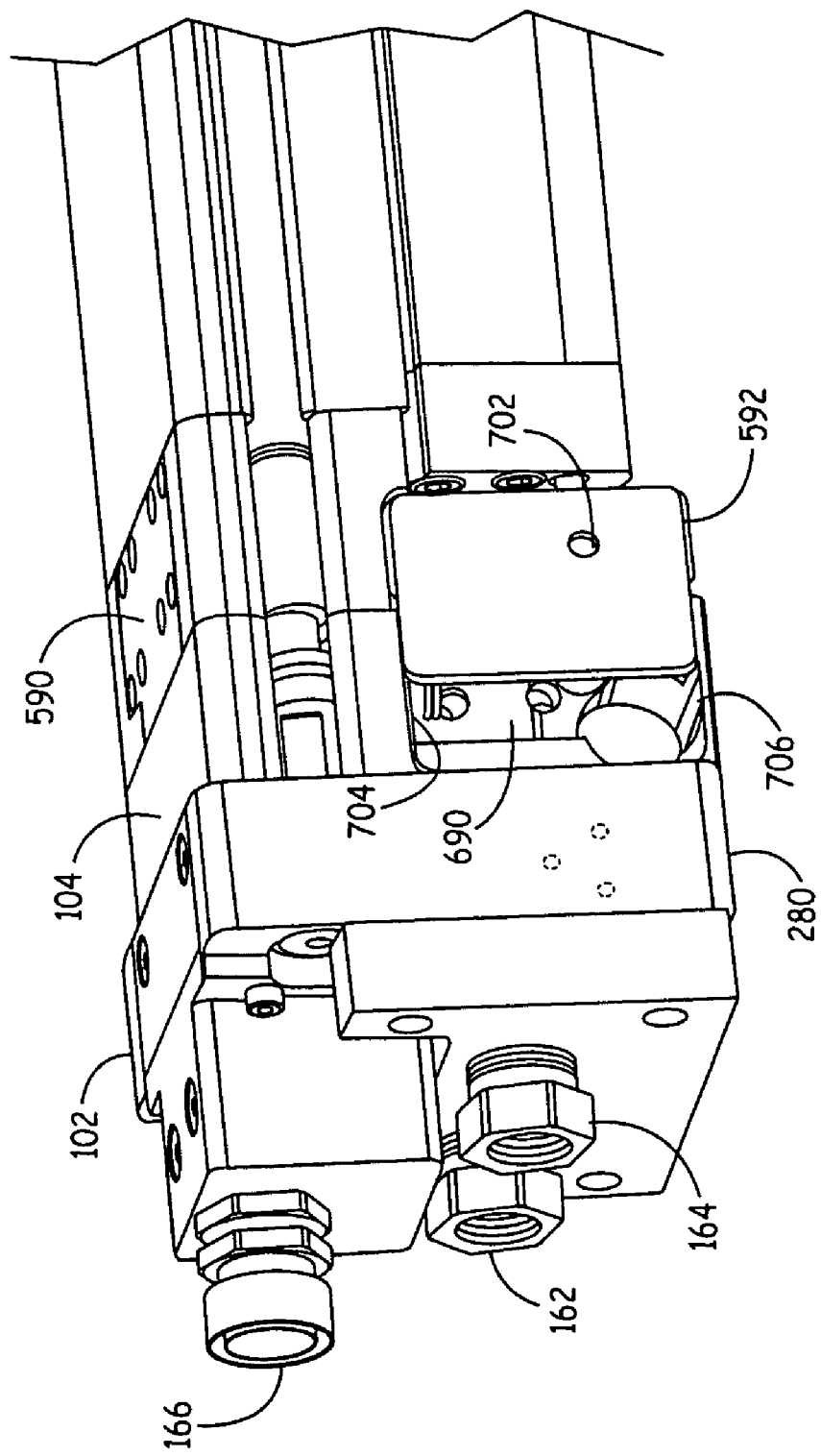
FIG. 35 is a perspective view of the UV module embodiment of FIG. 34, the access door thereof depicted as positioned for removal.
Figure 36:
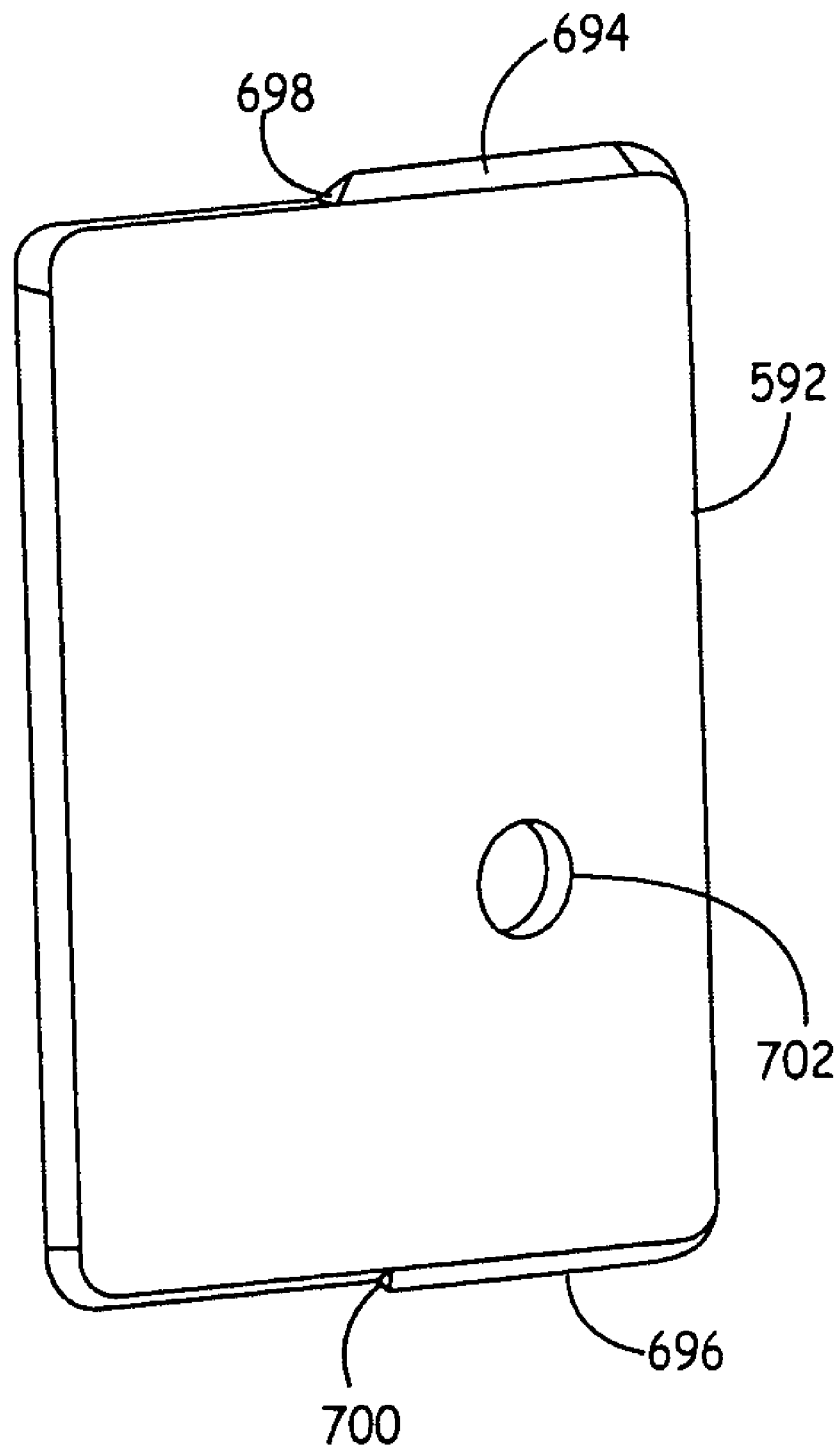
FIG. 36 is a perspective view of one embodiment of an access door of this invention.
Figure 37:
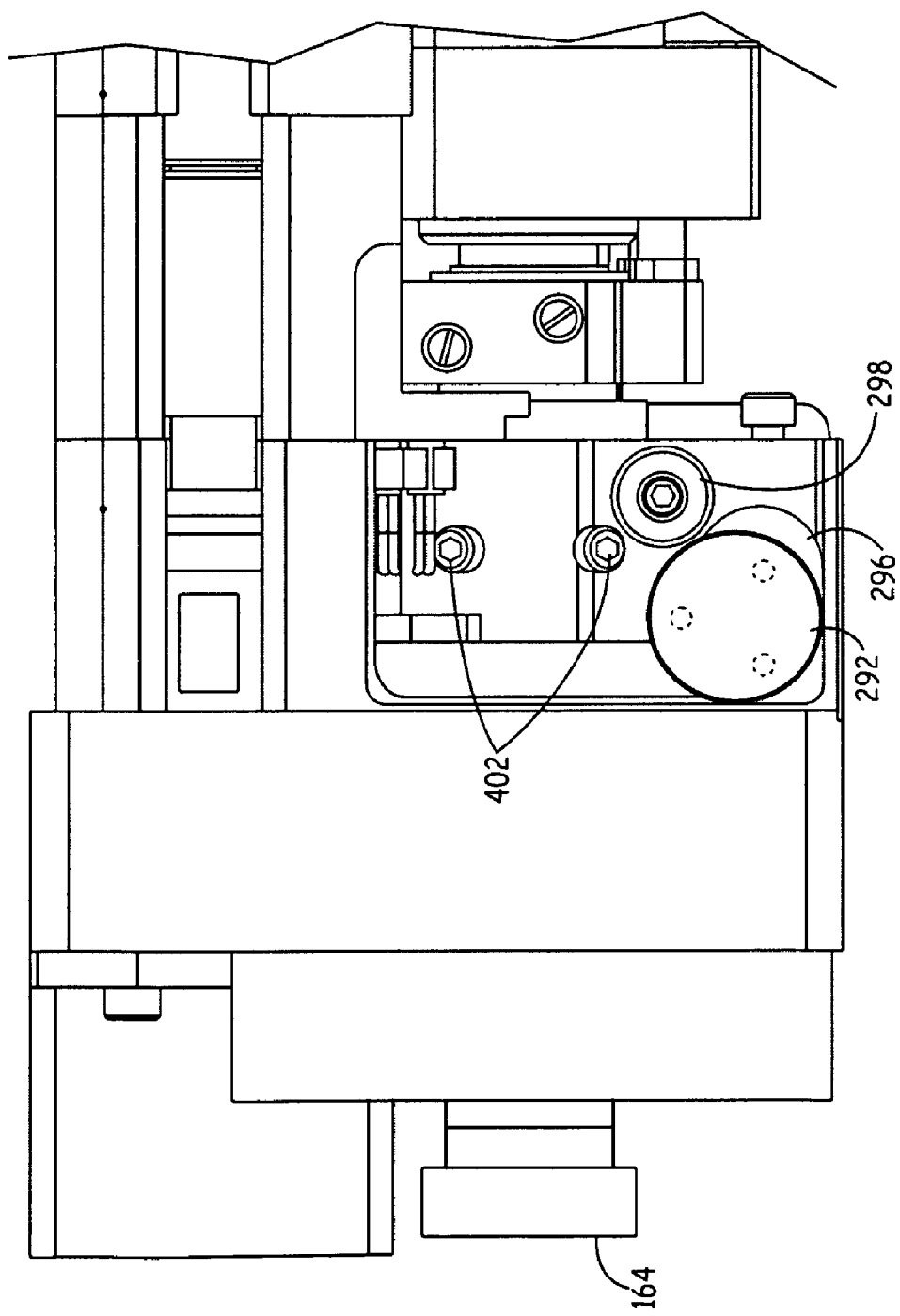
FIG. 37 is a sectional view of one embodiment of the connection cap assembly with the access door of this invention removed.

FIGS. 34, 35, and 36 show an access 690 and access door 592 of this invention. The access 690 is defined at lower portions of each lateral side of the connection end cap assembly 104. The access door includes respective upper and lower dovetailed edges 694, 696, which terminate about midway at 698, 700. A worm shaft access hole 702 is defined in the access door 592 as well. Proximate upper and lower peripheries of the access 690 are complementary, slotted portions 704, 706. The dovetailed edges 694, 696 are accommodated, and slide within, the slotted portions 704, 706.

The shutter drive train access doors have been designed to allow them to be removed with a minimum of module disassembly. A portion of the upper and lower dove tail edges of the access doors has been removed, thereby allowing the doors to be removed after being slid a short distance. Accordingly, the only component necessary for removal prior to access door removal is the module bottom cover in one embodiment. Once the doors are removed, the shutter drive assemblies may be "timed" (synchronized) as required without further disassembly of other module components (FIGS. 34-37). The fasteners securing the two-piece collar to the shaft are easily accessible. Initial timing of the shutters may be quickly accomplished with the shutter drive assembly in place and without extensive disassembly of module components. After removing the access doors, an Allen wrench inserted through access holes can quickly loosen and retighten the fasteners on the collars or worm shaft to provide quick and easy shutter timing adjustments. Each of the two shutter drive assemblies may be independently adjusted in this manner to help simplify and finely adjust shutter timing adjustments as desired (FIGS. 8, 34-37).

As shown in FIG. 9, the bearing 596 is disposed in the opening 612 of the connection and exhaust shutter end cap shown of this invention. FIG. 19 depicts the bearing 596 disposed in the right connection shutter end cap 572 and FIG. 20 shows the bearing 596 disposed in the right exhaust shutter end cap 576. The orientation of the bearing 596 in the right exhaust shutter end cap 576 is rotated 180 degrees from the orientation of the bearing 596 in the right connection shutter end cap 572. In either case, the bearing 596 has a housing 710 defining respective outer and inner glands 712, 714 and a bearing surface 716 therebetween. Respective outer and inner seals 718, 720 are accommodated within the outer and inner glands 712, 714. In the case of the left and right connection shutter end cap shown 570, 572 each of the bearings 596 receives one of the shutter shafts 332 to achieve a fluid tight connection as the connection end caps are rotated during operation.

The bearing arrangement of this invention provides for nominal flexing, thermal expansion/contraction, warpage, and dimensional variations of the shutter assembly without sacrificing fluid-integrity or inducing undesired forces on seals and shutter drive train components. The instant bearing features a narrow, centrally located load-bearing surface that is sealed on either side by a pair of integral seal glands fitted with O-rings. By virtue of their elasticity, these O-rings also provide a mechanical means to distribute the bearing loads.

The outer O-ring 718 also serves as a wiper to prevent debris from entering the bearing and seal areas.

The shutter shafts and the exhaust shutter pivot shafts function as bearing surfaces for the shutter end cap bearings and as O-ring sealing surfaces for the shutter end cap bearing seals. In both cases, the shutter end cap shown may be displaced with several degrees of freedom.

Figure 5:
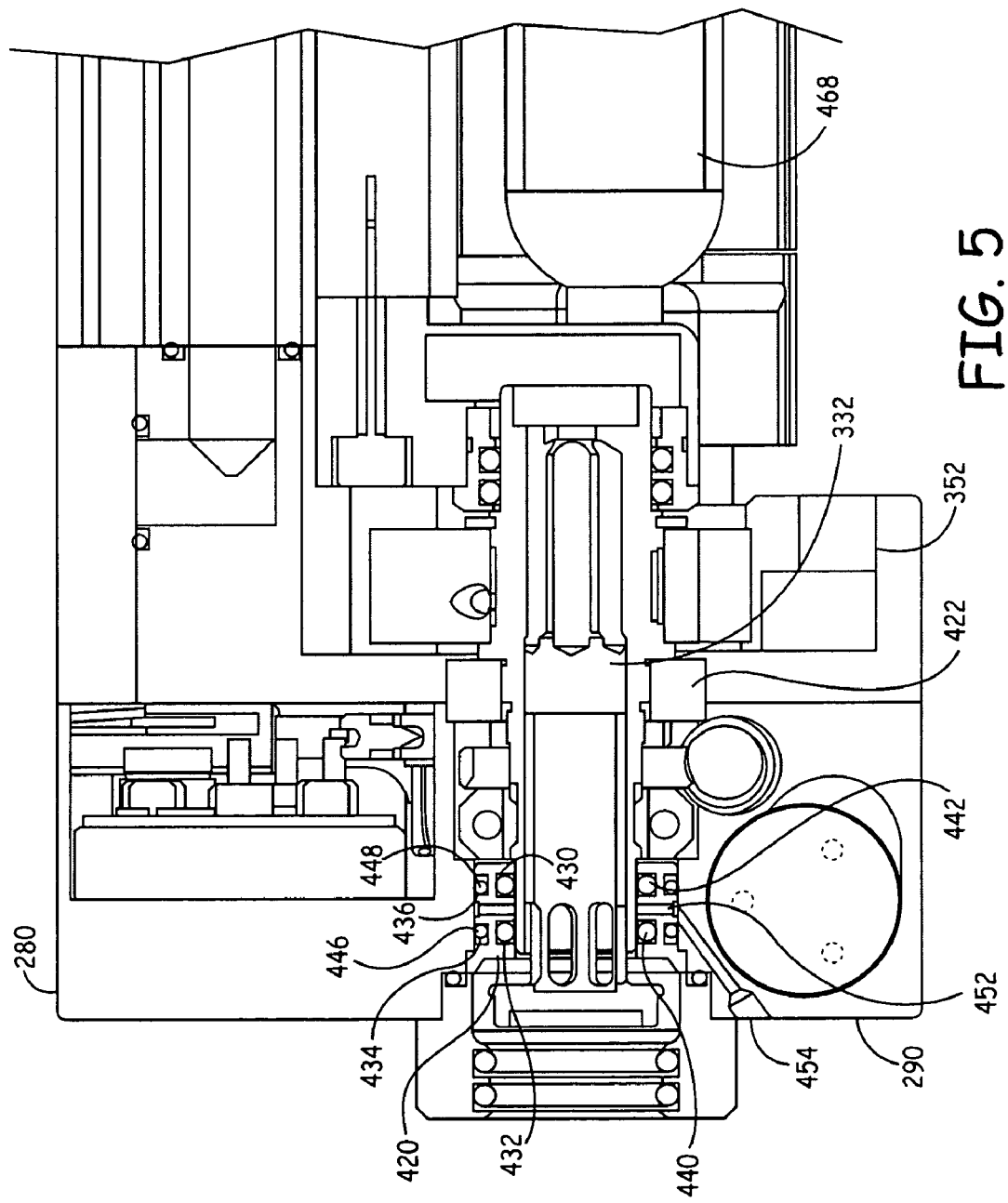
FIG. 5 is a sectional view depicting portions of the instant shutter shaft seal arrangement and bearing arrangement.

The instant bearing arrangement provides several degrees of freedom for the shutter and caps as more fully described above. The instant bearing also functions as a heat sink and a heat transfer element, again cooperating with other features to maintain module components at cooler temperatures (FIGS. 5, 19, 20).

FIGS. 20, 25, 26, and 28 depict the exhaust end cap assembly 108 of the instant invention, including a lamp connector 730, a lamp connection assembly 731, an exhaust shutter shaft 732, a fluid passageway including a sacrificial anode 738, and an end plate 740. The lamp connector 730 may be substantially identical to the lamp connector 470 as shown in FIGS. 21 and 22. In FIG. 28, the lamp connector 730 is shown operably mounted between the exhaust end caps 574, 576. The exhaust shutter shaft is rotatably disposed within the bearing 596 of each of the exhaust shutter end caps 574, 576. The exhaust shutter shaft opens into the reservoir of each of the exhaust shutter end caps 574, 576, as well, then opening into a vertical passageway 734. The vertical passageway 734 extends upwardly joining a horizontal passageway 736. The horizontal passageway 736 opens into one of the module body passageways 640, 642. The sacrificial anode 738 functions as a coolant plug and threads into a lower portion of the vertical passageway 734.

Figure 25:
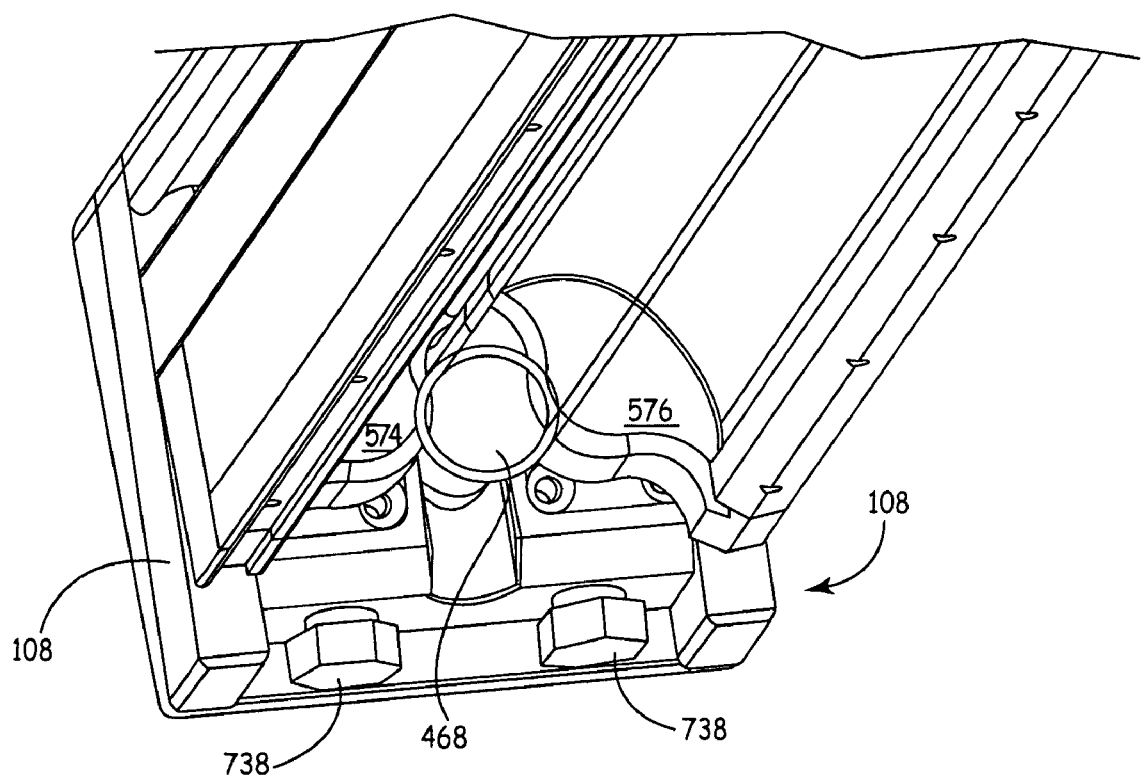
FIG. 25 is a perspective view of one embodiment of the coolant plugs with integral sacrificial anodes of this invention.
Figure 26:
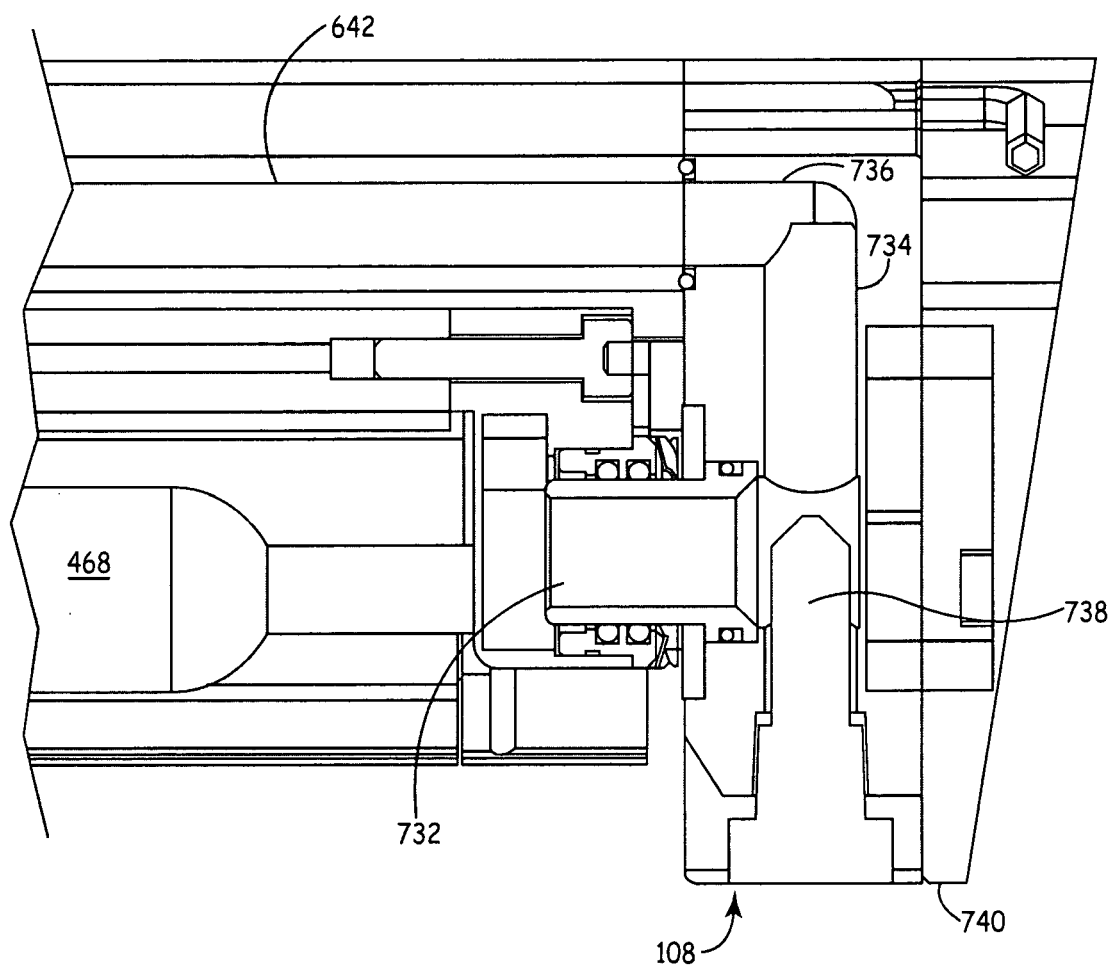
FIG. 26 is a sectional view of the coolant plugs with integral sacrificial anodes of FIG. 25.

In one embodiment, the coolant plugs in the module exhaust end cap are modified (shortened) sacrificial zinc (or manganese) anodes to combat corrosion in coolant passageways. The sacrificial anodes are installed directly in the flow path inside the module for maximum effectiveness and have a chamfered or radiused end for maximum exposure to coolant flow (FIGS. 25, 26). The contemplated coolant utilized in the instant invention, as well as other UV modules, is either locally available water or water-polyethylene glycol mixtures. Locally available water is often an electrical conductor due to concentrations of sodium, calcium, magnesium, and iron cations. Water-polyethylene glycol mixtures are electrical conductors as well. Accordingly, galvanic corrosion presents an ongoing problem by causing corrosion of the coolant conductive passageways. Moreover, the high temperatures present during operation accelerate the chemical reactions of galvanic corrosion, resulting in coolant leakage where corrosion reactions have eroded coolant passageways. Coolant leakages, especially in proximity to the UV lamp or electrical connections, can cause extensive damage due to electrical arcing. Galvanic corrosion occurs when a first metal contacts a second metal, both exposed to an electrolyte. Since both the first and second metals are conductors, the first metal will corrode preferentially if the first metal has a greater (more negative) galvanic potential than the second metal. In the case in point, zinc has a greater galvanic potential than aluminum, the predominant metal exposed to the instant coolant solution. Therefore, the zinc anode of this invention will corrode preferentially to any aluminum components of the coolant pathway. Because the instant zinc anode may be provided in the form of a threaded plug, the instant zinc anode may be easily and quickly replaced periodically when sufficiently corroded to ensure that the predominant aluminum pathways remain intact, uncorroded, and leakage free.

In one embodiment, a coolant pathway present in the instant UV module begins when coolant enters the right fitting 164 and exits the left fitting 162. However, entry via the left fitting 162 and exit via the right fitting 164 or alternating the foregoing two alternatives are contemplated to be within the scope of the instant invention. In any of the foregoing scenarios the coolant pathway would encounter elements described above, albeit in different sequences. In the first scenario, the coolant enters the right fitting 164 (FIG. 4) and flows through the right poppet valve 240 (FIG. 16). From the right poppet valve 240, the coolant flows through the sleeve bushing 420, then through the right shutter shaft 332 (FIG. 5). From the right shutter shaft 332, the coolant then flows through the right connection shutter end cap reservoir 616 (FIG. 16), then through the right connection shutter end cap vertical and horizontal passageways 618, 620 (FIG. 19), then through the right shutter passageway 652 (FIG. 6). From the right shutter passageway 652, the coolant flows through the right exhaust shutter end cap horizontal and vertical passageways and into the reservoir thereof (not shown). From the right exhaust shutter end cap reservoir, the coolant flows through the right exhaust shutter shaft 732, though the vertical and horizontal passageways 734, 736 (FIG. 26) and into the module body coolant passageway 642 (FIG. 39). After flowing through the module body coolant passageway 642, the coolant flows through the crossover module 588, though port 674, reservoir 670 and port 672 (FIG. 30) and into the module body passageway 640 (FIG. 39) to begin a passageway in the left components of the instant UV module which is essentially a reverse of the passageway to the right components thereof. In this reverse passageway, the coolant flows through the module body passageway 640 (FIG. 39) and into the left horizontal and vertical passageways (not shown). While many of the components of the left fluid passageways are not depicted, these components are substantially similar or identical to those shown with respect to right fluid passageways. From the vertical passageway 734, the coolant flows through the left exhaust shutter shaft and into the left exhaust shutter end cap, where the coolant flows through the end cap reservoir and vertical and horizontal passageways. From the left exhaust shutter end cap horizontal passageway, the coolant then flows through the left shutter passageway 650 (FIG. 6) and into the left connection shutter end cap reservoir (not shown). After flowing through the left connection shutter end cap reservoir, the coolant then flows through the horizontal and vertical passageways thereof and into the left shutter shaft 332 (not shown). From the left shutter shaft 332, the coolant then flows through the sleeve bushing 420, poppet valve 240, and exits via the left fitting 162 (not shown).

Referring now to FIGS. 44, 45, 46, and 47, another embodiment of the instant shutter assembly of this invention is depicted at 750, having respective negative (female) and positive (male) retainers 752, 754. The other components of the shutter assembly 750 may be similar or substantially identical to those discussed previously. The negative retainers 752 defines a terminal C-channel or slot 760 in a similar manner to the negative retainer 584 discussed above. However, in contrast to the positive retainer 586, the positive male retainers have a plurality of alternate respective lower and upper cutouts 762, 764 straddling the tip 766 thereof. As can be seen, the remaining, or non-cutout portions 768, 770 of the positive retainer 754 abut the upper or lower extensions 772, 774 of the negative retainers 752, thereby leaving a gap between the tip 766 of the positive retainer 754 and the surface of the C-channel 760 to allow airflow into the interior of the shuttle assembly 750 from the exterior, to thereby further assist in cooling. Stated otherwise, the gap between the lower cutout 762 and the lower extensions 772, 774 may be considered as a lower channel portion 778; the gap between the positive retainer tip 766 and the surface of the C-channel 760 may be considered as an intermediate channel portion 780; and the gap between upper cutout 764 and the upper extensions 772 may be considered as an upper channel portion 782. The lower, intermediate, and upper channel portions 778, 780, 782 being continuous, a plurality of air channels are thereby defined to further assist in cooling the interior of the instant UV module of this invention.

When a printing press is operating, the shutters of this invention are rotated to an open position by the shutter drive train (FIG. 6). The very high energy light (a combination of visible, infrared, and ultraviolet wavelengths) is generated from a lamp. A proportion of the light is reflected and another proportion directly impinges the inked substrate. The shutters are designed with a special shape to reflect and aim as much light energy toward the substrate as possible so that the UV wavelengths will "cure" (dry) the UV-reactive ink.

Under certain conditions, the shutters must be closed (FIG. 7). The outer edges of each of the shutters are equipped with either a positive (male) or a negative (female) profile. These profiles mate together when the shutters are closed to block the passage of light to the substrate being printed by the press. A shutter assembly that has stalled in a non-fully-closed position (usually due to shutter warpage, drive train bind-up, or motor failure) has been known to allow a powered-up lamp to ignite the substrate.

During normal operation, a water or water/glycol coolant mixture is circulated through the module body and through both shutter assemblies to remove excess heat and control the amount of shutter warpage and expansion. The instant module body and shutter assemblies are made from extruded aluminum with integral coolant passageways. There are numerous places throughout the module assembly where static and dynamic O-rings seals may be used to attempt to prevent the coolant from leakage. In the past, leakage problems have been fairly common. In the module design of this invention, the O-ring seal and gland designs eliminate, or greatly reduce, coolant leakages. However, most coolants are good conductors of electricity and due to the close proximity of leakages to the high-voltage electrical connections within the module of the prior art, these leakages have often caused and escalated component damage due to electrical arcing.

The special high-energy UV lamps require high-voltage and fairly high current, e.g., up to 3000 volts and up to 17 amps. The electrical connections conducting this electrical current must retain electrical conduction properties and must be well insulated from surrounding components (FIGS. 21-24, 42, 43). In the past coolant leakages, electrical leakages, pin and socket erosion and pin-to-socket alignment problems between the module and the connection block have been causes of failure in the electrical connections.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A drive train for a UV module, comprising:
    a motor;
    a worm shaft rotated when said motor is actuated;
    a pair of shutter shafts oppositely rotated by the worm shaft;
    a pair of shutter arms, one of said shutter arms rotatably attached to each of said shutter shafts,
    a pair of drive pins, each of said drive pins axially extending from one of said shutter arms; each of said drive pins having a longitudinal axis and comprising a shank terminating in a head with respective shank and head diameters, said shank diameter less than said head diameter; and
    a pair of shutter end caps, each of said shutter end caps comprising an axial slot with a longitudinal axis and accommodating axial displacement of one of said drive pins, rotation of said drive pin, and tilting of said drive pin relative to said longitudinal axis of said axial slot, said head of said drive pin contacting said end cap within said slot without said shank contacting said end cap within said slot when either of said drive pins is displaced, rotated, or tilted, said shutter end caps rotated by said drive pins.

2. The drive train of claim 1, further comprising first and second spur gears, said first spur gear rotated by said motor, said second spur gear meshed with said first spur gear and rotating said worm shaft.

3. The drive train of claim 1, in which said worm shaft comprises left hand and right hand segments.

4. The drive train of claim 3, further comprising a worm gear attached to each shutter shaft and meshed with said worm shaft.

5. The drive train of claim 4, wherein each said worm gear is secured to one of said shutter shafts between a clamp collar and a nut, said clamp collar abutting a rib disposed on a surface of each said shutter shaft.

6. The drive train of claim 1, wherein each said shutter shaft comprises an axial bore for conducting coolant therethrough.

7. The drive train of claim 6, wherein each said shutter end cap defines a reservoir receiving coolant from one of said shutter shafts and a passageway receiving coolant from said reservoir.

8. A method of manufacturing a drive train for a UV module, comprising:
    disposing a pair of shutter shafts such that said shutter shafts are oppositely rotated when a motor is actuated;
    affixing a clutch mechanism to each of said shutter shafts, said clutch mechanism comprising a shutter arm, a drive pin axially extending from said shutter arm; and
    disposing each of said drive pins in a slot defined by a shutter end cap, said shutter end cap being rotated when said motor is actuated, each of said drive pins having a shank with a shank diameter terminating in a head having a head diameter, said shank diameter smaller than said head diameter, such that said shutter end caps are rotated by said drive pins and such that said drive pins can rotate, be axially displaced and tilt with respect to a longitudinal axis of said slot without said shank contacting said end cap when said pins are disposed in said slots.

9. The method of claim 8, further comprising radially positioning a plurality of adjustable spring plungers in each said shutter arm.

10. The method of claim 9, wherein said spring plungers are adjustable.

11. The method of claim 9, wherein said spring plungers comprise a threaded housing.

12. The method of claim 8, further comprising disposing a sensor magnet in each said clutch arm.

13. The method of claim 12, further comprising affixing a pair of shutter position sensors to each said clutch arm.

14. The method of claim 13, wherein each said drive pin extends from an extension of each said shutter arm.

15. A method of rotating a drive train for a UV module, said drive train comprising a motor, a pair of shutter shafts, a pair of shutter arms, and a pair of shutter end caps, said shutter shafts oppositely rotated when said motor is actuated, one of said shutter arms rotatably fixed to each of said shutter shafts, a drive pin extending from each of said shutter arms, each said drive pin having a shank ending in a head and accommodated in a slot defined in one of said shutter end caps, said head having a greater diameter than said shank, when disposed in said slot said drive pin axially displacing, rotating, and tilting relative to a longitudinal axis of said slot such that said shank does not contact said shutter end cap, the method comprising actuating said motor, thereby oppositely rotating each of said shutter end caps.

16. The method of claim 15, wherein said drive train further comprises a worm shaft and first and second spur gears, said first spur gear rotated by said motor and said second spur gear rotating said worm shaft and wherein a worm gear is attached to each of said shutter shafts.

17. The method of claim 16, wherein rotating said shutter caps to an open position or to a closed position is detected by a pair of sensors and a magnet.

18. The method of claim 16, wherein rotating said shutter caps to an open position or to a closed position is detected by a pair of sensors and a magnet attached to each said shutter arm.

19. The method of claim 15, wherein each said slot rotatably accommodates one of said drive pins and wherein said drive pin is tilted with respect to a longitudinal axis of said slot.

20. The method of claim 15, in which said drive pin is axially displaced due to warping or elongation of a component of said UV module.

\* \* \* \* \*